United States Patent
Katsuta

(10) Patent No.: US 9,766,765 B2
(45) Date of Patent: Sep. 19, 2017

(54) DISPLAY DEVICE WITH TOUCH DETECTION FUNCTION AND WIRING FOR AC SIGNAL

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/341,731

(22) Filed: Nov. 2, 2016

(65) Prior Publication Data

US 2017/0075455 A1    Mar. 16, 2017

Related U.S. Application Data

(63) Continuation of application No. 14/546,546, filed on Nov. 18, 2014, now Pat. No. 9,513,754.

(30) Foreign Application Priority Data

Nov. 22, 2013 (JP) .................................. 2013-242390

(51) Int. Cl.
 *G06F 3/044* (2006.01)
 *G06F 3/041* (2006.01)

(52) U.S. Cl.
 CPC ............ *G06F 3/044* (2013.01); *G06F 3/0412* (2013.01); *G06F 3/0416* (2013.01); *G06F 2203/04108* (2013.01)

(58) Field of Classification Search
 CPC ...... G06F 3/044; G06F 3/0416; G06F 3/0412; G06F 2203/04108
 See application file for complete search history.

(56) References Cited

U.S. PATENT DOCUMENTS

| 2004/0189611 | A1 | 9/2004 | Matsumoto et al. |
| 2008/0018613 | A1 | 1/2008 | Kim |
| 2010/0295804 | A1 | 11/2010 | Takeuchi |
| 2011/0187677 | A1* | 8/2011 | Hotelling .............. G06F 3/0412 345/174 |
| 2012/0044166 | A1* | 2/2012 | Mizuhashi ............ G06F 3/0412 345/173 |
| 2012/0262387 | A1 | 10/2012 | Mizuhashi et al. |

(Continued)

FOREIGN PATENT DOCUMENTS

| CN | 102799306 | 11/2012 |
| JP | 2002236542 | 8/2002 |

(Continued)

OTHER PUBLICATIONS

Japanese Office Action issued Mar. 7, 2017 in corresponding Japanese Application No. 2013-242390.

(Continued)

*Primary Examiner* — Liliana Cerullo
(74) *Attorney, Agent, or Firm* — K&L Gates LLP

(57) ABSTRACT

A display device with a touch detecting function includes wiring for touch arranged in a peripheral area positioned on the outside of a display area, and a selection switch that selects one of drive electrodes to be coupled to the wiring for touch. A drive electrode scanning unit selects one of drive electrodes and includes a plurality of transfer circuits in the peripheral area. Part of the transfer circuits is a transfer circuit that performs output to the selection switch.

6 Claims, 35 Drawing Sheets

(56) References Cited

U.S. PATENT DOCUMENTS

| | | | |
|---|---|---|---|
| 2014/0049705 A1* | 2/2014 | Sugita | G06F 3/0416 349/12 |
| 2015/0311228 A1 | 10/2015 | Sogabe et al. | |
| 2015/0370381 A1 | 12/2015 | Mizuhashi et al. | |

FOREIGN PATENT DOCUMENTS

| | | |
|---|---|---|
| JP | 2012-221485 | 11/2012 |
| JP | 2012-230657 | 11/2012 |
| JP | 2012230301 | 11/2012 |

OTHER PUBLICATIONS

Chinese Office Action dated Mar. 31, 2017 in corresponding Chinese Application No. 201410669822.9.

* cited by examiner

SHUTTER BUTTON 524
LIGHT EMITTING UNIT 521

DISPLAY UNIT 522
SHUTTER BUTTON 524
523 MENU SWITCH

DISPLAY DEVICE WITH TOUCH DETECTION FUNCTION AND WIRING FOR AC SIGNAL

CROSS REFERENCES TO RELATED APPLICATIONS

The present application is a continuation application of U.S. application Ser. No. 14/546,546, filed on Nov. 18, 2014, which application claims priority to Japanese Priority Patent Application JP 2013-242390 filed in the Japan Patent Office on Nov. 22, 2013, the entire content of which is hereby incorporated by reference.

BACKGROUND

1. Technical Field

The present invention relates to a display device capable of detecting an external contiguous object and to an electronic apparatus, and in particular to a display device with a touch detecting function capable of detecting an external contiguous object approaching the device from the outside based on a change in capacitance and to an electronic apparatus.

2. Description of the Related Art

Touch detection devices capable of detecting an external contiguous object, which are what is called touch panels, have been attracting attention in recent years. Touch panels are attached or integrated on display devices, such as liquid-crystal display devices, and are used for display devices with a touch detecting function. Display devices with a touch detecting function cause a display device to display various types of button images and the like. This enables input of information using the touch panel as a substitute for general mechanical buttons. Such display devices with a touch detecting function including a touch panel require no input device, such as a keyboard, a mouse, and a keypad. As a result, display devices with a touch detecting function have been increasingly used for portable information terminals, such as mobile phones, besides for computers.

Some types of technologies for touch detection devices are known, including optical, resistive, and capacitive technologies, for example. By applying a capacitive touch detection device to a portable information terminal, it is possible to provide an apparatus having a relatively simple structure and requiring less power consumption. For example, Japanese Patent Application Laid-open Publication No. 2012-221485 (JP-A-2012-221485) discloses a capacitive touch panel.

In a display device with a touch detecting function, a display function and a touch detecting function are integrated with each other, so that an operation for touch detection may affect a display, for example. In contrast, with the display device with a touch detecting function disclosed in JP-A-2012-221485, influence on the display can be reduced even when a touch is detected. The display device with a touch detecting function disclosed in JP-A-2012-221485 includes a drive unit that selectively applies a direct current (DC) drive voltage VcomDC or an alternative current (AC) drive signal VcomAC to a drive electrode. In the display device with a touch detecting function, a display element is driven for display, a drive signal is applied to the drive electrode, and a signal corresponding to the drive signal is output from a touch detection electrode. Accordingly, two pieces of wiring for supplying the DC drive voltage VcomDC and the AC drive signal VcomAC to the drive electrode need to be routed in a picture frame area.

In the display device with a touch detecting function disclosed in JP-A-2012-221485, a resistance of the wiring that supplies the drive signal may affect a time constant of a waveform of the drive signal, and may affect accuracy in touch detection. Due to this, to reduce a connection resistance, a width of the wiring needs to be increased. However, when the width of the wiring is increased, the picture frame area that does not contribute to a display area may be enlarged.

The present invention is made in view of such a situation, and provides a display device with a touch detecting function and an electronic apparatus that can enhance the accuracy in touch detection or narrow the picture frame area.

SUMMARY

According to an aspect, a display device with a touch detecting function includes: a plurality of pixel electrodes arranged in a display area; a plurality of drive electrodes arranged opposed to the pixel electrodes; a control device that applies a drive voltage for display between the plurality of pixel electrodes and the plurality of drive electrodes; a touch detection electrode opposed to the plurality of drive electrodes; wiring for touch that is arranged in a peripheral area positioned outside of the display area and supplies a drive signal for touch to the plurality of drive electrodes; and a selection switch that selects one of the plurality of drive electrodes to be coupled to the wiring for touch. The control device includes a drive electrode scanning unit selecting one of the plurality of drive electrodes, the drive electrode scanning unit includes a plurality of transfer circuits for supplying the drive signal for touch in the peripheral area, and part of the transfer circuits is a transfer circuit that controls the selection switch.

According to another aspect, an electronic apparatus includes: a display device with a touch detecting function, the display device with a touch detecting function including: a plurality of pixel electrodes arranged in a display area; a plurality of drive electrodes arranged opposed to the pixel electrodes; a control device that applies a drive voltage for display between the plurality of pixel electrodes and the plurality of drive electrodes based on an image signal; a touch detection electrode opposed to the drive electrode; a touch detection unit coupled to the touch detection electrode; wiring for touch that is arranged in a picture frame area positioned outside of the display area and supplies a drive signal for touch to the plurality of drive electrodes; and a selection switch that selects one of the plurality of drive electrodes to be coupled to the wiring for touch. The control device includes a drive electrode scanning unit that selects one of the plurality of drive electrodes to which the drive signal for touch is supplied, the drive electrode scanning unit includes a plurality of transfer circuits for supplying the drive signal for touch to the one of the plurality of drive electrodes, and part of the transfer circuits is a transfer circuit that controls the selection switch.

Additional features and advantages are described herein, and will be apparent from the following Detailed Description and the figures.

DETAILED DESCRIPTION

Figure 1:
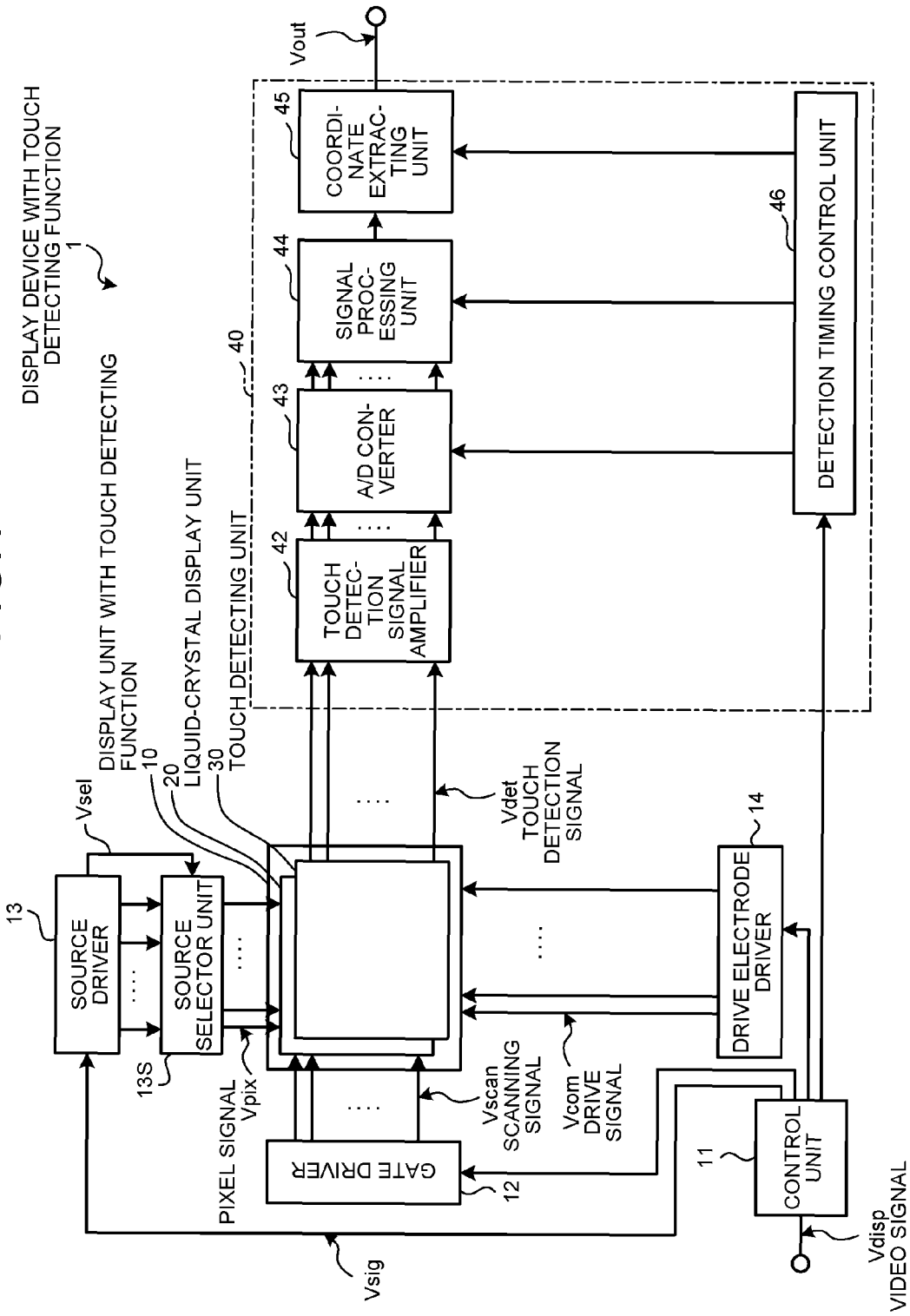
FIG. 1 is a block diagram of an exemplary configuration of a display device with a touch detecting function according to a first embodiment.

Exemplary aspects (embodiments) according to the present invention are described in greater detail with reference to the accompanying drawings. The contents disclosed in the following embodiments are not intended to limit the present invention. Components described below include components easily conceivable by those skilled in the art and components substantially identical. The components described below can be combined as appropriate. The disclosure is merely an example, and the present invention naturally encompasses appropriate modifications that can be easily conceivable by those skilled in the art without departing from the gist of the invention. For clarity of description, a width, a thickness, a shape, and the like of each component may be schematically represented in the drawings as compared to an actual aspect. However, it is merely an example and the present invention is not limited thereto. The elements in the specification and the other drawings that are the same as those described in drawings that have been already described may be denoted by the same reference numerals, and redundant description will not be repeated in some cases.

First Embodiment

FIG. 1 is a block diagram of an exemplary configuration of a display device with a touch detecting function according to a first embodiment. A display device 1 with a touch detecting function includes a display unit 10 with a touch detecting function, a control unit 11, a gate driver 12, a source driver 13, a source selector unit 13S, a drive electrode driver 14, and a touch detection unit 40. In the display device 1 with a touch detecting function, the display unit 10 with a touch detecting function has a touch detecting function. The display unit 10 with a touch detecting function is a device in which a liquid-crystal display unit 20 provided with liquid-crystal display elements as display elements is integrated with a capacitive touch detecting unit 30.

The present embodiment discloses a liquid crystal display device (liquid crystal display unit 20) as an example of a display function layer having an image display function for displaying an image in a display area. Examples of other applications include, but are not limited to, various flat-panel type display devices such as organic electroluminescent (EL) devices, other self-luminous display devices, or electronic paper display devices having an electrophoresis element and the like. It is needless to say that the size of the device is not specifically limited, and a middle-size, a small size, and a large size can be used.

The liquid-crystal display unit 20 performs sequential scanning on each horizontal line based on a scanning signal Vscan supplied from the gate driver 12, thereby performing display, which will be described later. The control unit 11 is a circuit that supplies control signals to the gate driver 12, the source driver 13, the drive electrode driver 14, and the touch detecting unit 40 based on a video signal Vdisp supplied from the outside, thereby controlling these units so as to operate in synchronization with one another. A control device in the present embodiment includes the control unit 11, the gate driver 12, the source driver 13, and the drive electrode driver 14.

The gate driver 12 has a function to sequentially select a horizontal line to be a target of display drive of the display unit 10 with a touch detecting function based on the control signal supplied from the control unit 11.

The source driver 13 is a circuit for supplying a pixel signal Vpix to each pixel Pix (sub-pixel SPix) (described later) of the display unit 10 with a touch detecting function based on the control signal supplied from the control unit 11. As described later, the source driver 13 generates a pixel signal obtained by time-division multiplexing pixel signals Vpix of a plurality of sub-pixels SPix of the liquid crystal display unit 20 from a video signal Vdisp for one horizontal line, and supplies the generated pixel signal to the source selector unit 13S. The source driver 13 also generates a switch control signal Vsel required for separating the pixel signal Vpix multiplexed with an image signal Vsig, and supplies the switch control signal Vsel to the source selector unit 13S together with the pixel signal Vpix. The source selector unit 13S can reduce the number of pieces of wiring between the source driver 13 and the control unit 11.

The drive electrode driver 14 is a circuit for supplying a drive signal for touch detection (touch drive signal, hereinafter referred to as a drive signal) VcomAC and a drive voltage for display VcomDC as a voltage for display to a drive electrode COML (described later) of the display unit 10 with a touch detecting function based on the control signal supplied from the control unit 11.

The touch detecting unit 40 is a circuit that detects whether a touch (the contact state described above) is made on the touch detecting unit 30 based on the control signal supplied from the control unit 11 and a touch detection signal Vdet supplied from the touch detecting unit 30 of the display unit 10 with a touch detecting function. If a touch is made, the touch detecting unit 40 derives the coordinates of the touch in a touch detection area. The touch detecting unit 40 includes a touch detection signal amplifier 42, an analog/digital (A/D) converter 43, a signal processing unit 44, a coordinate extracting unit 45, and a detection timing control unit 46.

The touch detection signal amplifier 42 amplifies a touch detection signal Vdet supplied from the touch detecting unit 30. The touch detection signal amplifier 42 may include an analog low pass filter. The analog low pass filter removes high-frequency components (noise components) included in the touch detection signal Vdet, thereby extracting and outputting touch components.

Basic Principle of Capacitive Touch Detection

Figure 2:
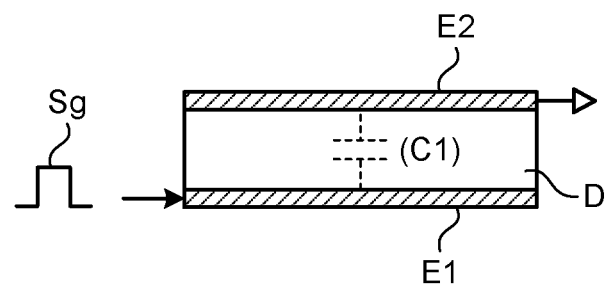
FIG. 2 is an explanatory view illustrating a state where no finger is in contact or in contiguity with the device for explanation of the basic principle of a capacitive touch detection technology.
Figure 3:
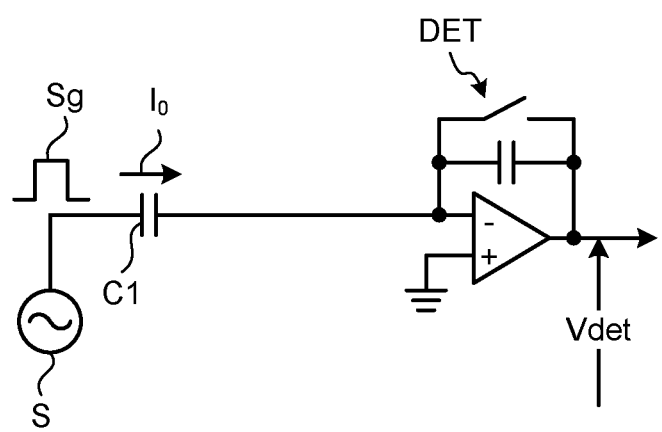
FIG. 3 is a view for explaining an example of an equivalent circuit in the state where no finger is in contact or in contiguity with the device illustrated in FIG. 2.
Figure 4:
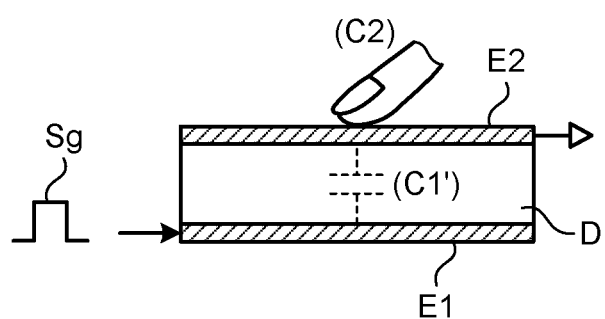
FIG. 4 is an explanatory view illustrating a state where a finger is in contact or in contiguity with the device for explanation of the basic principle of the capacitive touch detection technology.
Figure 5:
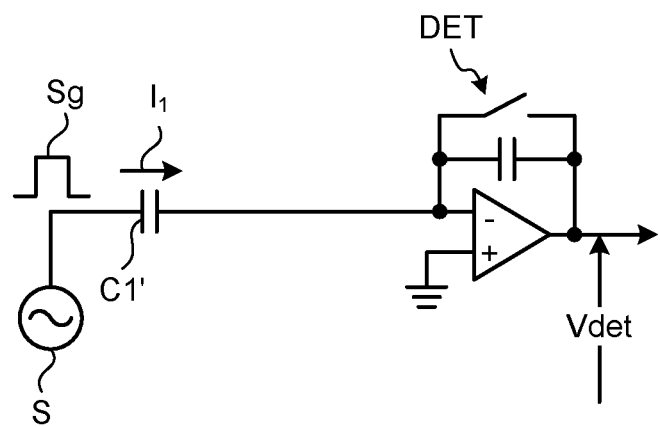
FIG. 5 is a view for explaining an example of an equivalent circuit in the state where the finger is in contact or in contiguity with the device illustrated in FIG. 4.
Figure 6:
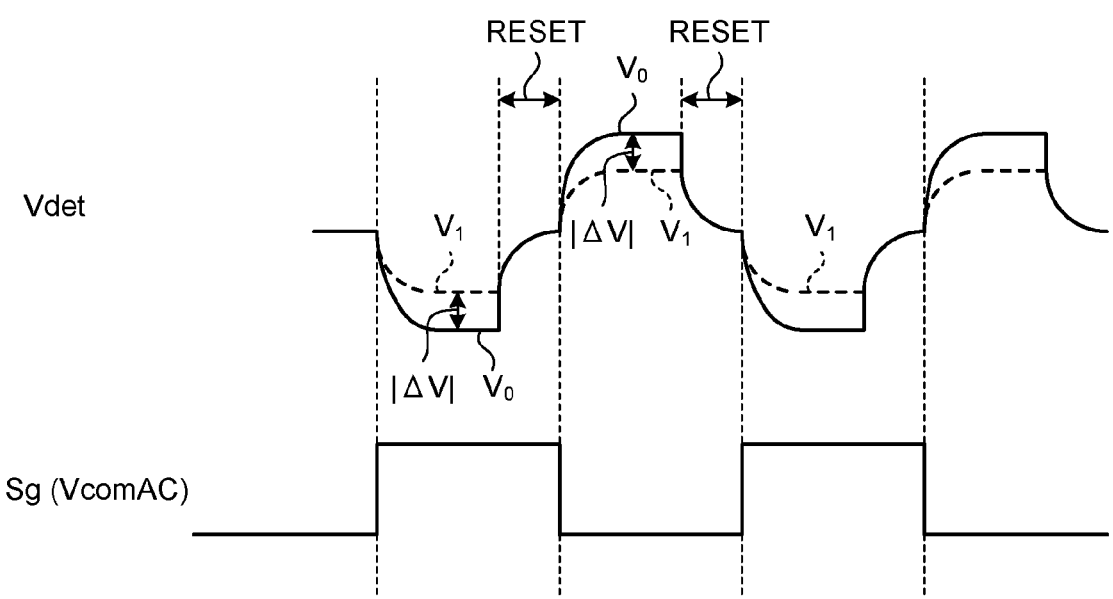
FIG. 6 is a diagram of an example of a waveform of a drive signal and a touch detection signal.

The touch detecting unit 30 operates based on the basic principle of capacitive touch detection, thereby outputting the touch detection signal Vdet. The following describes the basic principle of touch detection in the display device 1 with a touch detecting function according to the present embodiment with reference to FIG. 1 to FIG. 6. FIG. 2 is an explanatory view illustrating a state where no finger is in contact or in contiguity with the device for explanation of the basic principle of a capacitive touch detection technology. FIG. 3 is a view for explaining an example of an equivalent circuit in the state where no finger is in contact or in contiguity with the device illustrated in FIG. 2. FIG. 4 is an explanatory view illustrating a state where a finger is in contact or in contiguity with the device for explanation of the basic principle of the capacitive touch detection technology. FIG. 5 is a view for explaining an example of an equivalent circuit in the state where the finger is in contact or in contiguity with the device illustrated in FIG. 4. FIG. 6 is a diagram of an example of a waveform of a drive signal and a touch detection signal.

As illustrated in FIG. 2, capacitive elements C1 include a pair of electrodes of a drive electrode E1 and a touch detection electrode E2 arranged in a manner facing each other with a dielectric D interposed therebetween, for example. As illustrated in FIG. 3, a first end of the capacitive element C1 is coupled to an alternating-current (AC) signal source (a drive signal source) S, whereas a second end is coupled to a voltage detector (a touch detecting unit) DET.

The voltage detector DET is an integration circuit included in the touch detection signal amplifier 42 illustrated in FIG. 1, for example.

If the AC signal source S applies an alternating-current (AC) rectangular wave Sg at a predetermined frequency (e.g., approximately several kilohertz to several hundred kilohertz) to the drive electrode E1 (first end of the capacitive element C1), an output waveform (touch detection signal Vdet) is generated via the voltage detector DET coupled to the touch detection electrode E2 (second end of the capacitive element C1). The AC rectangular wave Sg corresponds to a drive signal VcomAC, which will be described later.

In the state where no finger is in contact (or in contiguity) with the device (a non-contact state), an electric current $I_0$ depending on the capacitance value of the capacitive element C1 flows in association with charge and discharge to the capacitive element C1 as illustrated in FIG. 2 and FIG. 3. As illustrated in FIG. 6, the voltage detector DET converts fluctuations in the electric current $I_0$ depending on the AC rectangular wave Sg into fluctuations in the voltage (a waveform $V_0$ indicated by a solid line).

By contrast, in the state where a finger is in contact (or in contiguity) with the device (a contact state), capacitance C2 generated by the finger is in contact or in contiguity with the touch detection electrode E2 as illustrated in FIG. 4. This blocks capacitance of a fringe between the drive electrode E1 and the touch detection electrode E2. As a result, the capacitive element C1' having a capacitance value smaller than that of the capacitive element C1 is obtained. In the equivalent circuit illustrated in FIG. 5, an electric current $I_1$ flows through the capacitive element C1'. As illustrated in FIG. 6, the voltage detector DET converts fluctuations in the electric current $I_1$ depending on the AC rectangular wave Sg into fluctuations in the voltage (a waveform $V_1$ indicated by a dotted line). In this case, the waveform $V_1$ has amplitude smaller than that of the waveform $V_0$. Thus, an absolute value $|\Delta V|$ of the voltage difference between the waveform $V_0$ and the waveform $V_1$ varies depending on an influence of an object, such as a finger, approaching the device from the outside. To detect the absolute value $|\Delta V|$ of the voltage difference between the waveform $V_0$ and the waveform $V_1$ with high accuracy, the voltage detector DET preferably operates while providing a period Reset for resetting charge and discharge of a condenser based on the frequency of the AC rectangular wave Sg by performing switching in the circuit.

The touch detecting unit 30 illustrated in FIG. 1 performs sequential scanning on each detection block based on the drive signal Vcom (drive signal VcomAC, which will be described later) supplied from the drive electrode driver 14, thereby performing touch detection.

The touch detecting unit 30 outputs the touch detection signal Vdet for each detection block from a plurality of touch detection electrodes TDL, which will be described later, via the voltage detector DET illustrated in FIG. 3 or FIG. 5, thereby supplying the touch detection signal Vdet to the A/D converter 43 of the touch detecting unit 40.

The A/D converter 43 is a circuit that samples an analog signal output from the touch detection signal amplifier 42 at a timing synchronized with the drive signal VcomAC, thereby converting the analog signal into a digital signal.

The signal processing unit 44 includes a digital filter. The digital filter reduces frequency components (noise components) other than the frequency at which the drive signal Vcom is sampled in the output signal of the A/D converter 43. The signal processing unit 44 is a logic circuit that detects whether a touch is made on the touch detecting unit 30 based on the output signal from the A/D converter 43. The signal processing unit 44 performs processing for extracting only the voltage difference caused by the finger. The voltage difference caused by the finger corresponds to the absolute value $|\Delta V|$ of the difference between the waveform $V_0$ and the waveform $V_1$. The signal processing unit 44 may perform an arithmetic operation for averaging the absolute value $|\Delta V|$ per detection block, thereby deriving the average value of the absolute value $|\Delta V|$. Thus, the signal processing unit 44 can reduce an influence caused by noise. The signal processing unit 44 compares the detected voltage difference caused by the finger with a predetermined threshold voltage. If the detected voltage difference is equal to or larger than the threshold voltage, the signal processing unit 44 determines that an external contiguous object approaching the device from the outside is in contact with the device. If the detected voltage difference is smaller than the threshold voltage, the signal processing unit 44 determines that the external contiguous object is not in contact with the device. Thus, the touch detecting unit 40 can perform touch detection.

The coordinate extracting unit 45 is a logic circuit that derives, when a touch is detected by the signal processing unit 44, the touch panel coordinates of the touch. The detection timing control unit 46 performs control such that the A/D converter 43, the signal processing unit 44, and the coordinate extracting unit 45 operate in synchronization with one another. The coordinate extracting unit 45 outputs touch panel coordinates as a signal output Vout.

Module

Figure 7:
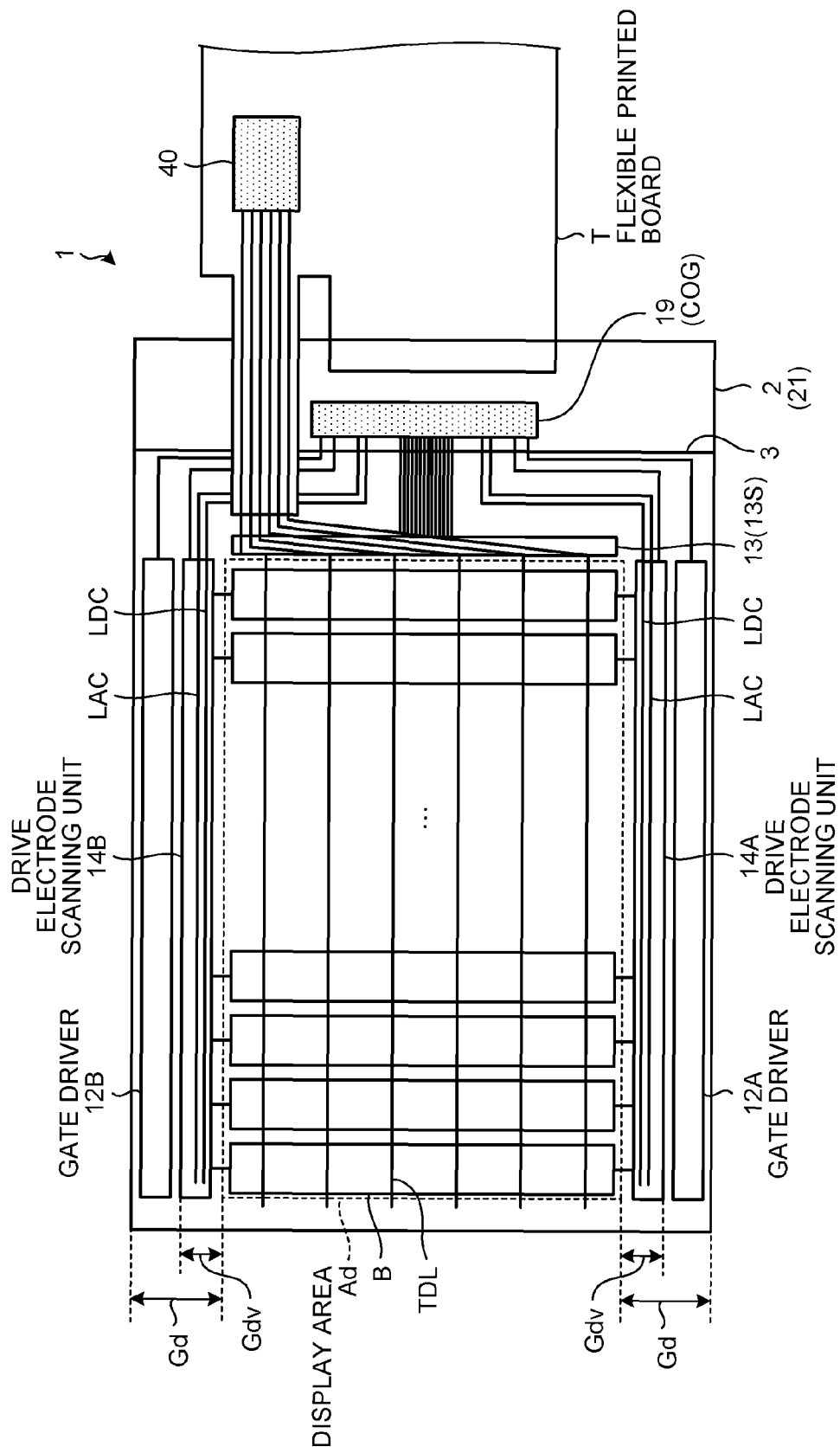
FIG. 7 is a view of an example of a module on which the display device with a touch detecting function according to the first embodiment is mounted.

FIG. 7 is a view of an example of a module on which the display device with a touch detecting function according to the first embodiment is mounted. As illustrated in FIG. 7, the display device 1 with a touch detecting function includes a pixel substrate 2 (TFT substrate 21) and a flexible printed board T (described later). A chip on glass (COG) 19 is mounted on the pixel substrate 2 (TFT substrate 21), and a display area Ad and a picture frame (peripheral) area Gd of the liquid crystal display unit 20 described above are formed thereon. The COG 19 is a chip of an IC driver mounted on the TFT substrate 21 and is a control device including circuits required for a display operation, such as the control unit 11 and the source driver 13 illustrated in FIG. 1. In the present embodiment, the source driver 13 and the source selector unit 13S described above are formed on the TFT substrate 21. The source driver 13 and the source selector unit 13S may be incorporated in the COG 19. Drive electrode scanning units 14A and 14B as part of the drive electrode driver 14 are formed on the TFT substrate 21. The gate driver 12 is formed as gate drivers 12A and 12B on the TFT substrate 21. The display device 1 with a touch detecting function may incorporate circuits such as the drive electrode scanning units 14A and 14B and the gate driver 12 in the COG 19.

FIG. 1 schematically illustrates the drive electrode block B of the drive electrode COML and the touch detection electrode TDL in the display unit 10 with a touch detecting function viewed in a direction perpendicular to the surface of the TFT substrate 21. The touch detection electrode TDL is formed to intersect with the drive electrode block B (drive electrode COML) in a grade separated manner. The display unit 10 with a touch detecting function includes, in a direction perpendicular to the surface of the TFT substrate 21, the drive electrode COML and a scanning line GCL (described later) that is formed to extend in a direction parallel to the drive electrode COML without intersecting therewith.

The drive electrode COML is divided into a plurality of stripe electrode patterns extending in one direction. When a touch detection operation is performed, the drive electrode driver 14 sequentially supplies the drive signal VcomAC to each of the electrode patterns. The stripe electrode patterns of the drive electrode COML to which the drive signals VcomAC are supplied at the same time are the drive electrode blocks B illustrated in FIG. 7. The drive electrode block B (drive electrode COML) is formed in a direction along one side of the display unit 10 with a touch detecting function, and the touch detection electrode TDL (described later) is formed in a direction along the other side of the display unit 10 with a touch detecting function. An output of the touch detection electrode TDL is arranged on a short-side side of the display unit 10 with a touch detecting function, and is coupled to the touch detection unit 40 mounted on the flexible printed board T via the flexible printed board T. In this way, the touch detection unit 40 is mounted on the flexible printed board T and coupled to each of the touch detection electrodes TDL that are arranged in parallel. The flexible printed board T may be any terminal and is not limited to the flexible printed board. In this case, the touch detection unit 40 is provided to the outside of the module.

Among the control unit 11, the source driver 13, and the drive electrode driver 14, a drive signal generation unit (described later) is mounted as the COG 19 on the pixel substrate 2. The source selector unit 13S is formed in the vicinity of the display area Ad on the TFT substrate 21 using a TFT element. In the display area Ad, a large number of pixels Pix (described later) are arranged in a matrix. The picture frame areas Gd and Gd are areas in which no pixel Pix is arranged viewed in a direction perpendicular to the surface of the TFT substrate 21. The gate driver 12 and the drive electrode scanning units 14A and 14B in the drive electrode driver 14 are arranged in the picture frame areas Gd and Gd.

The gate driver 12 includes the gate drivers 12A and 12B, and is formed on the TFT substrate 21 using TFT elements. The gate drivers 12A and 12B can drive the display area Ad from both sides across the display area Ad in which the sub-pixels SPix (pixels) (described later) are arranged in a matrix. In the following description, the gate driver 12A is referred to as a first gate driver 12A and the gate driver 12B is referred to as a second gate driver 12B. The scanning line GCL (described later) is arranged between the first gate driver 12A and the second gate driver 12B. The scanning line GCL (described later) is arranged so as to extend in a direction parallel to the extending direction of the drive electrode COML viewed in the direction perpendicular to the surface of the TFT substrate 21.

The drive electrode scanning units 14A and 14B are formed on the TFT substrate 21 using TFT elements. The drive electrode scanning units 14A and 14B receive the drive voltage for display VcomDC from the drive signal generation unit via wiring for display LDC, and receive the drive signal VcomAC via wiring for touch LAC. The drive electrode scanning units 14A and 14B occupy a certain width Gdv in the picture frame area Gd. The drive electrode scanning units 14A and 14B can drive each of the drive electrode blocks B arranged in parallel from both sides. The wiring for display LDC for supplying the drive voltage for display VcomDC and the wiring for touch LAC for supplying the drive signal for touch VcomAC are arranged in parallel in the picture frame areas Gd and Gd. The wiring for display LDC is arranged closer to the display area Ad side than the wiring for touch LAC. With this configuration, the drive voltage for display VcomDC supplied from the wiring for display LDC stabilizes a potential state at the end of the display area Ad. Accordingly, display is stabilized especially in a liquid crystal display unit using liquid crystals of a lateral electric-field mode.

The display device 1 with a touch detecting function illustrated in FIG. 7 outputs the touch detection signal Vdet described above from one side of the display unit 10 with a touch detecting function. Due to this, in the display device 1 with a touch detecting function, wiring can be easily routed in coupling to the touch detection unit 40 via the flexible printed board T as a terminal part.

Display Unit with a Touch Detecting Function

Figure 8:
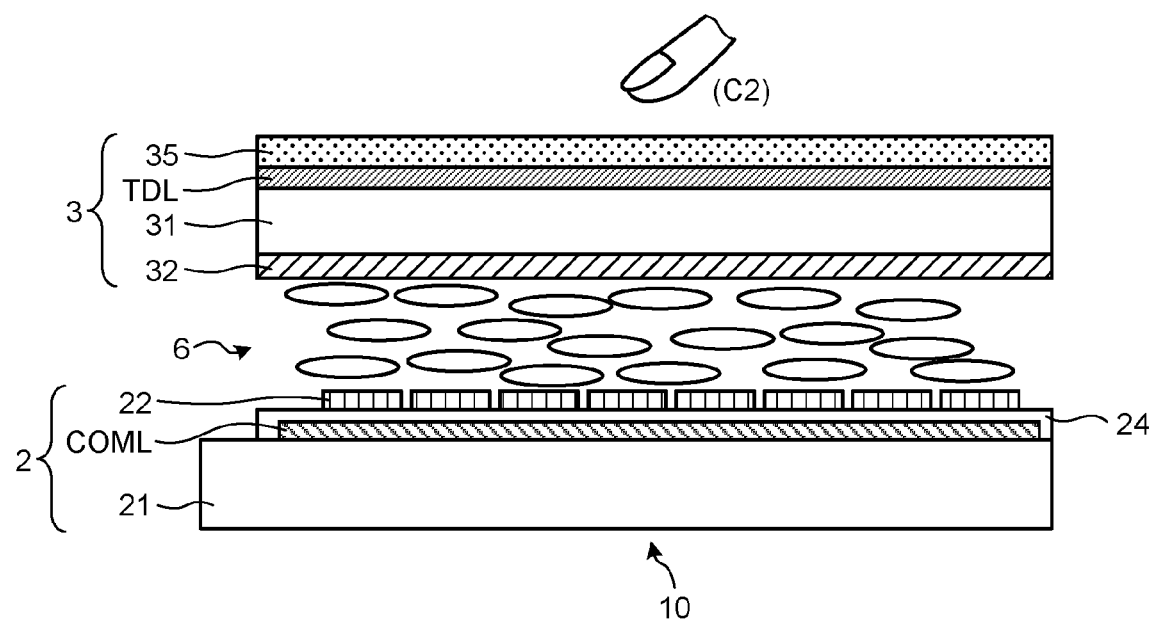
FIG. 8 is a sectional view of a schematic sectional structure of a display unit with a touch detecting function according to the first embodiment.
Figure 9:
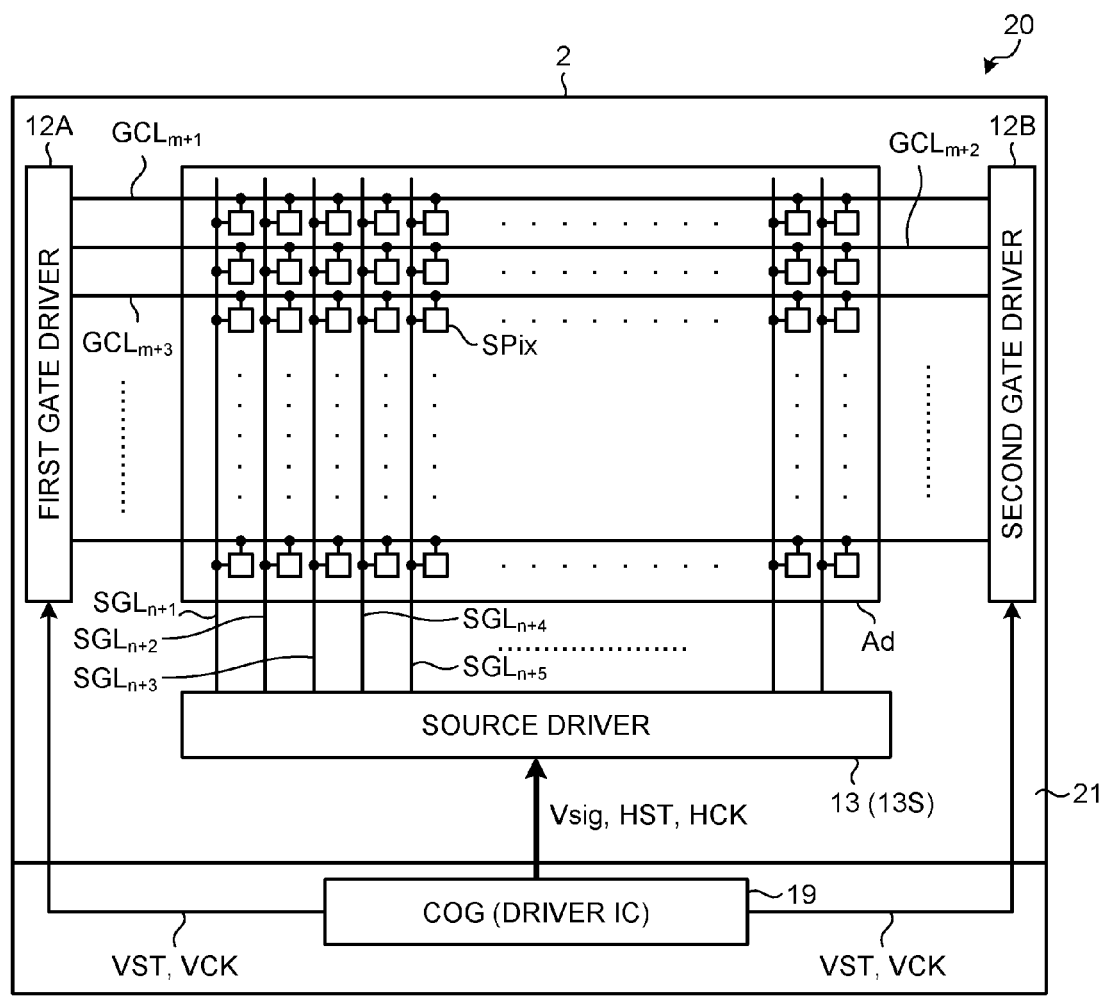
FIG. 9 is a diagram illustrating an example of a control device of the display device with a touch detecting function according to the first embodiment.
Figure 10:
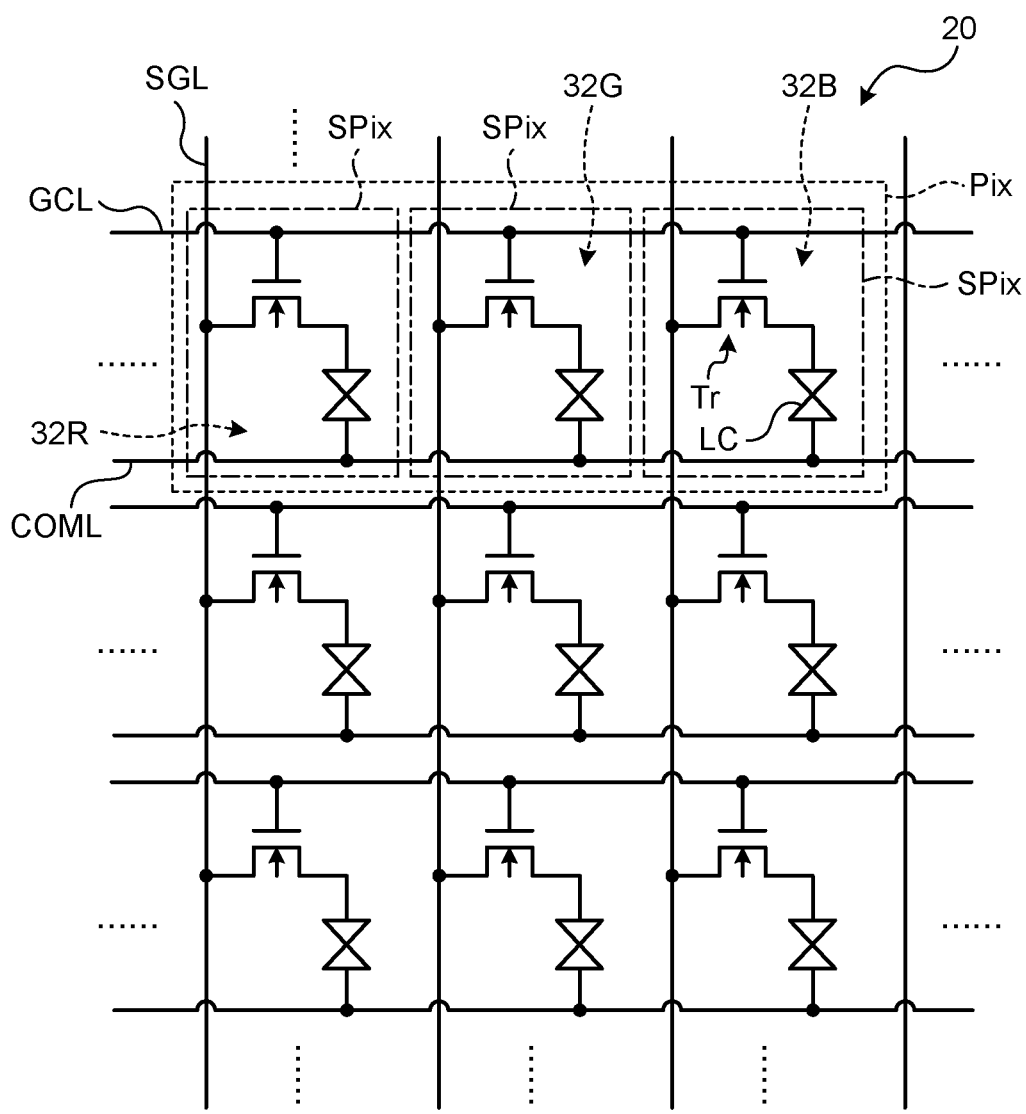
FIG. 10 is a circuit diagram of pixel arrangement of the display unit with a touch detecting function according to the first embodiment.

The following describes an exemplary configuration of the display unit 10 with a touch detecting function in greater detail. FIG. 8 is a sectional view of a schematic sectional structure of the display unit with a touch detecting function according to the first embodiment. FIG. 9 is a diagram illustrating an example of the control device of the display device with a touch detecting function according to the first embodiment. FIG. 10 is a circuit diagram representing a pixel array of the display unit with a touch detecting function according to the first embodiment.

As illustrated in FIG. 8, the display unit 10 with a touch detecting function includes a pixel substrate 2, a counter substrate 3, and a liquid-crystal layer 6. The counter substrate 3 is arranged in a manner facing the surface of the pixel substrate 2 in a perpendicular direction. The liquid-crystal layer 6 is inserted between the pixel substrate 2 and the counter substrate 3.

The liquid-crystal layer 6 modulates light passing therethrough depending on the state of an electric field. For example, the liquid-crystal layer 6 is a liquid-crystal display unit using liquid crystals of a lateral electric-field mode, such as a fringe field switching (FFS) mode or an in-plane switching (IPS) mode. An orientation film may be provided between the liquid-crystal layer 6 and the pixel substrate 2 and between the liquid-crystal layer 6 and the counter substrate 3 illustrated in FIG. 8.

The counter substrate 3 includes a glass substrate 31 and a color filter 32 formed on one surface of the glass substrate 31. The touch detection electrode TDL serving as the detection electrode of the touch detecting unit 30 is formed on the other surface of the glass substrate 31. A polarization plate 35 is provided on the touch detection electrode TDL.

The pixel substrate 2 includes the TFT substrate 21, a plurality of pixel electrodes 22, a plurality of drive electrodes COML, and an insulation layer 24. The TFT substrate 21 serves as a circuit board. The pixel electrodes 22 are arranged in a matrix on the TFT substrate 21. The drive electrodes COML are formed between the TFT substrate 21 and the pixel electrodes 22. The insulation layer 24 electrically insulates the pixel electrodes 22 from the drive electrodes COML.

System Configuration Example of Display Device

The pixel substrate 2 includes the display area Ad, the COG 19 serving as an interface (I/F) and a timing generator, the first gate driver 12A, the second gate driver 12B, and the source driver 13 on the TFT substrate 21. The flexible printed board T illustrated in FIG. 7 transmits an external signal to the COG 19 illustrated in FIG. 9 that is arranged as the COG 19 illustrated in FIG. 7, or driving power for driving the COG 19. The pixel substrate 2 is provided on the surface of the TFT substrate 21 as a transparent insulating substrate (for example, a glass substrate). The pixel substrate 2 includes the display area Ad in which a large number of pixels including liquid crystal cells are arranged in a matrix, the source driver (horizontal drive circuit) 13, and the gate drivers (vertical drive circuits) 12A and 12B. The gate drivers (vertical drive circuits) 12A and 12B are arranged at both sides of the display area Ad as the first gate driver 12A and the second gate driver 12B.

The display area Ad has a matrix structure in which the sub-pixels SPix including the liquid crystal layer 6 are arranged in m rows by n columns. In the specification, the row means a pixel row including m sub-pixels SPix arrayed in one direction. The column means a pixel column including n sub-pixels SPix arrayed in a direction orthogonal to the direction in which the row is arrayed. Values of m and n are determined corresponding to display resolution in a vertical direction and display resolution in a horizontal direction. In the display area Ad, with respect to the m rows by n columns of pixels Vpix, the scanning lines $GCL_{m+1}$, $GCL_{m+2}$, $GCL_{m+3}$ ... are wired for each row, and signal lines $SGL_{n+1}$, $SGL_{+2}$, $SGL_{n+3}$, $SGL_{n+4}$, $SGL_{n+5}$ ... are wired for each column. In the following embodiments, the scanning lines $GCL_{m+1}$, $GCL_{m+2}$, $GCL_{m+3}$ ... may be represented as the scanning line GCL, and the signal lines $SGL_{n+1}$, $SGL_{n+2}$, $SGL_{n+3}$, $SGL_{n+4}$, $SGL_{n+5}$ ... may be represented as the signal line SGL, in some cases.

A master clock, a horizontal synchronizing signal, and a vertical synchronizing signal as external signals are input to the pixel substrate 2 from the outside and are supplied to the COG 19. The COG 19 converts (boosts) level of the master clock, the horizontal synchronizing signal, and the vertical synchronizing signal with voltage amplitude of an external power supply into voltage amplitude of an internal power supply required for driving the liquid crystal. The COG 19 causes the master clock, the horizontal synchronizing signal, and the vertical synchronizing signal to pass through the timing generator, and generates a vertical start pulse VST, a vertical clock pulse VCK, a horizontal start pulse HST, and a horizontal clock pulse HCK. The COG 19 supplies the vertical start pulse VST and the vertical clock pulse VCK to the first gate driver 12A and the second gate driver 12B, and supplies the horizontal start pulse HST and the horizontal clock pulse HCK to the source driver 13. The COG 19 generates the drive voltage for display (counter electrode electric potential) VCOM that is given to each of the pixels in common with respect to the pixel electrode for each sub-pixel SPix and is called a common potential, and gives the drive voltage for display VCOM to the drive electrode COML.

The first gate driver 12A and the second gate driver 12B may include a shift register described later, and may further include a latch circuit and the like. When the vertical start pulse VST is supplied to the first gate driver 12A and the second gate driver 12B, the latch circuit sequentially samples and latches display data output from the COG 19 in synchronization with the vertical clock pulse VCK in one horizontal period. The first gate driver 12A and the second gate driver 12B sequentially output the digital data of one line latched by the latch circuit as a vertical scanning pulse to be supplied to the scanning line GCL so as to sequentially select the sub-pixels SPix row by row. The first gate driver 12A and the second gate driver 12B are arranged in the extending direction of the scanning line GCL so as to hold the scanning line GCL therebetween. The first gate driver 12A and the second gate driver 12B sequentially output the data from an upper side of the display area Ad, which is an upper direction of vertical scanning, to a lower side of the display area Ad, which is a lower direction of vertical scanning.

For example, 6-bit digital image signals Vsig of R (red), G (green), and B (blue) are supplied to the source driver 13. The source driver 13 writes display data, via the signal line SGL, into each of the sub-pixels SPix in a row selected by vertical scanning with the first gate driver 12A and the second gate driver 12B for each pixel, for a plurality of pixels, or for all of the pixels.

The TFT substrate 21 includes a thin-film transistor (TFT) element Tr of each sub-pixel SPix illustrated in FIG. 9 and FIG. 10 and wiring, such as a pixel signal line SGL and a scanning line GCL. The pixel signal line SGL supplies the pixel signal Vpix to each pixel electrode 22 illustrated in FIG. 8, whereas the scanning line GCL drives each TFT element Tr. Thus, the pixel signal line SGL extends on a plane parallel to the surface of the TFT substrate 21 and supplies the pixel signal Vpix used to display an image to a pixel. The liquid-crystal display unit 20 illustrated in FIG. 10 includes a plurality of sub-pixels SPix arranged in a matrix. The sub-pixel SPix includes a TFT element Tr and a liquid crystal element LC. The TFT element Tr is formed of a thin-film transistor, and specifically of an n-channel metal oxide semiconductor (MOS) TFT in this example. The source of the TFT element Tr is coupled to the pixel signal line SGL, the gate thereof is coupled to the scanning line GCL, and the drain thereof is coupled to a first end of the liquid-crystal element LC. The first end of the liquid-crystal element LC is coupled to the drain of the TFT element Tr, whereas a second end thereof is coupled to the drive electrode COML.

The first gate driver 12A and the second gate driver 12B illustrated in FIG. 9 applies the vertical scanning pulse to a gate of the TFT element Tr of the sub-pixel SPix via the scanning line GCL illustrated in FIG. 10 so as to sequentially select one row (one horizontal line) of the sub-pixels SPix formed in a matrix in the display area Ad as a display driving target. The source driver 13 supplies, via the SGL, the pixel signal Vpix to each of the sub-pixels SPix including one horizontal line that is sequentially selected by the first gate driver 12A and the second gate driver 12B. In these sub-pixels SPix, display for one horizontal line is performed corresponding to the supplied pixel signal Vpix. The drive electrode driver 14 applies the drive signal for display (drive voltage for display VcomDC) to drive the drive electrode COML.

As described above, in the display device 1 with a touch detecting function, one horizontal line is sequentially selected when the first gate driver 12A and the second gate driver 12B are driven to sequentially scan the scanning lines $GCL_{m+1}$, $GCL_{m-2}$, and $GCL_{m+3}$. In the display device 1 with a touch detecting function, the source driver 13 supplies the pixel signal to the pixel Vpix belonging to one horizontal line, so that display is performed for each horizontal line. When performing the display operation, the drive electrode driver 14 applies the drive signal Vcom to the drive electrode COML corresponding to the horizontal line.

In the color filter 32 illustrated in FIG. 8, color areas of the color filter colored in three colors of red (R), green (G), and blue (B) are periodically arranged, for example. Three color areas 32R, 32G, and 32B of R, G, and B (refer to FIG. 10) are associated, as a set of pixel Pix, with each of the sub-pixels SPix illustrated in FIG. 10 described above. The color filter 32 is opposed to the liquid crystal layer 6 in a direction perpendicular to the TFT substrate 21. The colors of the color filter 32 may be any other combination so long as they are colored in different colors.

The sub-pixel SPix illustrated in FIG. 10 is coupled to other sub-pixels SPix belonging to the same row in the liquid-crystal display unit 20 by the scanning line GCL. The scanning line GCL is coupled to the gate driver 12 and is supplied with the scanning signal Vscan from the gate driver 12. The sub-pixel SPix is further coupled to other sub-pixels SPix belonging to the same column in the liquid-crystal display unit 20 by the pixel signal line SGL. The pixel signal line SGL is coupled to the source driver 13 and is supplied with the pixel signal Vpix from the source driver 13.

Figure 11:
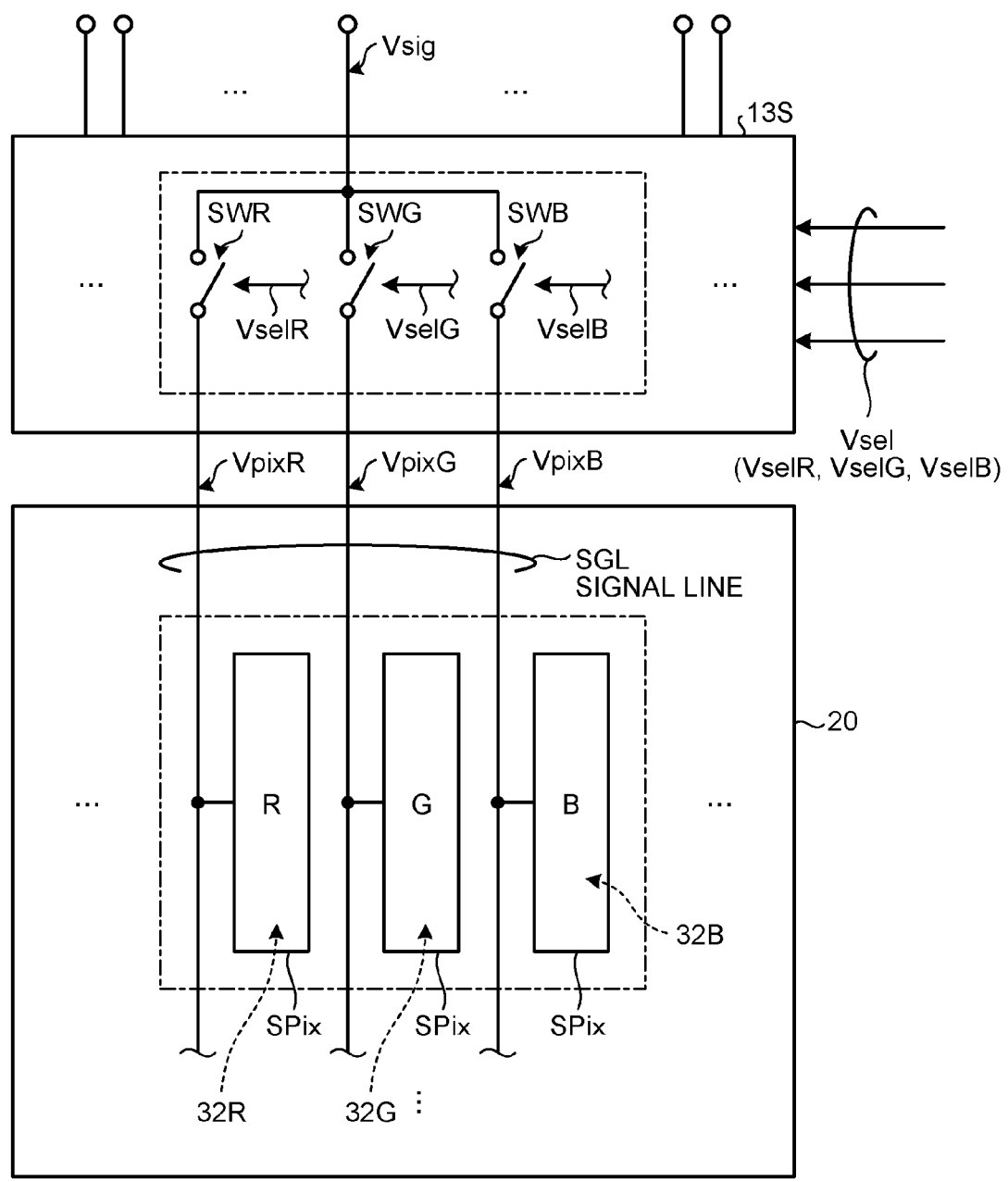
FIG. 11 is a schematic diagram for explaining a relation between a source driver and a pixel signal line in the module on which the display device with a touch detecting function according to the first embodiment is mounted.

FIG. 11 is a schematic diagram for explaining a relation between the source driver and the pixel signal line in the module on which the display device with a touch detecting function according to the first embodiment is mounted. As illustrated in FIG. 11, in the display device 1 with a touch detecting function, the pixel signal line SGL is coupled to the source driver 13 incorporated in the COG 19 described above via the source selector unit 13S. The source selector unit 13S is opened/closed corresponding to the switch control signal Vsel.

As illustrated in FIG. 11, the source driver 13 generates and outputs the pixel signal Vpix based on the image signal Vsig and a source driver control signal supplied from the control unit 11. The source driver 13 generates a pixel signal obtained by time-division multiplexing the pixel signals Vpix of a plurality of (three, in this example) sub-pixels SPix of the liquid crystal display unit 20 of the display unit 10 with a touch detecting function from the image signal Vsig for one horizontal line, and supplies the pixel signal to the source selector unit 13S. The source driver 13 also generates the switch control signals Vsel (VselR, VselG, VselB) required for separating the pixel signal Vpix multiplexed with the image signal Vsig, and supplies the switch control signals Vsel to the source selector unit 13S together with the image signal Vsig. This multiplexing reduces the number of pieces of wiring between the source driver 13 and the source selector unit 13S.

The source selector unit 13S separates the pixel signal Vpix that is time-division multiplexed with the image signal Vsig based on the image signal Vsig and the switch control signal Vsel supplied from the source driver 13, and supplies the pixel signal Vpix to the liquid crystal display unit 20 of the display unit 10 with a touch detecting function.

The source selector unit 13S includes, for example, three switches SWR, SWG, and SWB. First ends of the three switches SWR, SWG, and SWB are coupled to each other and the image signal Vsig is supplied thereto from the source driver 13. Each of the second ends of the three switches SWR, SWG, and SWB is coupled to the sub-pixel SPix via the pixel signal line SGL of the liquid crystal display unit 20 of the display unit 10 with a touch detecting function. Each of the three switches SWR, SWG, and SWB is controlled to be opened or closed with the switch control signals Vsel (VselR, VselG, VselB) supplied from the source driver 13. With this configuration, the source selector unit 13S can sequentially switches the switches SWR, SWG, and SWB in a time-division manner to be in an ON state corresponding to the switch control signal Vsel. The source selector unit 13S then separates the pixel signals Vpix (VpixR, VpixG, VpixB) from the multiplexed image signal Vsig. The source selector unit 13S supplies the pixel signal Vpix to each of the three sub-pixels SPix. Each of the color areas 32R, 32G, and 32B colored in three colors of red (R), green (G), and blue (B) described above is associated with the sub-pixel SPix. Accordingly, the pixel signal VpixR is supplied to the sub-pixel SPix corresponding to the color area 32R. The pixel signal VpixG is supplied to the sub-pixel SPix corresponding to the color area 32G. The pixel signal VpixB is supplied to the sub-pixel SPix corresponding to the color area 32B.

The sub-pixel SPix is coupled to the other sub-pixels SPix belonging to the same row in the liquid-crystal display unit 20 by the drive electrode COML. The drive electrode COML is coupled to the drive electrode driver 14 and is supplied with the drive voltage for display VcomDC from the drive electrode driver 14. In other words, a plurality of sub-pixels SPix belonging to the same row share the drive electrode COML in this example.

The gate driver 12 illustrated in FIG. 1 applies the scanning signal Vscan to the gate of the TFT element Tr of a sub-pixel SPix via the scanning line GCL illustrated in FIG. 10. Thus, the gate driver 12 sequentially selects a row (a horizontal line) out of the sub-pixels SPix arranged in a matrix in the liquid-crystal display unit 20 as a target of display drive. The source driver 13 illustrated in FIG. 1 supplies the pixel signal Vpix to each of the sub-pixels SPix constituting the horizontal line sequentially selected by the gate driver 12 via the pixel signal line SGL illustrated in FIG. 10. These sub-pixels SPix perform display of the horizontal line based on the supplied pixel signal Vpix. The drive electrode driver 14 illustrated in FIG. 1 applies the drive signal Vcom, thereby driving the drive electrodes COML of each drive electrode block B composed of a predetermined number of drive electrodes COML illustrated in FIG. 7 and FIG. 9.

As described above, the gate driver 12 drives so as to perform time-division sequential scanning on the scanning line GCL, whereby the liquid-crystal display unit 20 sequentially selects a horizontal line. The source driver 13 supplies the pixel signal Vpix to the sub-pixels SPix belonging to the horizontal line, whereby the liquid-crystal display unit 20 performs display of the horizontal line. To perform the display operation, the drive electrode driver 14 applies the drive voltage for display VcomDC to a drive electrode block B including the drive electrodes COML corresponding to the horizontal line.

Figure 12:
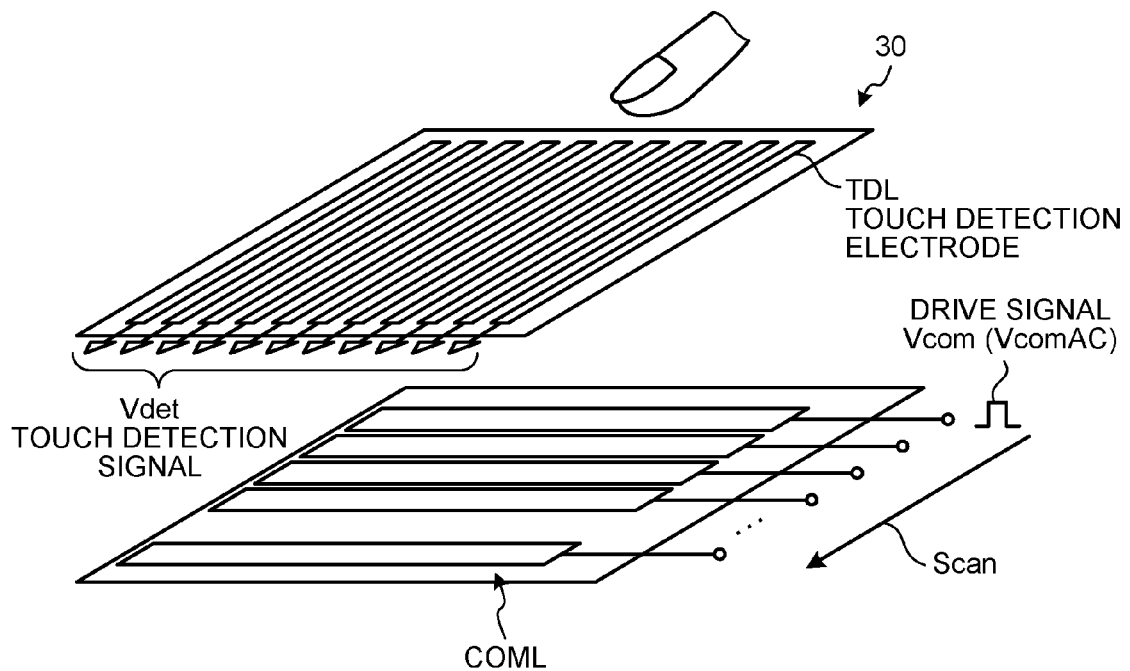
FIG. 12 is a perspective view of an exemplary configuration of drive electrodes and touch detection electrodes of the display unit with a touch detecting function according to the first embodiment.

The drive electrode COML according to the present embodiment functions as a drive electrode of the liquid-crystal display unit 20 and as a drive electrode of the touch detecting unit 30. FIG. 12 is a perspective view of an exemplary configuration of the drive electrodes and the touch detection electrodes of the display unit with a touch detecting function according to the first embodiment. The drive electrodes COML illustrated in FIG. 12 face the pixel electrodes 22 in the direction perpendicular to the surface of the TFT substrate 21 as illustrated in FIG. 8. The touch detecting unit 30 includes the drive electrodes COML provided to the pixel substrate 2 and the touch detection electrodes TDL provided to the counter substrate 3. The touch detection electrodes TDL are formed into stripe electrode patterns extending in a direction intersecting with the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled to the respective inputs of the touch detection signal amplifier 42 of the touch detecting unit 40. The electrode patterns of the drive electrodes COML and the touch detection electrodes TDL intersecting with each other generate capacitance at the intersections. The touch detection electrode TDL or the drive electrode COML (drive electrode block B) are not limited to the shape that is divided into a plurality of stripes. For example, the touch detection electrode TDL or the drive electrode COML (drive electrode block B) may have a comb-teeth shape. Alternatively, the touch detection electrode TDL or the drive electrode COML (drive electrode block B) may be divided into a plurality of pieces, and a shape of a slit that divides the drive electrode COML may be a straight line or a curved line.

With this configuration, the touch detecting unit 30 performs a touch detection operation by driving the drive electrode driver 14 so as to perform time-division line-sequential scanning on a drive electrode block B illustrated in FIG. 7. Accordingly, the drive electrode block B (one detection block) of the drive electrodes COML is sequentially selected in a scanning direction Scan. The touch detecting unit 30 then outputs the touch detection signal Vdet from the touch detection electrode TDL. Thus, the touch detecting unit 30 performs touch detection in the detection block.

Figure 13:
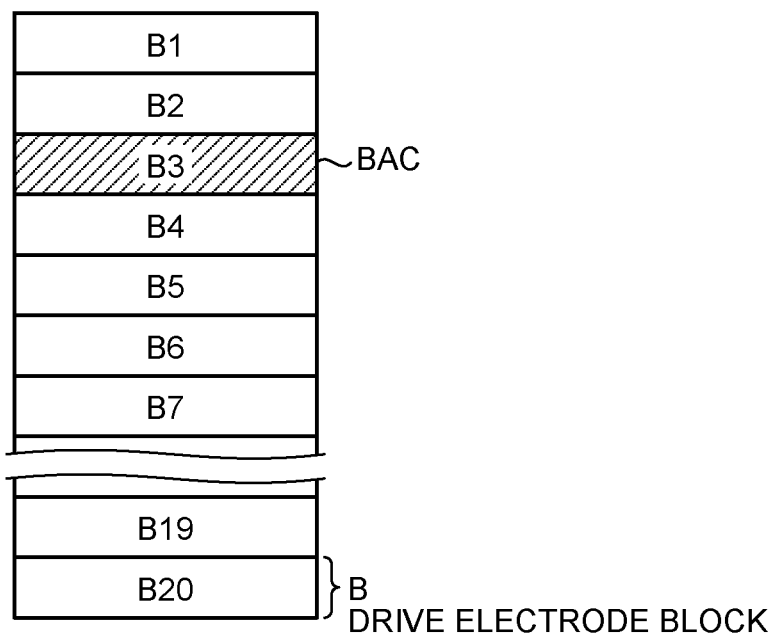
FIG. 13 is a schematic diagram representing an operation example of touch detection in the display device with a touch detecting function according to the first embodiment.
Figure 14:
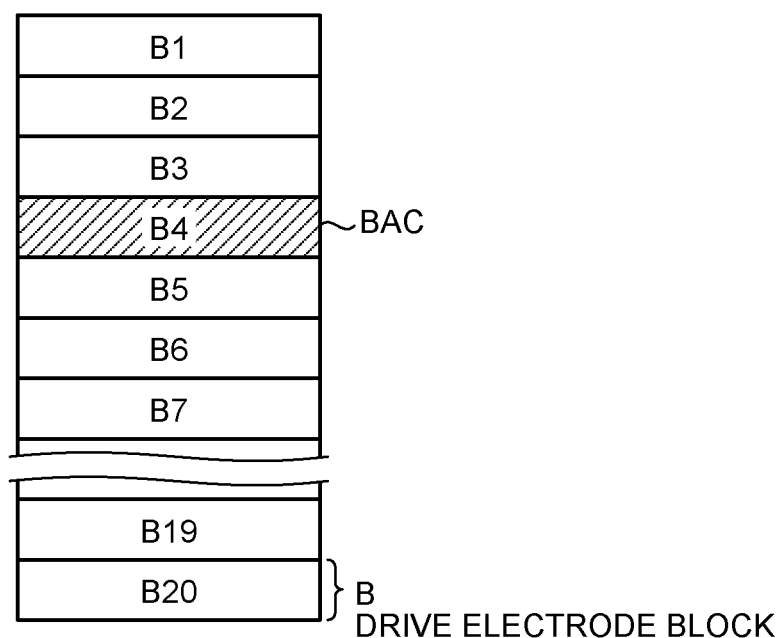
FIG. 14 is a schematic diagram representing an operation example of touch detection in the display device with a touch detecting function according to the first embodiment.
Figure 15:
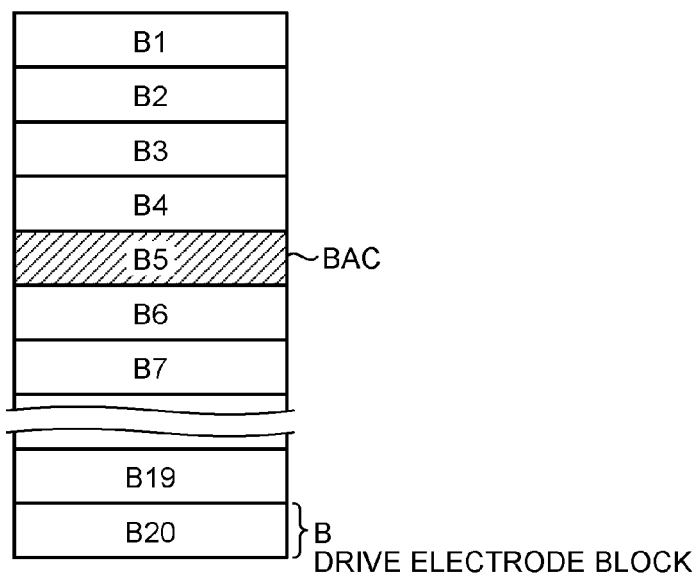
FIG. 15 is a schematic diagram representing an operation example of touch detection in the display device with a touch detecting function according to the first embodiment.

FIG. 13, FIG. 14, and FIG. 15 are schematic diagrams representing an operation example of touch detection in the display device with a touch detecting function according to the first embodiment. FIG. 13, FIG. 14, and FIG. 15 illustrates an applying operation of the drive signal for touch VcomAC to each of drive electrode blocks B1 to B20 in a case in which the drive electrode blocks B of the drive electrode COML illustrated in FIG. 7 are twenty drive electrode blocks B1 to B20. A drive signal application block BAC indicates the drive electrode block B to which the drive signal for touch VcomAC is applied, and other drive electrode blocks B are in a state in which voltage is not applied thereto and electric potential is not fixed, that is, a floating state. The drive signal application block BAC indicates the drive electrode block B to which the drive signal for touch VcomAC is applied, and other drive electrode blocks B may be in a state in which the drive voltage for display VcomDC is applied thereto and the electric potential is fixed. The drive electrode driver 14 illustrated in FIG. 1 selects the drive electrode block B3 from among the drive electrode blocks B to be targets of the touch detection operation illustrated in FIG. 13, and applies the drive signal for touch VcomAC thereto. Next, the drive electrode driver 14 selects the drive electrode block B4 from among the drive electrode blocks B illustrated in FIG. 14, and applies the drive signal for touch VcomAC thereto. Subsequently, the drive electrode driver 14 selects the drive electrode block B5 from among the drive electrode blocks B illustrated in FIG. 15, and applies the drive signal for touch VcomAC thereto. In this way, the drive electrode driver 14 sequentially selects the drive electrode blocks B and applies the drive signal for touch VcomAC thereto to scan the entire drive electrode blocks B. The number of drive electrode blocks B is not limited to twenty.

In the touch detection unit 30, one of the drive electrode blocks B illustrated in FIG. 13 to FIG. 15 corresponds to a drive electrode E1 in a basic principle of the capacitive touch detection described above. In the touch detection unit 30, one of the touch detection electrodes TDL corresponds to a touch detection electrode E2. The touch detection unit 30 is configured to detect a touch according to the basic principle described above. As illustrated in FIG. 12, the electrode patterns intersecting with each other form a capacitive touch sensor in a matrix. Scanning the entire touch detection surface of the touch detecting unit 30 enables detection of the position where the external contiguous object is in contact or in contiguity with the device.

The display unit 10 with a touch detecting function drives the gate driver 12 to perform line-sequential scanning on the scanning line GCL in a time division manner to perform display scanning. The display unit 10 with a touch detecting function performs touch detection scanning, an operation of which is completed when the drive electrode driver 14 sequentially selects and drives each of the drive electrode blocks B. For example, a touch detection scanning Scant is performed at a scanning speed of two times that of a display scanning Scand. In this way, in the display device 1 with a touch detecting function, the scanning speed in touch detection is caused to be faster than the scanning speed in display to immediately respond to a touch by an external contiguous object approaching from the outside, so that a response characteristic with respect to the touch detection can be improved. A relation between the touch detection scanning and the display scanning is not limited thereto. For example, the touch detection scanning may be performed at a scanning speed two or more times faster than that of the display scanning, or may be performed at a scanning speed not faster than the speed of two times that of the display scanning.

Drive Signal Generation Unit and Drive Electrode Driver

Figure 16:
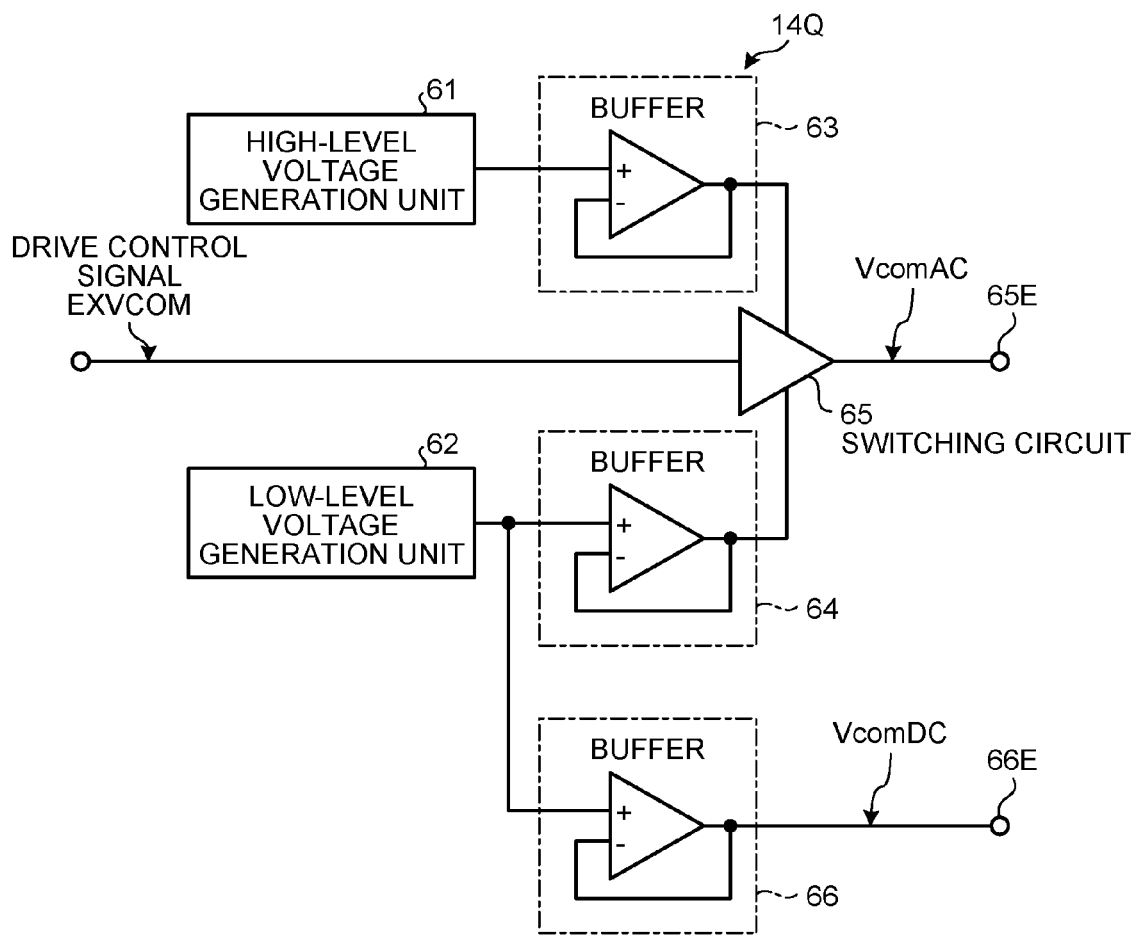
FIG. 16 is a block diagram illustrating a drive signal generation unit of a drive electrode driver according to the first embodiment.

FIG. 16 is a block diagram illustrating the drive signal generation unit of the drive electrode driver according to the first embodiment. A drive signal generation unit 14Q includes a high-level voltage generation unit 61, a low-level voltage generation unit 62, buffers 63, 64, and 66, and a switching circuit 65.

The high-level voltage generation unit 61 generates a high-level voltage of the drive signal for touch VcomAC. The low-level voltage generation unit 62 generates a direct current voltage of the drive voltage for display VcomDC. The voltage generated by the low-level voltage generation unit 62 is also used as a low-level voltage of the drive signal for touch VcomAC. The buffer 63 outputs the voltage supplied from the high-level voltage generation unit 61 while performing impedance conversion thereon, and supplies the voltage to the switching circuit 65. The buffer 64 outputs the voltage supplied from the low-level voltage generation unit 62 while performing impedance conversion thereon, and supplies the voltage to the switching circuit 65. The switching circuit 65 alternately repeats a case in which a drive control signal EXVCOM is high-level and a case in which the drive control signal EXVCOM is low-level based on the drive control signal EXVCOM, and generates the drive signal for touch VcomAC. The switching circuit 65 outputs the voltage supplied from the buffer 63 when the drive control signal EXVCOM is high-level, and outputs the voltage supplied from the buffer 64 when the drive control signal EXVCOM is low-level. The switching circuit 65 outputs the voltage supplied from the buffer 64 as the direct current voltage of the drive voltage for display VcomDC when the drive control signal EXVCOM is low-level, based on the drive control signal EXVCOM. The buffers 63 and 64 include, for example, a voltage follower. The voltage from the switching circuit 65 is output to an output terminal 65E. The buffer 66 outputs the voltage supplied from the low-level voltage generation unit 62 while performing impedance conversion thereon, and supplies the direct current voltage of the drive voltage for display VcomDC to the output terminal 66E.

Figure 17:
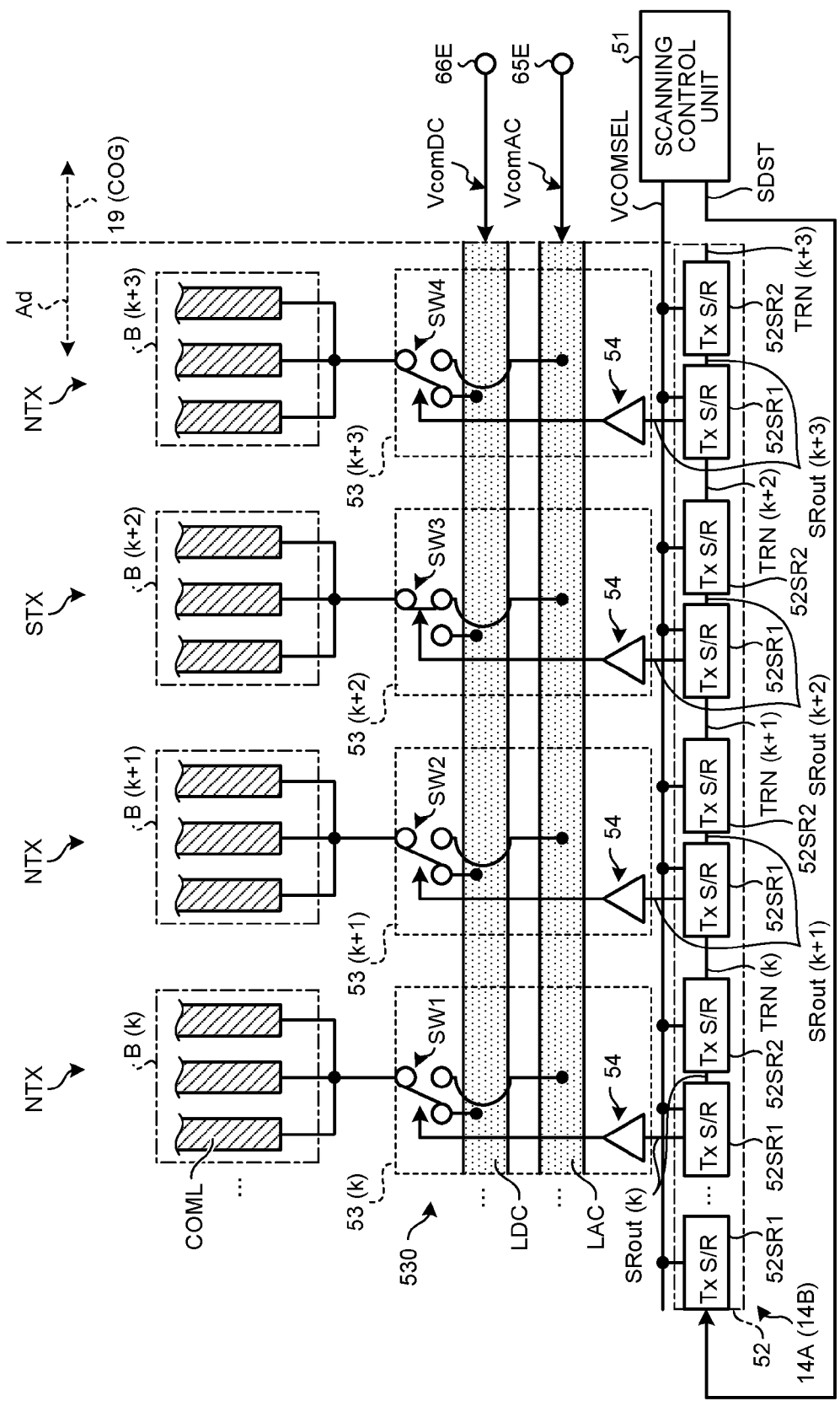
FIG. 17 is a block diagram illustrating the drive electrode driver according to the first embodiment.
Figure 18:
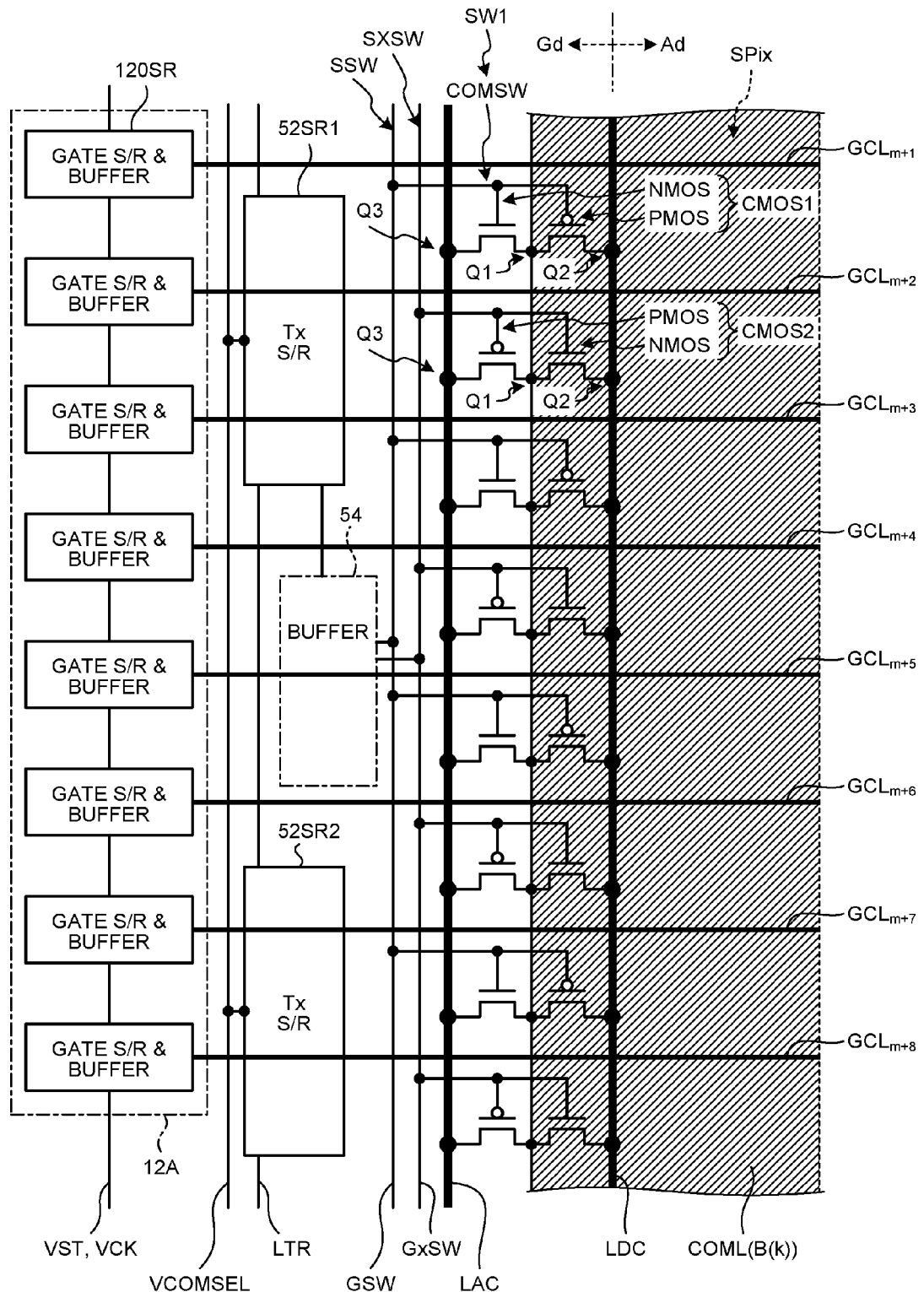
FIG. 18 is a block diagram illustrating a drive unit of the drive electrode driver according to the first embodiment.
Figure 19:
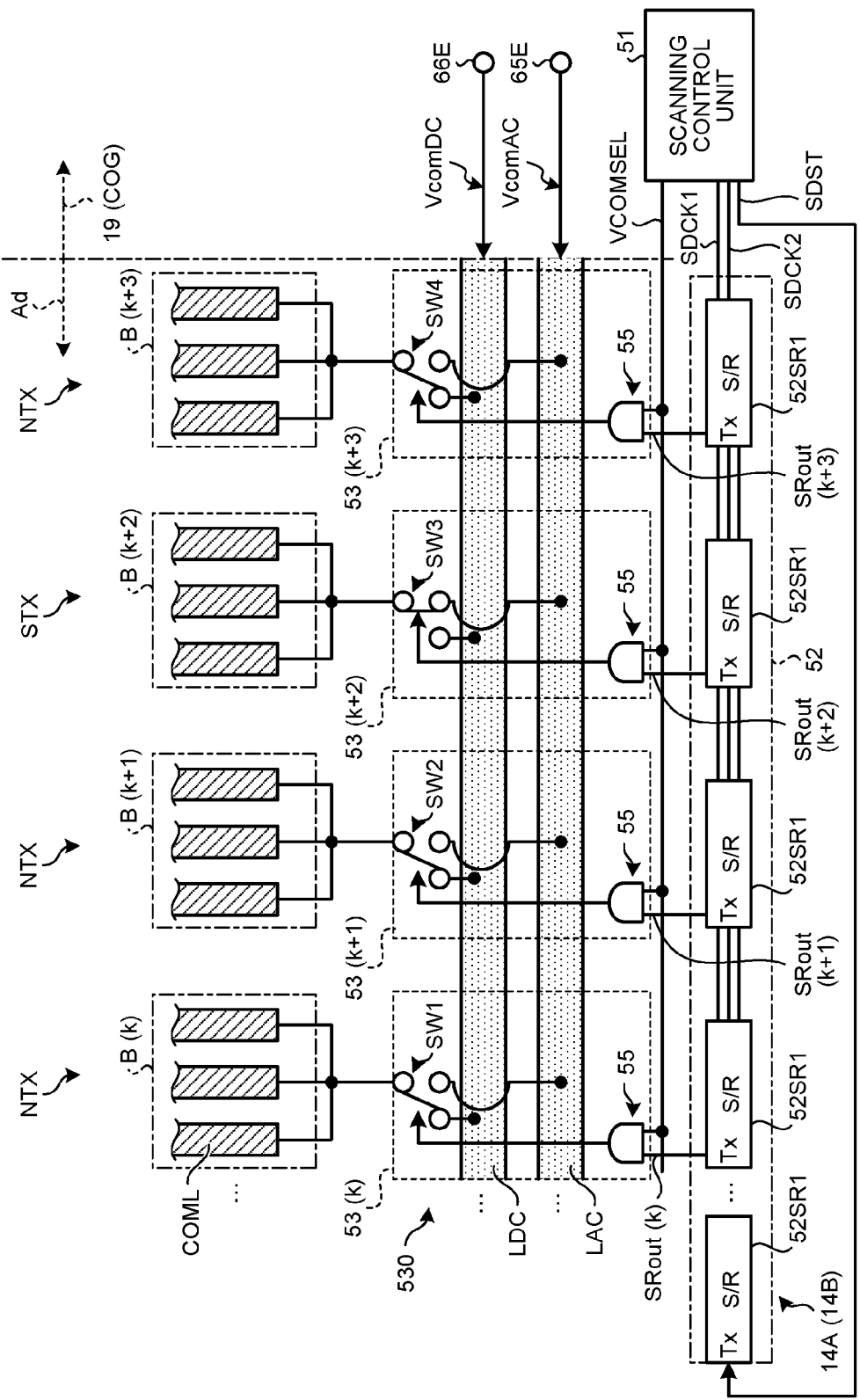
FIG. 19 is a block diagram illustrating a drive electrode driver according to a comparative example.
Figure 20:
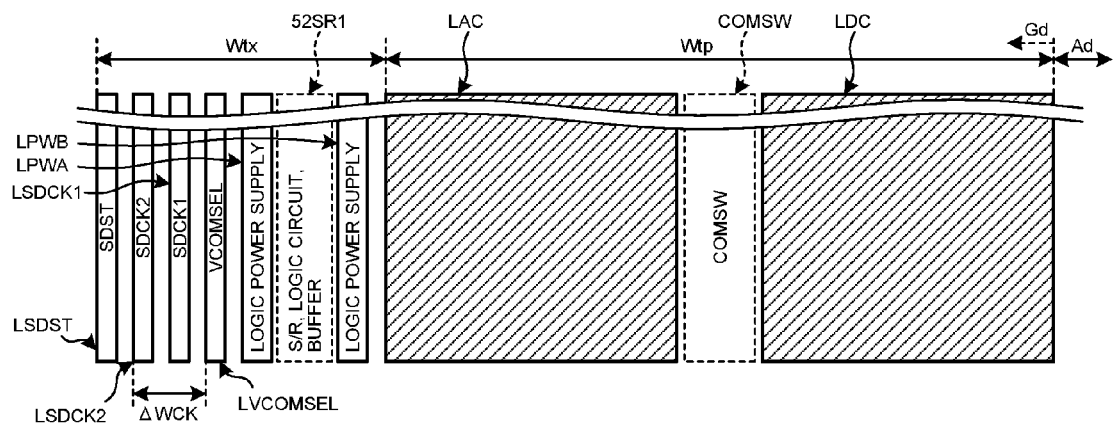
FIG. 20 is an explanatory diagram schematically illustrating a width of wiring for touch in a picture frame (peripheral) according to the comparative example.
Figure 21:
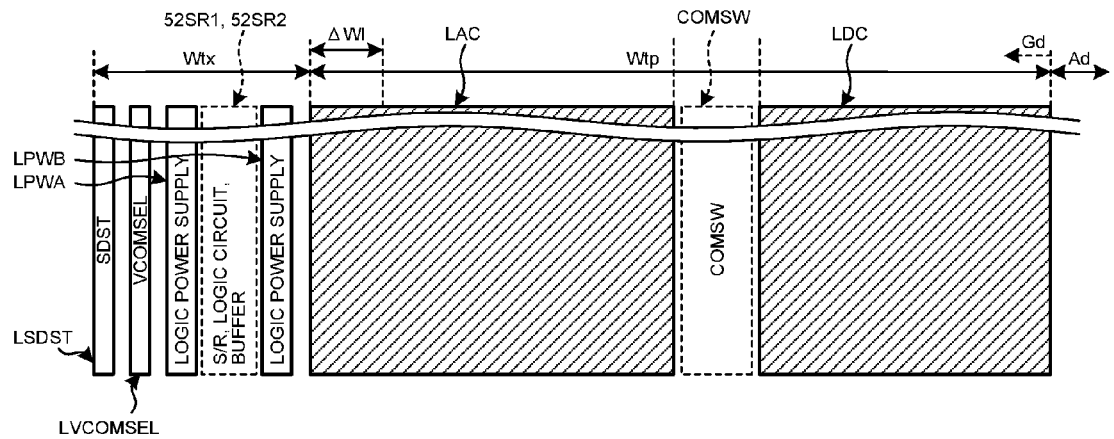
FIG. 21 is an explanatory diagram schematically illustrating a width of a wiring for touch in a picture frame according to the first embodiment.

FIG. 17 is a block diagram illustrating the drive electrode driver according to the first embodiment. FIG. 18 is a block diagram illustrating a drive unit of the drive electrode driver according to the first embodiment. FIG. 19 is a block diagram illustrating a drive electrode driver according to a comparative example. FIG. 20 is an explanatory diagram schematically illustrating a width of wiring for touch in a picture frame according to the comparative example. FIG. 21 is an explanatory diagram schematically illustrating the width of the wiring for touch in the picture frame according to the first embodiment.

As illustrated in FIG. 17, the drive electrode scanning units 14A and 14B include a scanning control unit 51, a touch detection scanning unit 52, and a drive unit 530. The drive unit 530 includes drive units 53(k) to 53(k+3) the number of which is the same as that of the drive electrode blocks B. The scanning control unit 51 is mounted on the COG 19. The touch detection scanning unit 52 and the drive unit 530 are arranged in the picture frame at the periphery of the display area Ad. Hereinafter, to indicate any one of the drive units 53(k) to 53(k+3), a "drive unit 53" is simply referred to.

The scanning control unit 51 supplies a control signal SDCK and a scanning start signal SDST to the touch detection scanning unit 52 based on the control signal supplied from the control unit 11. The drive voltage for display VcomDC output from the drive signal generation unit 14Q via the output terminal 66E is supplied to the wiring for display LDC. The drive signal for touch VcomAC output from the drive signal generation unit 14Q via the output terminal 65E is supplied to the wiring for touch LAC. The scanning control unit 51 supplies, to the drive unit 530, a drive electrode selection signal VCOMSEL to which the drive signal for touch VcomAC is supplied from the drive signal generation unit 14Q. The drive electrode selection signal VCOMSEL is a signal for identifying a period in which the drive signal for touch VcomAC is supplied from the drive signal generation unit 14Q to the drive electrode COML, that is, a touch detection period.

The touch detection scanning unit 52 includes a shift register for a drive electrode (first transfer circuit) 52SR1 and a shift register for a drive electrode (second transfer circuit) 52SR2 serving as transfer circuits. The shift register 52SR1 generates transfer circuit outputs SRout(k), SRout(k+1), SRout(k+2), SRout(k+3) . . . for selecting the drive electrode COML to which the drive signal for touch VcomAC is applied. Specifically, the touch detection scanning unit 52 causes the scanning start signal SDST as a trigger supplied from the scanning control unit 51 to the shift register 52SR1 to be synchronized with the drive electrode selection signal VCOMSEL so as to be sequentially transferred to the shift register 52SR2 next to the shift register 52SR1 and be sequentially selected. The shift register 52SR2 generates transfer circuit outputs TRN(k), TRN(k+1), TRN(k+2), TRN(k+3) . . . as idle transfer signals, and transfers the outputs to the next shift register 52SR1.

Herein, the idle transfer means that the transfer circuit output (shift register output) is not utilized for controlling a selection switch SW1 (SW2, SW3, SW4) and the like, and is input to a transfer circuit in the next stage or a transfer circuit to be coupled next.

The shift register 52SR1 selected in synchronization with the drive electrode selection signal VCOMSEL sends out the transfer circuit outputs SRout(k), SRout(k+1), SRout(k+2), SRout(k+3) . . . to each amplification circuit 54 of the drive unit 530. In the touch detection scanning unit 52, for example, when the selected shift register 52SR supplies a high-level signal as the k+2-th transfer circuit output SRout (k+2) to the k+2-th drive unit 53(k+2), the drive unit 53(k+2) applies the drive signal for touch VcomAC to a plurality of drive electrodes COML belonging to the k+2-th drive electrode block B(k+2). Hereinafter, to indicate any one of the transfer circuit outputs SRout(k), SRout(k+1), SRout(k+2), SRout(k+3) . . . , a "transfer circuit output SRout" may be used. To indicate any of the transfer circuit outputs TRN(k), TRN(k+1), TRN(k+2), TRN(k+3) . . . , a "transfer circuit output TRN" may be used.

The drive unit 530 is a circuit for applying the drive voltage for display VcomDC or the drive signal for touch VcomAC supplied from the drive signal generation unit 14Q to the drive electrode COML based on the transfer circuit output SRout supplied from the touch detection scanning unit 52 and the drive electrode selection signal VCOMSEL supplied from the scanning control unit 51. Each drive unit 53 is provided corresponding to each output signal from the touch detection scanning unit 52, and applies the drive signal Vcom to the corresponding drive electrode block B.

The drive unit 53 includes the amplification circuit 54 and the selection switch SW1 (SW2, SW3, SW4) for each drive electrode block B. The transfer circuit output SRout supplied from the shift register 52SR1 can control an operation of the selection switch SW1 (SW2, SW3, SW4) via the amplification circuit 54 having a buffer function for amplifying the output to an amplitude level. That is, the operation of the selection switch SW1 (SW2, SW3, SW4) is controlled based on the signal supplied from the shift register 52SR1. One end of the selection switch SW1 (SW2, SW3, SW4) is coupled to the drive electrodes COML included in the drive electrode block B, and the other end of the selection switch SW1 is coupled to one of the wiring for display LDC and the wiring for touch LAC.

With this configuration, the drive unit 53 outputs the drive signal for touch VcomAC as the drive signal Vcom when the transfer circuit output SRout is high-level and the drive electrode selection signal VCOMSEL is high-level. The drive unit 53 separates the drive electrode block B from the wiring for touch LAC to be coupled to the wiring for display LDC when transfer circuit output SRout is low-level and the drive electrode selection signal VCOMSEL is low-level. Herein, the drive electrode block B selected as an output destination of the drive signal for touch VcomAC is a selection drive electrode block STX. The drive electrode block B that is not selected as the output destination of the drive signal for touch VcomAC is a non-selection drive electrode block NTX. For example, the drive unit 53(k+2) illustrated in FIG. 17 applies the drive signal for touch VcomAC to the drive electrodes COML belonging to the k+2-th drive electrode block B(k+2), so that the selection drive electrode block STX is the drive electrode block B(k+2). The drive electrode blocks B(k), B(k+1), and B(k+3) that are not selected as the output destination of the drive signal for touch VcomAC are non-selection drive electrode blocks NTX.

When the liquid crystal display unit 20 performs a display operation, the transfer circuit output SRout of the drive unit 53 is low-level, and the drive unit 53 couples each selection switch SW1 (SW2, SW3, SW4) to the wiring for display LDC for each drive electrode block B to output the drive voltage for display VcomDC as the drive signal Vcom.

FIG. 18 is a block diagram illustrating the drive unit of the drive electrode driver according to the first embodiment. Although FIG. 18 illustrates a configuration of the first gate driver 12A, a configuration of the second gate driver 12B is similar thereto. Although the following describes the selection switch SW1 as a representative, each of the selection switches SW2, SW3, and SW4 is similar thereto. The first gate driver 12A (second gate driver 12B) includes a gate shift register 120SR. The gate shift register 120SR starts an operation in response to the vertical start pulse VST, is sequentially selected in a vertical scanning direction in synchronization with a vertical clock VCK, and outputs a vertical selection pulse to the scanning line GCL via a buffer circuit. As illustrated in FIG. 18, the size of the gate shift register 120SR increases corresponding to the number of sub-pixels SPix. Accordingly, one drive electrode COML overlaps with a plurality of sub-pixels SPix in a direction intersecting with a direction in which the scanning line GCL extends, which is a direction in which the wiring for touch LAC extends. As a result, the number of the gate shift registers 120SR for scanning the sub-pixels SPix overlapping with one drive electrode COML in the direction in which the wiring for touch LAC extends becomes larger than the number of shift registers 52SR1 for a drive electrode. As illustrated in FIG. 18, the shift register 52SR1 for a drive electrode and the shift register 52SR2 for a drive electrode are arranged side by side because there is a space in the direction in which the wiring for touch LAC extends. Due to this, the shift register 52SR2 for a drive electrode can be formed in the picture frame area Gd in addition to the shift register 52SR1 for a drive electrode without increasing the picture frame area Gd.

The selection switch SW1 includes a plurality of switches COMSW for each drive electrode COML. All of the switches COMSW operate corresponding to switch control signals Ssw and Sxsw for each drive electrode COML. All of the switches COMSW operate for each drive electrode COML to select any one of coupling between the wiring for touch LAC and the drive electrode COML and coupling between the wiring for display LDC and the drive electrode COML in a time-division manner.

In the switch COMSW, for example, when a CMOS switch CMOS1 and a CMOS switch CMOS2 are assumed to be one circuit unit, a plurality of circuit units are provided for each drive electrode COML. Each of the CMOS switch CMOS1 and the CMOS switch CMOS2 includes a transistor NMOS having an N-channel gate and a transistor PMOS having a P-channel gate.

In the CMOS switch CMOS1, a switch signal line GSW is coupled to the gates of the transistor NMOS and the transistor PMOS. In the CMOS switch CMOS2, a switch signal line GxSW is coupled to the gates of the transistor NMOS and the transistor PMOS. The switch control signal Ssw supplied to the switch signal line GSW and the switch control signal Sxsw supplied to the switch signal line GxSW are signals in which the electric potential is reversed between high-level and low-level. Due to this, the CMOS switch CMOS1 and the CMOS switch CMOS2 can perform the same selection by synchronizing any one of the coupling between the wiring for touch LAC and the drive electrode COML and the coupling between the wiring for display LDC and the drive electrode COML. In this way, the selection switch SW1 includes the switches COMSW for each drive electrode COML, and the switches COMSW are coupled in parallel between the wiring for touch LAC and the drive electrode COML. All of the switches COMSW operate for each drive electrode COML corresponding to the switch control signals Ssw and Sxsw serving as selection signals, couple the wiring for touch LAC to the drive electrode COML, and apply the drive signal for touch VcomAC.

The amplification circuit 54 includes an inverter, a switching circuit, and a buffer. The inverter outputs inverted logic of the transfer circuit output SRout at a selected transfer stage among the shift registers 52SR1 for a drive electrode when the transfer circuit output SRout is high-level. The amplification circuit 54 switches from the input and the output of the inverter corresponding to the drive electrode selection signal VCOMSEL and outputs the switch control signal Ssw to the buffer. The buffer amplifies the switch control signal Ssw to be supplied to the switch signal line GSW. The inverter generates the inverted logic of the switch control signal Ssw output from the buffer and outputs the inverted logic as the switch control signal Sxsw to be supplied to the switch signal line GxSW.

The CMOS switches CMOS1 and CMOS2 are coupled to the wiring for touch LAC with a coupling conductor Q3. The CMOS switches CMOS1 and CMOS2 are coupled to the wiring for display LDC with a coupling conductor Q2. The CMOS switches CMOS1 and CMOS2 are coupled to the drive electrode COML with the coupling conductor Q1. In the CMOS switches CMOS1 and CMOS2, when the switch control signals Ssw and Sxsw are input to the gates of the transistor NMOS and the transistor PMOS, any one of the coupling between the coupling conductor Q1 and the coupling conductor Q2 and the coupling between the coupling conductor Q3 and the coupling conductor Q1 can be selected.

As illustrated in FIG. 18, basically, the scanning line GCL is wired in the same layer as the switch signal lines GSW and GxSW. At an intersecting portion of the scanning line GCL and the switch signal lines GSW and GxSW, they intersect with each other in a grade separated manner via an insulating layer. The scanning line GCL is a gate line of the same transistor as the switch signal lines GSW and GxSW. A manufacturing process of the scanning line GCL can be shortened by being formed through the same process as the switch signal lines GSW and GxSW. The scanning line GCL intersects with the wiring for touch LAC and the wiring for display LDC in a grade separated manner via the insulating layer. The selection switch SW1 is arranged in an area between the scanning lines GCL intersecting with the wiring for touch LAC (wiring for display LDC) (for example, between the scanning line $GCL_{m+1}$ and the scanning line $GCL_{m+2}$). A space between the scanning lines GCL intersecting with the wiring for touch LAC (wiring for display LDC) is the same as a space between the scanning lines GCL adjacent to each other in the display area Ad.

Comparative Example

As illustrated in FIG. 19, the touch detection scanning unit 52 includes the shift register 52SR1 for a drive electrode serving as a transfer circuit, and does not include the shift register 52SR2 for a drive electrode. The shift register 52SR1 for a drive electrode generates transfer circuit outputs SRout(k), SRout(k+1), SRout(k+2), SRout(k+3) . . . for selecting the drive electrode COML to which the drive signal for touch VcomAC is applied. Specifically, the touch detection scanning unit 52 causes the scanning start signal SDST as a trigger supplied from the scanning control unit 51 to the shift register 52SR1 to be synchronized with control signals SDCK1 and SDCK2 so as to be sequentially transferred for each transfer stage of the shift register 52SR2 and be sequentially selected. The selected shift register 52SR sends out the transfer circuit outputs SRout(k), SRout(k+1), SRout(k+2), SRout(k+3) . . . to each logic circuit 55 of the drive unit 530. The logic circuit 55 generates and outputs a logical product (AND) of the transfer circuit output SRout supplied from the touch detection scanning unit 52 and the drive electrode selection signal VCOMSEL supplied from the scanning control unit 51. The logic circuit 55 has a buffer function for amplifying the amplitude to a level that can control the operation of the selection switch SW1 (SW2, SW3, SW4). In the touch detection scanning unit 52, when the selected shift register 52SR supplies, for example, a high-level signal to the k+2-th drive unit 53(k+2) as the k+2-th transfer circuit output SRout(k+2), the drive unit 53(k+2) applies the drive signal VcomAC to the drive electrodes COML belonging to the k+2-th drive electrode block B(k+2).

As illustrated in FIG. 20, in the picture frame area Gd, the wiring for display LDC and the wiring for touch LAC occupy a width Wtp and a wiring area of the drive unit 53 occupies a width Wtx. Resistance of the wiring for touch LAC is desired to be suppressed. For example, because the resistance of the wiring for touch LAC is the maximum at the drive electrode COML farther than the output terminal 65E, a waveform of the drive signal for touch VcomAC may be distorted corresponding to a time constant and may influence accuracy in touch detection. The influence of the resistance of the wiring for touch LAC on the time constant is about two times greater than the influence of the drive electrode COML farther than the output terminal 65E thereon. Accordingly, it is effective to increase the width of the wiring for touch LAC and suppresses the resistance of the wiring for touch LAC to the drive electrode COML farther than the output terminal 65E. However, increase in the width Wtp may cause increase in the picture frame area Gd, so that the picture frame that does not contribute to the display area may be unfortunately enlarged.

As illustrated in FIG. 20, the width Wtx includes a control signal line LSDST for transmitting the scanning start signal SDST, a control signal line LSDCK1 for transmitting the control signal SDCK1, a control signal line LSDCK2 for transmitting the control signal SDCK2, a control signal line LVCOMSEL for transmitting the drive electrode selection signal VCOMSEL, a formation area of the shift register 52SR1, power supply lines LPWA and LPWB for a logic circuit for a Logic power supply that drives the shift register 52SR1 and the like, and a space for inter-wiring insulation. A width ΔWCK including the control signal line LSDCK1, the control signal line LSDCK2, and the space for inter-wiring insulation is required to be substantially 15 μm to 20 μm, for example.

As illustrated in FIG. 21, the width Wtx according to the first embodiment includes the control signal line LSDST for transmitting the scanning start signal SDST, the control signal line LVCOMSEL for transmitting the drive electrode selection signal VCOMSEL, the formation area of the shift register 52SR1, the power supply lines for a logic circuit LPWA and LPWB for the Logic power supply that drives the shift register 52SR1 and the like, and the space for inter-wiring insulation. The width Wtx according to the first embodiment does not include the control signal line LSDCK1 for transmitting the control signal SDCK1 and the control signal line LSDCK2 for transmitting the control signal SDCK2, so that the width Wtx according to the first embodiment can be reduced by the width ΔWCK illustrated in FIG. 20. Due to this, the picture frame area Gd according to the first embodiment can be narrowed. The wiring for touch LAC can be increased by a width Δwl illustrated in FIG. 21 corresponding to the width ΔWCK illustrated in FIG. 20. When the wiring for touch LAC is increased by the width Δwl illustrated in FIG. 21 corresponding to the width ΔWCK illustrated in FIG. 20, the resistance of the wiring for touch LAC is reduced. As a result, the waveform distortion of the drive signal for touch VcomAC is improved and the accuracy in touch detection can be enhanced. Alternatively, when the wiring for touch LAC is increased by the width Δwl illustrated in FIG. 21 corresponding to part of the width ΔWCK illustrated in FIG. 20, the waveform distortion of the drive signal for touch VcomAC is improved, the accuracy in touch detection is enhanced, and the picture frame area Gd can be narrowed.

The following describes an operation and advantageous effects of the display device 1 with a touch detecting function according to the first embodiment. In the following description, the drive signal Vcom serving as the display drive signal is referred to as the drive voltage for display VcomDC, and the drive signal Vcom serving as the drive signal for touch detection is referred to as the drive signal for touch VcomAC.

Operation of Display Device with Touch Detecting Function

Figure 22:
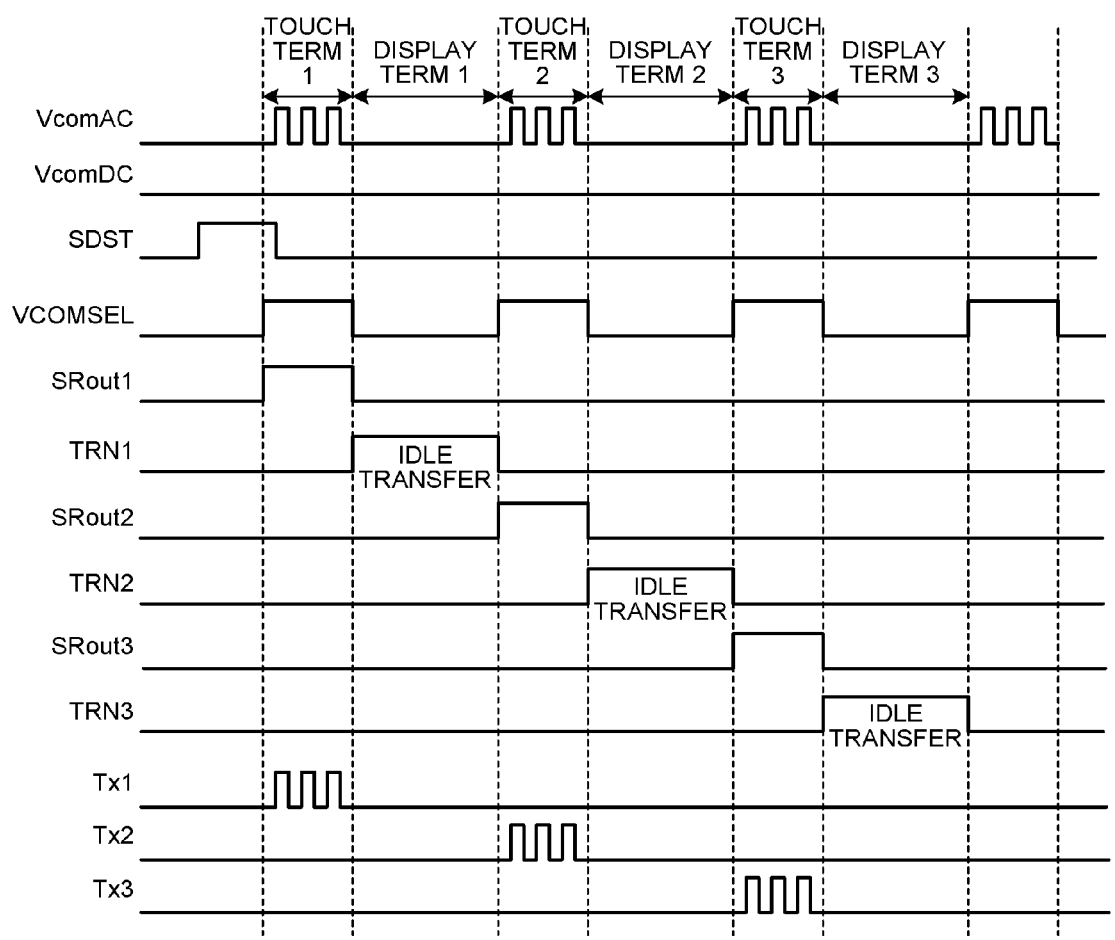
FIG. 22 is an explanatory diagram illustrating an example of a timing waveform of the display device with a touch detecting function according to the first embodiment.

Next, the following describes an operation of the display device 1 with a touch detecting function. FIG. 22 is an explanatory diagram illustrating an example of a timing waveform of the display device with a touch detecting function. As illustrated in FIG. 22, the display device 1 with a touch detecting function according to the first embodiment separately performs a touch detection operation (touch detection operation period) and a display operation (display period). The touch detection operation period illustrated in FIG. 22 includes Touch Term 1, Touch Term 2, and Touch Term 3. The display period includes Disply Term 1, Disply Term 2, and Disply Term 3. The touch detection operation period and the display period are alternately operated.

When the scanning start signal SDST is input, the shift register 52SR1 outputs the transfer circuit output SRout1 as high-level in synchronization with high-level of the drive electrode selection signal VCOMSEL using the scanning start signal SDST as a trigger. When the drive electrode selection signal VCOMSEL is high-level, the drive unit 53 outputs the drive signal for touch VcomAC as a waveform Tx1 of the drive signal Vcom. When the shift register 52SR1 outputs the transfer circuit output SRout1 as low-level, the shift register 52SR2 receives the transfer circuit output SRout1 and performs idle transfer to output a transfer circuit output TRN1. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN1 overlaps with the high-level of the next drive electrode selection signal VCOMSEL corresponding to a signal delay, so that the next shift register 52SR1 outputs the transfer circuit output SRout2 as high-level in synchronization with the high-level of the drive electrode selection signal VCOMSEL using a logical product of the high-level of the transfer circuit output TRN1 and the high-level of the drive electrode selection signal VCOMSEL as a trigger. When the drive electrode selection signal VCOMSEL is high-level, the drive unit 53 outputs the drive signal for touch VcomAC as a waveform Tx2 of the drive signal Vcom. When the shift register 52SR1 outputs the transfer circuit output SRout2 as low-level, the shift register 52SR2 receives the transfer circuit output SRout2 and performs idle transfer to output a transfer circuit output TRN2. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN2 overlaps with the high-level of the next drive electrode selection signal VCOMSEL corresponding to a signal delay, so that the next shift register 52SR1 outputs the transfer circuit output SRout3 as high-level in synchronization with the high-level of the drive electrode selection signal VCOMSEL using a logical product of the high-level of the transfer circuit output TRN2 and the high-level of the drive electrode selection signal VCOMSEL as a trigger. When the drive electrode selection signal VCOMSEL is high-level, the drive unit 53 outputs the drive signal for touch VcomAC as a waveform Tx3 of the drive signal Vcom. When the shift register 52SR1 outputs the transfer circuit output SRout3 as low-level, the shift register 52SR2 receives the transfer circuit output SRout3 and performs idle transfer to output a transfer circuit output TRN3. When the drive electrode selection signal VCOMSEL is low-level, the drive unit 53 switches the drive signal for touch VcomAC to the drive signal for display VcomDC to be output as the drive signal Vcom. Thereafter, the operation of the display device 1 with a touch detecting function will be repeated. In this way, the selection drive electrode block STX to which the drive signal for touch VcomAC is supplied is selected corresponding to change in the level of the drive electrode selection signal VCOMSEL that identifies an operation period for touch detection.

Modification

Figure 23:
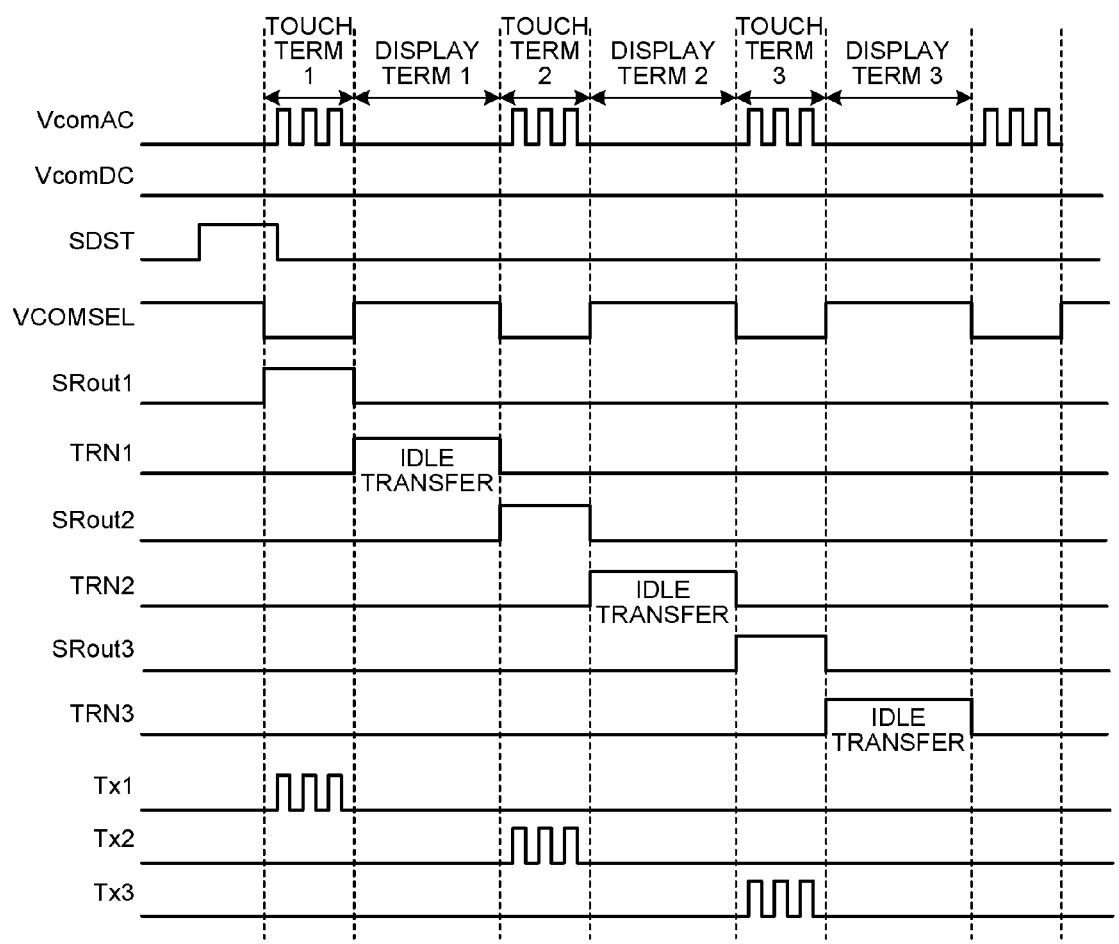
FIG. 23 is an explanatory diagram illustrating a modification of the timing waveform of the display device with a touch detecting function.

FIG. 23 is an explanatory diagram illustrating a modification of the timing waveform of the display device with a touch detecting function. As illustrated in FIG. 23, the display device 1 with a touch detecting function according to the modification separately performs a touch detection operation (touch detection operation period) and a display operation (display period). The touch detection operation period illustrated in FIG. 23 includes Touch Term 1, Touch Term 2, and Touch Term 3. The display period includes Disply Term 1, Disply Term 2, and Disply Term 3. The touch detection operation period and the display period are alternately operated.

When the scanning start signal SDST is input, the shift register 52SR1 outputs the transfer circuit output SRout1 as high-level in synchronization with low-level of the drive electrode selection signal VCOMSEL using the scanning start signal SDST as a trigger. When the drive electrode selection signal VCOMSEL is low-level, the drive unit 53 outputs the drive signal for touch VcomAC as the waveform Tx1 of the drive signal Vcom. When the shift register 52SR1 outputs the transfer circuit output SRout1 as low-level, the shift register 52SR2 receives the transfer circuit output SRout1 and performs idle transfer to output the transfer circuit output TRN1. When the drive electrode selection signal VCOMSEL is high-level, the drive unit 53 switches the drive signal for touch VcomAC to the drive signal for display VcomDC to be output as the drive signal Vcom.

The high-level of the transfer circuit output TRN1 overlaps with the low-level of the next drive electrode selection signal VCOMSEL corresponding to a signal delay, so that the next shift register 52SR1 outputs the transfer circuit output SRout2 as high-level in synchronization with the low-level of the drive electrode selection signal VCOMSEL using a logical sum of the high-level of the transfer circuit output TRN1 and the low-level of the drive electrode selection signal VCOMSEL as a trigger. When the drive electrode selection signal VCOMSEL is low-level, the drive unit 53 outputs the drive signal for touch VcomAC as the waveform Tx2 of the drive signal Vcom. When the shift register 52SR1 outputs the transfer circuit output SRout2 as low-level, the shift register 52SR2 receives the transfer circuit output SRout2 and performs idle transfer to output a transfer circuit output TRN2. When the drive electrode selection signal VCOMSEL is high-level, the drive unit 53 switches the drive signal for touch VcomAC to the drive signal for display VcomDC to be output as the drive signal Vcom.

The high-level of the transfer circuit output TRN2 overlaps with the low-level of the next drive electrode selection signal VCOMSEL corresponding to a signal delay, so that the next shift register 52SR1 outputs the transfer circuit output SRout3 as high-level in synchronization with the low-level of the drive electrode selection signal VCOMSEL using a logical sum of the high-level of the transfer circuit output TRN2 and the low-level of the drive electrode selection signal VCOMSEL as a trigger. When the drive electrode selection signal VCOMSEL is low-level, the drive unit 53 outputs the drive signal for touch VcomAC as the waveform Tx3 of the drive signal Vcom. When the shift register 52SR1 outputs the transfer circuit output SRout3 as low-level, the shift register 52SR2 receives the transfer circuit output SRout3 and performs idle transfer to output the transfer circuit output TRN3. When the drive electrode selection signal VCOMSEL is high-level, the drive unit 53 switches the drive signal for touch VcomAC to the drive signal for display VcomDC to be output as the drive signal Vcom. Thereafter, the operation of the display device 1 with a touch detecting function will be repeated.

As described above, the display device 1 with a touch detecting function according to the first embodiment includes the display area Ad in which the pixel electrodes are arranged in a matrix on the TFT substrate 21, the drive electrode COML that is divided into a plurality of pieces and arranged opposed to the pixel electrodes, and the liquid crystal layer 6 serving as the display function layer having the image display function for displaying an image in the display area Ad. The control device according to the first embodiment includes the control unit 11, the gate driver 12, the source driver 13, and the drive electrode driver 14. The control device performs image display control for exhibiting the image display function by applying the drive voltage for display VcomDC between the pixel electrode and the drive electrode COML based on the image signal. The display device 1 with a touch detecting function according to the first embodiment includes the touch detection electrode that is opposed to the drive electrode COML and forms capacitance between the drive electrode COML and the touch detection electrode, the touch detection unit that detects the position of the contiguous object based on the detection signal from the touch detection electrode, the wiring for touch LAC that is arranged in the picture frame area Gd positioned on the outside of the display area and supplies the drive signal for touch VcomAC to the drive electrode COML, and the selection switch SW that selects the drive electrode COML to be coupled to the wiring for touch LAC. The shift registers 52SR1 and 52SR2 include the shift register 52SR1 serving as the first transfer circuit and the shift register 52SR2 serving as the second transfer circuit. The shift register 52SR1 serving as the first transfer circuit is a transfer circuit that controls the selection switch SW1 (SW2, SW3, SW4). The shift register 52SR2 serving as the second transfer circuit supplies the transfer circuit output to the shift register 52SR1.

In other words, the drive electrode scanning units 14A and 14B of the drive electrode driver 14 among the control devices select the drive electrode COML to which the drive signal for touch VcomAC is supplied from among the drive electrodes COML in the scanning direction Scan. The drive electrode scanning units 14A and 14B for selecting one drive electrode COML include the shift registers 52SR1 and 52SR2 serving as the transfer circuits in the picture frame area Gd to select the drive electrode COML to which the drive signal for touch VcomAC is supplied from among the drive electrodes COML. The shift register 52SR1 that is part of the shift registers 52SR1 and 52SR2 is the transfer circuit for the output to the selection switch SW1 (SW2, SW3, SW4).

Accordingly, the picture frame area Gd according to the first embodiment can be narrowed. The entire circuits in the picture frame area Gd can be brought near the display area Ad, and quality can be improved by preventing infiltration of water or cracking. The picture frame area Gd according to the first embodiment can also reduce the resistance of the wiring for touch LAC. As a result, the waveform distortion of the drive signal for touch VcomAC is improved and the accuracy in touch detection can be enhanced. The circuit for generating the control signals SDCK1 and SDCK2 becomes unnecessary and the size of the circuit of the COG 19 is reduced, so that an IC can be downsized. The picture frame area Gd according to the first embodiment can also reduce the resistance of the wiring for touch LAC and narrow the picture frame area Gd.

The shift registers 52SR1 and 52SR2 are arranged side by side in a direction in which the wiring for touch LAC extends. Due to this, the shift registers 52SR1 and 52SR2 can be arranged without widening the picture frame area Gd. Regarding the drive electrode scanning units 14A and 14B for selecting one drive electrode COML, the two shift registers 52SR1 and 52SR2 are exemplified as the transfer circuits for selecting the drive electrode COML to which the drive signal for touch VcomAC is supplied from among the drive electrodes COML. However, the number of the transfer circuits is not limited thereto. For example, the drive electrode scanning units 14A and 14B for selecting one drive electrode COML may include three transfer circuits: one shift register 52SR1, and two shift registers 52SR2. Due to this, a period of idle transfer can be prolonged. Alternatively, the drive electrode scanning units 14A and 14B for selecting one drive electrode COML may include a plurality of transfer circuits: two or more shift registers 52SR1, and two or more shift registers 52SR2.

The gate shift registers 120SR serving as the transfer circuits for display that scan the pixel electrode are arranged in the picture frame area Gd. The number of shift registers 52SR1 and 52SR2 provided for one drive electrode COML may be smaller than that of the gate shift registers 120SR for scanning the pixel electrode that overlap with one drive electrode COML. Due to this, the shift registers 52SR1 and 52SR2 can be arranged without widening the picture frame area Gd.

The wiring for display LDC for supplying the drive voltage for display VcomDC and the wiring for touch LAC for supplying the drive signal for touch VcomAC are arranged in parallel. Due to this, a voltage can be supplied to the drive electrode COML by effectively using the picture frame area Gd.

The shift registers 52SR1 and 52SR2 for selecting the drive electrode COML to which the drive signal for touch VcomAC is supplied from among the drive electrodes COML are provided in the picture frame area Gd for each drive electrode COML. Among the shift registers 52SR1 and 52SR2, the shift register 52SR2 different from the shift register 52SR1 is the transfer circuit for outputting a signal of the transfer circuit output TRN as idle transfer. Accordingly, as illustrated in FIG. 7, the drive electrode driver 14 can scan the drive electrode block B (one detection block) of the drive electrode COML in the scanning direction Scan even when there are no control signals SDCK1 and SDCK2 serving as timing pulses.

The drive electrode selection signal VCOMSEL for identifying the operation period for touch detection is input to the shift registers 52SR1 and 52SR2 serving as the transfer circuits. Accordingly, as illustrated in FIG. 7, the drive electrode driver 14 can scan the drive electrode block B (one detection block) of the drive electrode COML in the scanning direction Scan even when there are no control signals SDCK1 and SDCK2 serving as timing pulses.

The picture frame area Gd includes the control signal line LVCOMSEL for transmitting the drive electrode selection signal VCOMSEL that identifies the operation period for touch detection, and the control signal line LVCOMSEL is coupled to the shift registers 52SR1 and 52SR2. Due to this, the picture frame area Gd can be narrowed. The wiring for touch LAC can be increased by the width Δwl illustrated in FIG. 21 corresponding to the width ΔWCK illustrated in FIG. 20. When the wiring for touch LAC is increased by the width Δwl illustrated in FIG. 21 corresponding to the width ΔWCK illustrated in FIG. 20, the resistance of the wiring for touch LAC is reduced. As a result, the waveform distortion of the drive signal for touch VcomAC is improved and the accuracy in touch detection can be enhanced.

Second Embodiment

Figure 24:
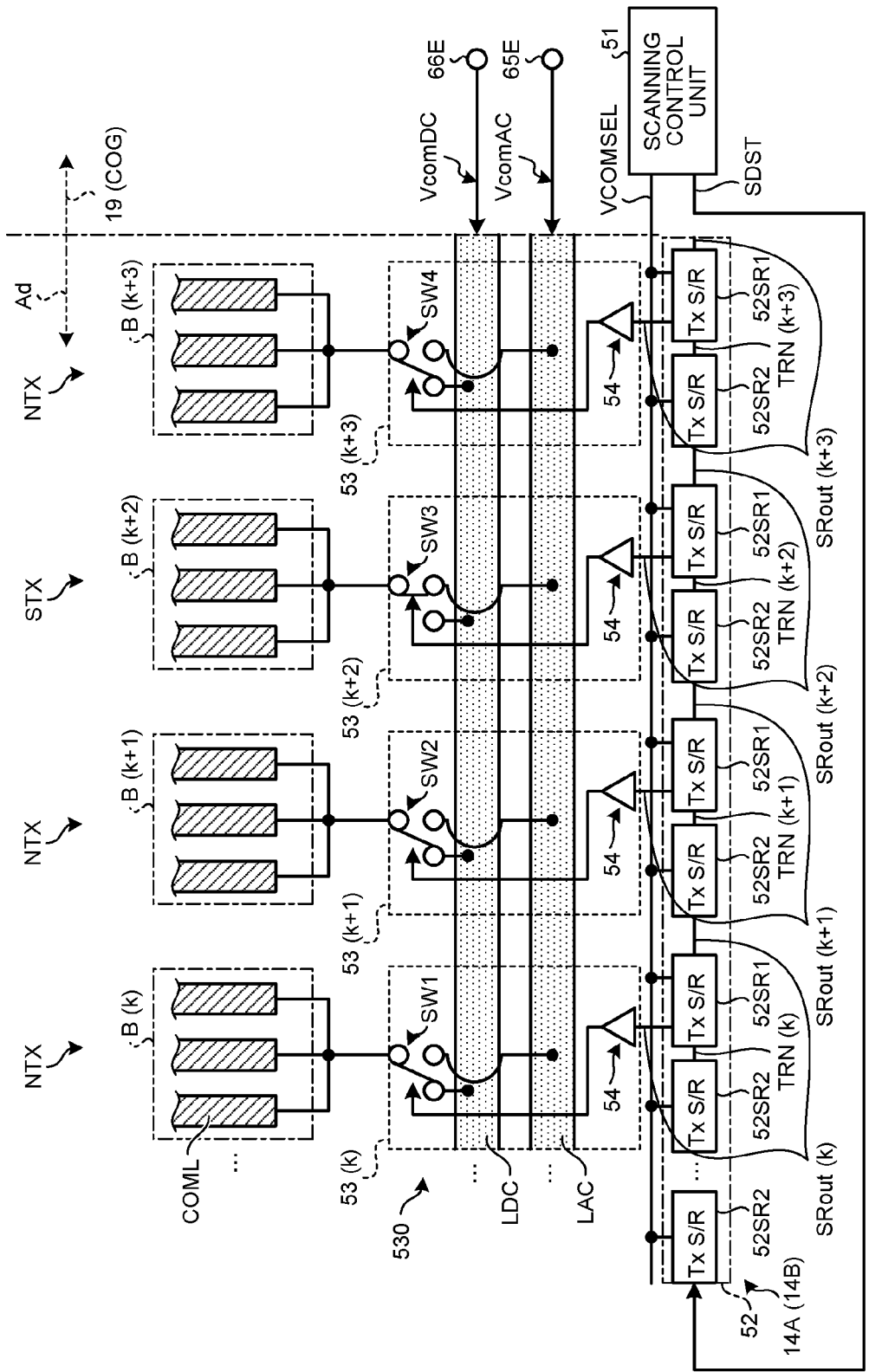
FIG. 24 is a block diagram illustrating a drive electrode driver according to a second embodiment.

The following describes a display device 1 with a touch detecting function according to a second embodiment. Components similar to those of the first embodiment are denoted by the same reference numerals, and an overlapping explanation thereof will be omitted. FIG. 24 is a block diagram illustrating the drive electrode driver according to the second embodiment. As illustrated in FIG. 24, the touch detection scanning unit 52 generates the transfer circuit output TRN (k) serving as an idle transfer signal using the scanning start signal SDST supplied to the shift register 52SR2 from the scanning control unit 51 as a trigger, and transfers the transfer circuit output TRN(k) to the next shift register 52SR1. The shift register 52SR1 to which the transfer circuit output TRN(k) is transferred synchronizes the transfer circuit output TRN(k) with the drive electrode selection signal VCOMSEL to be sequentially transferred to the shift register 52SR2 next to the shift register 52SR1 and be sequentially selected. The shift register 52SR2 generates the transfer circuit outputs TRN(k+1), TRN(k+2), TRN(k+3) . . . as idle transfer signals to be transferred to the next shift register 52SR1.

Figure 25:
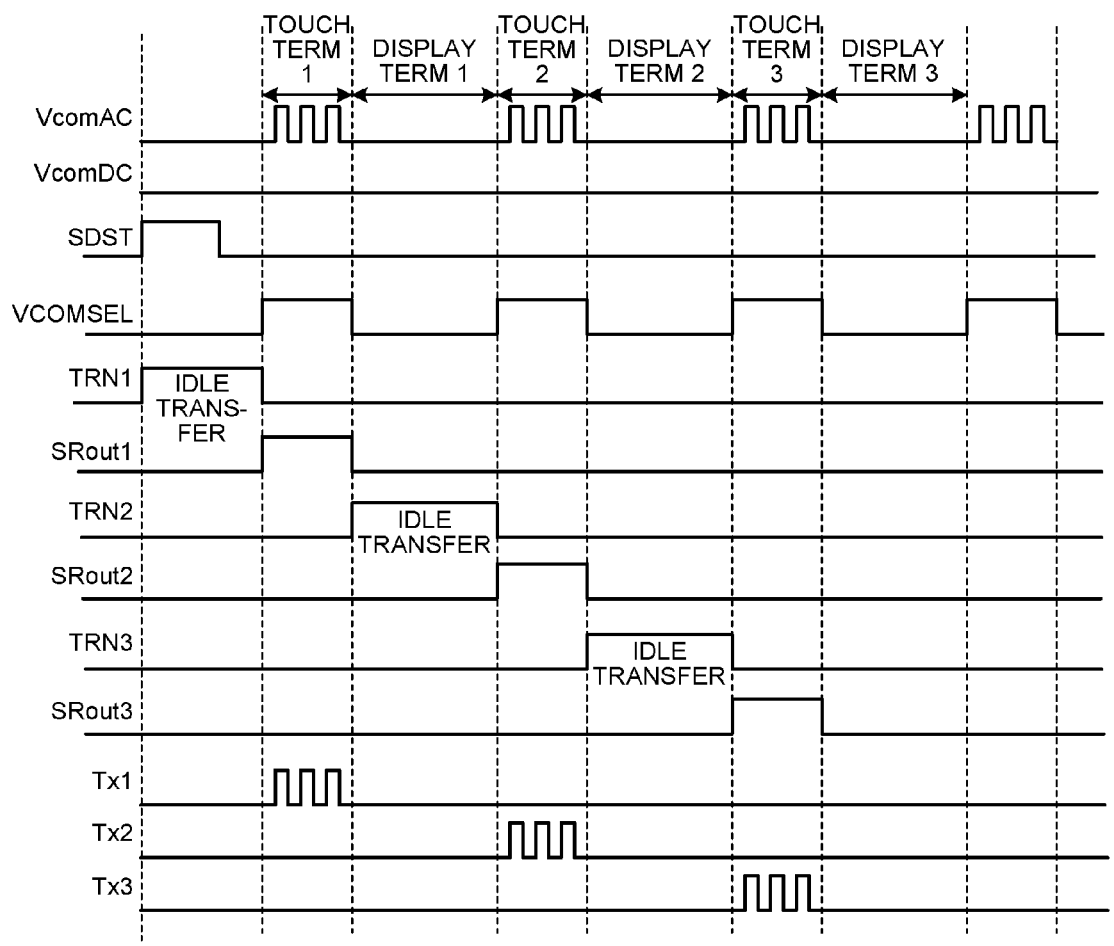
FIG. 25 is an explanatory diagram illustrating an example of a timing waveform of a display device with a touch detecting function according to the second embodiment.

Next, the following describes an operation of the display device 1 with a touch detecting function. FIG. 25 is an explanatory diagram illustrating an example of the timing waveform of the display device with a touch detecting function according to the second embodiment.

When the scanning start signal SDST is input, the shift register 52SR2 performs idle transfer using the scanning start signal SDST as a trigger, and outputs the transfer circuit output TRN1. The high-level of the transfer circuit output TRN1 overlaps with the high-level of the next drive electrode selection signal VCOMSEL corresponding to a signal delay, so that the next shift register 52SR1 outputs the transfer circuit output SRout1 as high-level in synchronization with the high-level of the drive electrode selection signal VCOMSEL using a logical product of the high-level of the transfer circuit output TRN1 and the high-level of the drive electrode selection signal VCOMSEL as a trigger. When the drive electrode selection signal VCOMSEL is high-level, the drive unit 53 outputs the drive signal for touch VcomAC as the waveform Tx1 of the drive signal Vcom. When the shift register 52SR1 outputs the transfer circuit output SRout1 as low-level, the shift register 52SR2 receives the transfer circuit output SRout1 and performs idle transfer to output the transfer circuit output TRN2. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN2 overlaps with the high-level of the next drive electrode selection signal VCOMSEL corresponding to a signal delay, so that the next shift register 52SR1 outputs the transfer circuit output SRout2 as high-level in synchronization with the high-level of the drive electrode selection signal VCOMSEL using a logical product of the high-level of the transfer circuit output TRN2 and the high-level of the drive electrode selection signal VCOMSEL as a trigger. When the drive electrode selection signal VCOMSEL is high-level, the drive unit 53 outputs the drive signal for touch VcomAC as the waveform Tx2 of the drive signal Vcom. When the shift register 52SR1 outputs the transfer circuit output SRout2 as low-level, the shift register 52SR2 receives the transfer circuit output SRout2 and performs idle transfer to output a transfer circuit output TRN3. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN3 overlaps with the high-level of the next drive electrode selection signal VCOMSEL corresponding to a signal delay, so that the next shift register 52SR1 outputs the transfer circuit output SRout3 as high-level in synchronization with the high-level of the drive electrode selection signal VCOMSEL using a logical product of the high-level of the transfer circuit output TRN3 and the high-level of the drive electrode selection signal VCOMSEL as a trigger. When the drive electrode selection signal VCOMSEL is high-level, the drive unit 53 outputs the drive signal for touch VcomAC as a waveform Tx3 of the drive signal Vcom. When the shift register 52SR1 outputs the transfer circuit output SRout3 as low-level, the shift register 52SR2 receives the transfer circuit output SRout3 and performs idle transfer to output a transfer circuit output TRN3. When the drive electrode selection signal VCOMSEL is low-level, the drive unit 53 switches the drive signal for touch VcomAC to the drive signal for display VcomDC to be output as the drive signal Vcom. Thereafter, the operation of the display device 1 with a touch detecting function will be repeated.

Modification

Figure 26:
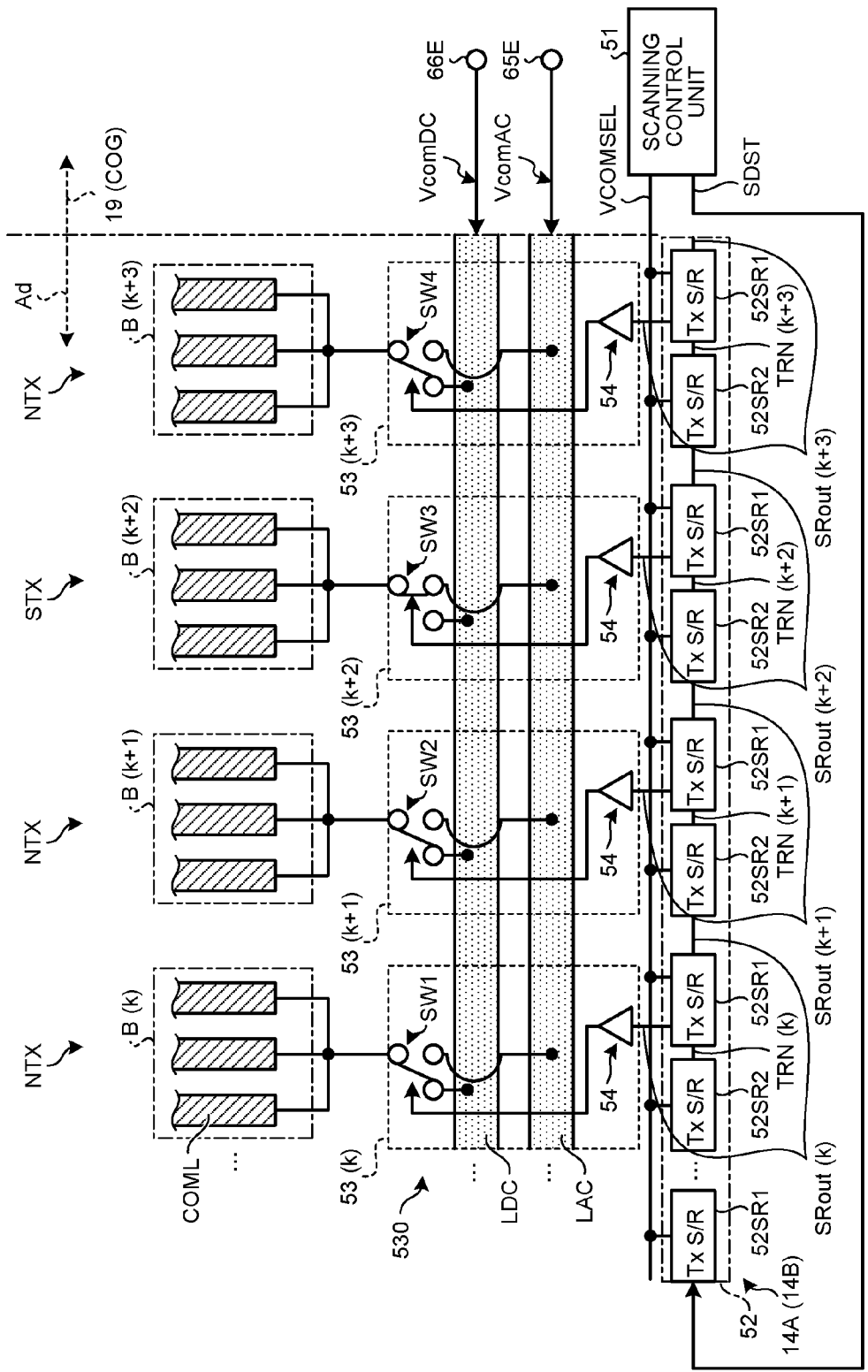
FIG. 26 is a block diagram illustrating the drive electrode driver according to a modification of the second embodiment.
Figure 27:
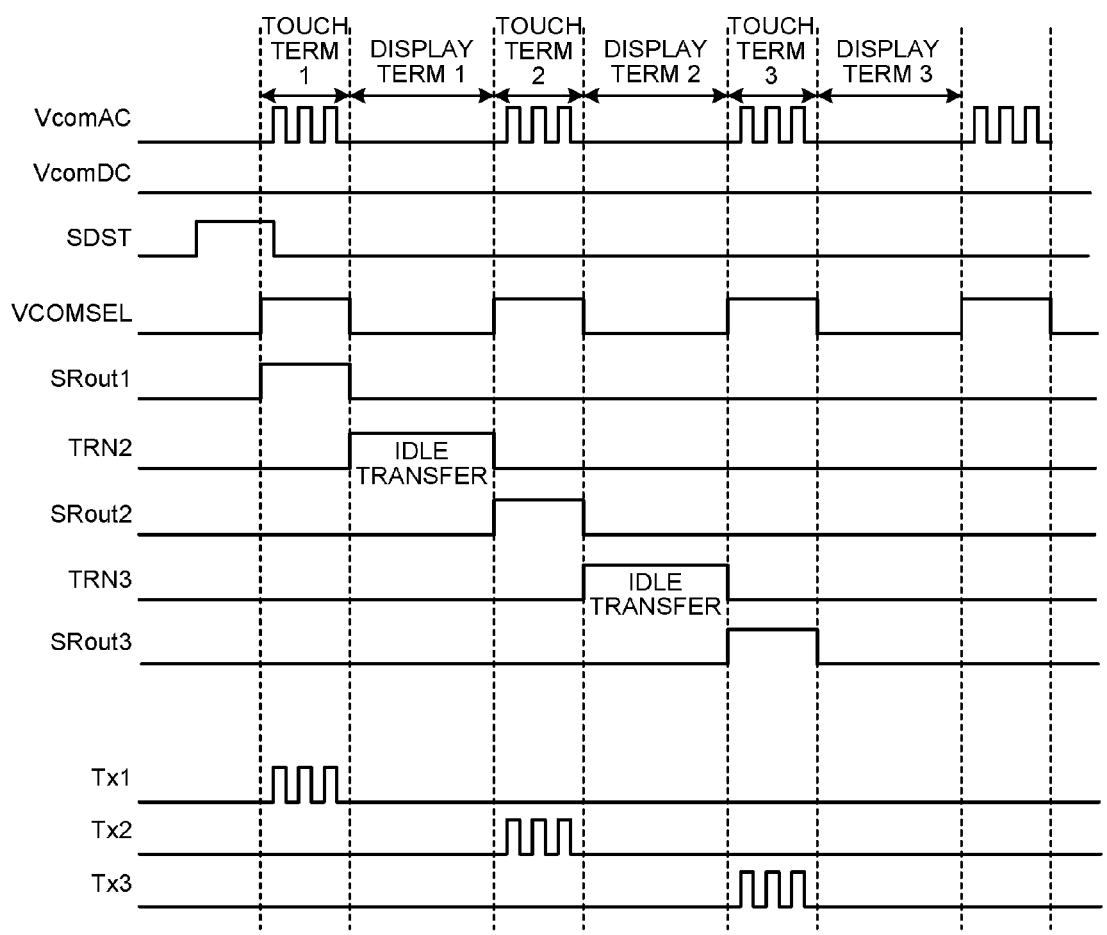
FIG. 27 is an explanatory diagram illustrating an example of a timing waveform of the display device with a touch detecting function according to the modification of the second embodiment.

FIG. 26 is a block diagram illustrating the drive electrode driver according to a modification of the second embodiment. FIG. 27 is an explanatory diagram illustrating an example of the timing waveform of the display device with a touch detecting function according to the modification of the second embodiment. As illustrated in FIG. 26, in the drive electrode driver according to the modification of the second embodiment, a shift register at the first stage that acquires the scanning start signal SDST is the shift register 52SR1. Due to this, the number of circuits is reduced.

Accordingly, as illustrated in FIG. 27, when the scanning start signal SDST is input, the shift register 52SR1 outputs the transfer circuit output SRout1 as high-level in synchronization with high-level of the drive electrode selection signal VCOMSEL using the scanning start signal SDST as a trigger. When the drive electrode selection signal VCOMSEL is high-level, the drive unit 53 outputs the drive signal for touch VcomAC as the waveform Tx1 of the drive signal Vcom. When the shift register 52SR1 outputs the transfer circuit output SRout1 as low-level, the shift register 52SR2 receives the transfer circuit output SRout1 and performs idle transfer to output the transfer circuit output TRN2. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN2 overlaps with the high-level of the next drive electrode selection signal VCOMSEL corresponding to a signal delay, so that the next shift register 52SR1 outputs the transfer circuit output SRout2 as high-level in synchronization with the high-level of the drive electrode selection signal VCOMSEL using a logical product of the high-level of the transfer circuit output TRN2 and the high-level of the drive electrode selection signal VCOMSEL as a trigger. When the drive electrode selection signal VCOMSEL is high-level, the drive unit 53 outputs the drive signal for touch VcomAC as the waveform Tx2 of the drive signal Vcom. When the shift register 52SR1 outputs the transfer circuit output SRout2 as low-level, the shift register 52SR2 receives the transfer circuit output SRout2 and performs idle transfer to output a transfer circuit output TRN3. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN3 overlaps with the high-level of the next drive electrode selection signal VCOMSEL corresponding to a signal delay, so that the next shift register 52SR1 outputs the transfer circuit output SRout3 as high-level in synchronization with the high-level of the drive electrode selection signal VCOMSEL using a logical product of the high-level of the transfer circuit output TRN3 and the high-level of the drive electrode selection signal VCOMSEL as a trigger. When the drive electrode selection signal VCOMSEL is high-level, the drive unit 53 outputs the drive signal for touch VcomAC as a waveform Tx3 of the drive signal Vcom. When the shift register 52SR1 outputs the transfer circuit output SRout3 as low-level, the shift register 52SR2 receives the transfer circuit output SRout3 and performs idle transfer to output a transfer circuit output TRN3. When the drive electrode selection signal VCOMSEL is low-level, the drive unit 53 switches the drive signal for touch VcomAC to the drive signal for display VcomDC to be output as the drive signal Vcom. Thereafter, the operation of the display device 1 with a touch detecting function will be repeated.

Third Embodiment

Figure 28:
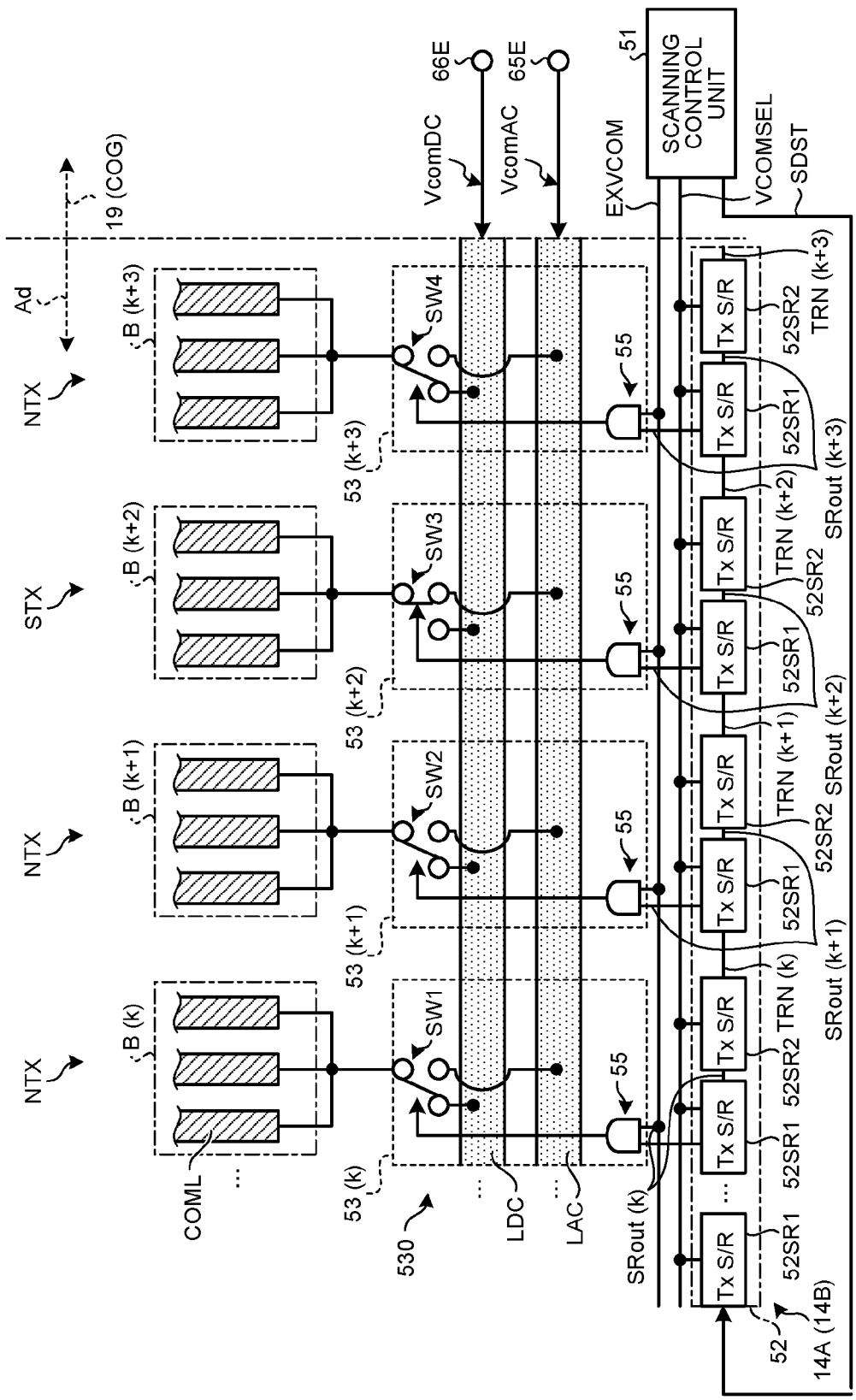
FIG. 28 is a block diagram illustrating a drive electrode driver according to a third embodiment.
Figure 29:
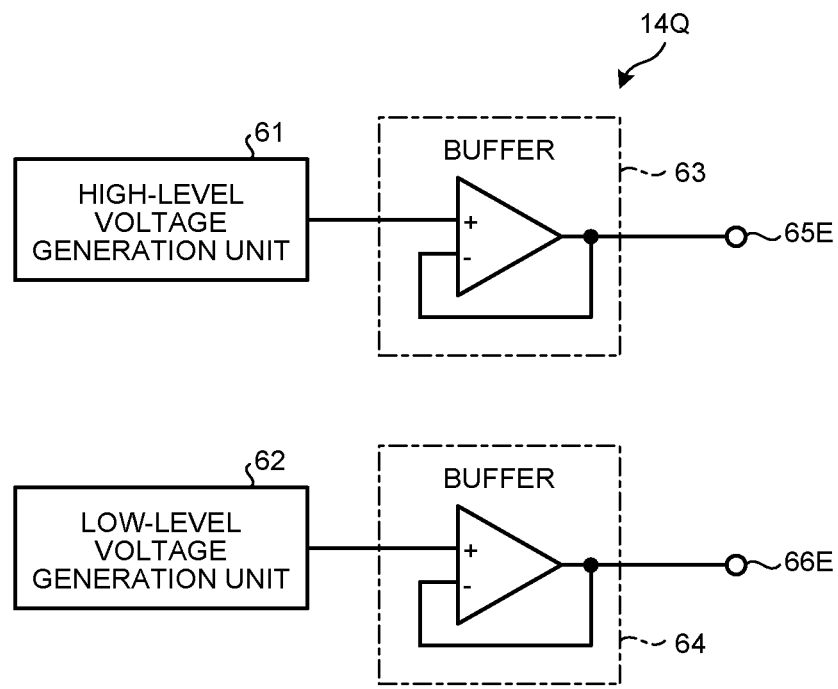
FIG. 29 is a block diagram illustrating a drive signal generation unit of the drive electrode driver according to the third embodiment.

The following describes a display device 1 with a touch detecting function according to a third embodiment. Components similar to those of the first embodiment are denoted by the same reference numerals, and an overlapping explanation thereof will be omitted. FIG. 28 is a block diagram illustrating the drive electrode driver according to the third embodiment. FIG. 29 is a block diagram illustrating the drive signal generation unit of the drive electrode driver according to the third embodiment.

As illustrated in FIG. 28, the drive unit 53 according to the third embodiment includes the logic circuit 55 described in the first embodiment. Accordingly, as illustrated in FIG. 29, the drive signal generation unit 14Q includes the high-level voltage generation unit 61, the low-level voltage generation unit 62, and the buffers 63 and 64. The high-level voltage generation unit 61 outputs a high-level direct current voltage of the high-level drive signal VcomDCH to the output terminal 65E via the buffer 63. The low-level voltage generation unit 62 outputs the direct current voltage of the drive voltage for display VcomDC to the output terminal 66E via the buffer 64. As illustrated in FIG. 28, the logic circuit 55 generates and outputs a logical product (AND) of the transfer circuit output SRout supplied from the touch detection scanning unit 52 and the drive control signal EXVCOM supplied from the scanning control unit 51. The logic circuit 55 has a buffer function for amplifying the amplitude to a level that can control the operation of the selection switch SW1 (SW2, SW3, SW4). In the touch detection scanning unit 52, when the selected shift register 52SR supplies, for example, a high-level signal to the k+2-th drive unit 53(k+2) as the k+2-th transfer circuit output SRout(k+2), the drive unit 53(k+2) applies the drive signal VcomAC to the drive electrodes COML belonging to the k+2-th drive electrode block B(k+2). The output from the logic circuit 55 controls the operation of the selection switch SW1 (SW2, SW3, SW4) when the drive control signal EXVCOM is high-level, and a voltage supplied from the output terminal 65E is output to the drive electrode COML. The output from the logic circuit 55 controls the operation of the selection switch SW1 (SW2, SW3, SW4) when the drive control signal EXVCOM is low-level, and a voltage supplied from the output terminal 66E is output to the drive electrode COML. As a result, a case in which the drive control signal EXVCOM is high-level and a case in which the drive control signal EXVCOM is low-level are alternately repeated, and the drive signal for touch VcomAC is generated. The logic circuit 55 outputs the voltage supplied from the buffer 64 as the direct current voltage of the drive voltage for display VcomDC when the drive control signal EXVCOM is low-level based on the drive control signal EXVCOM.

The display device 1 with a touch detecting function according to the third embodiment does not include the control signal line LSDCK1 for transmitting the control signal SDCK1 and the control signal line LSDCK2 for transmitting the control signal SDCK2, so that the width Wtx according to the third embodiment can be reduced by the width ΔWCK illustrated in FIG. 20. Accordingly, the wiring for touch LAC can be increased by the width corresponding to the width ΔWCK illustrated in FIG. 20. When the wiring for touch LAC is increased by the width corresponding to the width ΔWCK illustrated in FIG. 20, the resistance of the wiring for touch LAC is reduced. As a result, the waveform distortion of the drive signal for touch VcomAC is improved and the accuracy in touch detection can be enhanced. Alternatively, when the wiring for touch LAC is increased by the width Δwl illustrated in FIG. 21 corresponding to part of the width ΔWCK illustrated in FIG. 20, the waveform distortion of the drive signal for touch VcomAC is improved, the accuracy in touch detection is enhanced, and the picture frame area Gd can be narrowed.

Figure 30:
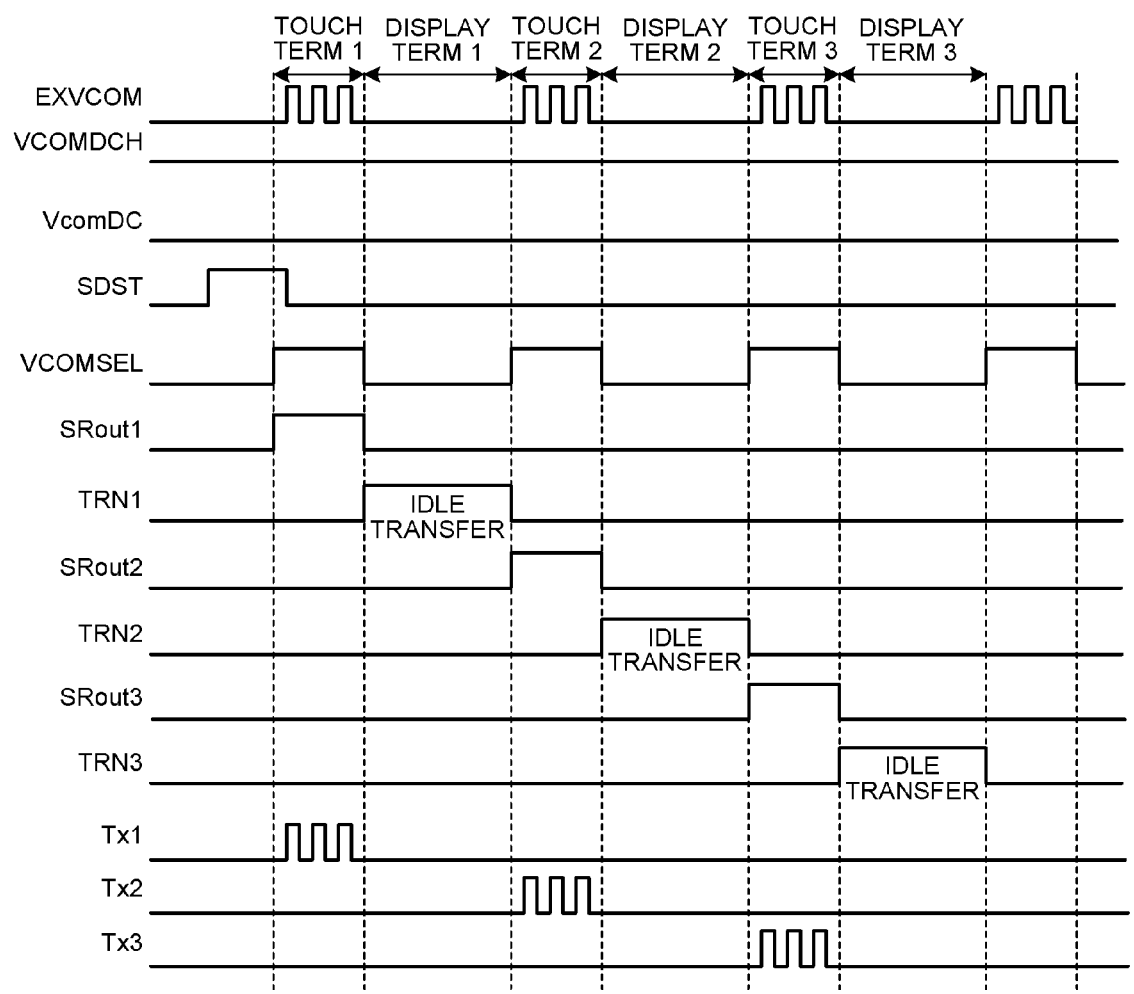
FIG. 30 is an explanatory diagram illustrating an example of a timing waveform of a display device with a touch detecting function according to the third embodiment.

Next, the following describes the operation of the display device 1 with a touch detecting function. FIG. 30 is an explanatory diagram illustrating an example of the timing waveform of the display device with a touch detecting function according to the third embodiment.

When the scanning start signal SDST is input, the shift register 52SR1 outputs the transfer circuit output SRout1 as high-level in synchronization with high-level of the drive electrode selection signal VCOMSEL using the scanning start signal SDST as a trigger. When the drive electrode selection signal VCOMSEL is high-level, a case in which the drive control signal EXVCOM is high-level and a case in which the drive control signal EXVCOM is low-level are alternately repeated based on the drive control signal EXVCOM supplied from the scanning control unit 51, and the drive unit 53 generates the drive signal for touch VcomAC from the high-level drive signal VcomDCH and the drive voltage for display VcomDC to output the drive signal for touch VcomAC as the waveform Tx1 of the drive signal Vcom. When the shift register 52SR1 outputs the transfer circuit output SRout1 as low-level, the shift register 52SR2 receives the transfer circuit output SRout2 and performs idle transfer to output the transfer circuit output TRN1. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN1 overlaps with the high-level of the next drive electrode selection signal VCOMSEL corresponding to a signal delay, so that the next shift register 52SR1 outputs the transfer circuit output SRout2 as high-level in synchronization with the high-level of the drive electrode selection signal VCOMSEL using a logical product of the high-level of the transfer circuit output TRN1 and the high-level of the drive electrode selection signal VCOMSEL as a trigger. When the drive electrode selection signal VCOMSEL is high-level, the drive unit 53 generates the drive signal for touch VcomAC, and outputs the drive signal for touch VcomAC as the waveform Tx2 of the drive signal Vcom. When the shift register 52SR1 outputs the transfer circuit output SRout2 as low-level, the shift register 52SR2 receives the transfer circuit output SRout2 and performs idle transfer to output the transfer circuit output TRN2. When the drive electrode selection signal VCOMSEL is low-level, the drive unit 53 switches the drive signal for touch VcomAC to the drive signal for display VcomDC to be output as the drive signal Vcom.

The high-level of the transfer circuit output TRN2 overlaps with the high-level of the next drive electrode selection signal VCOMSEL corresponding to a signal delay, so that the next shift register 52SR1 outputs the transfer circuit output SRout3 as high-level in synchronization with the high-level of the drive electrode selection signal VCOMSEL using a logical product of the high-level of the transfer circuit output TRN2 and the high-level of the drive electrode selection signal VCOMSEL as a trigger. When the drive electrode selection signal VCOMSEL is high-level, the drive unit 53 generates the drive signal for touch VcomAC, and outputs the drive signal for touch VcomAC as the waveform Tx3 of the drive signal Vcom. When the shift register 52SR1 outputs the transfer circuit output SRout3 as low-level, the shift register 52SR2 receives the transfer circuit output SRout3 and performs idle transfer to output the transfer circuit output TRN3. When the drive electrode selection signal VCOMSEL is low-level, the drive unit 53 switches the drive signal for touch VcomAC to the drive signal for display VcomDC to be output as the drive signal Vcom. Thereafter, the operation of the display device 1 with a touch detecting function will be repeated.

As described above, in the display device 1 with a touch detecting function according to the third embodiment, the wiring for display LDC for supplying the drive voltage for display VcomDC is arranged in parallel with the wiring for touch VcomAC for supplying a constant voltage higher than the drive voltage for display VcomDC. Accordingly, the voltage can be supplied to the drive electrode COML by effectively using the picture frame area Gd.

Fourth Embodiment

Figure 31:
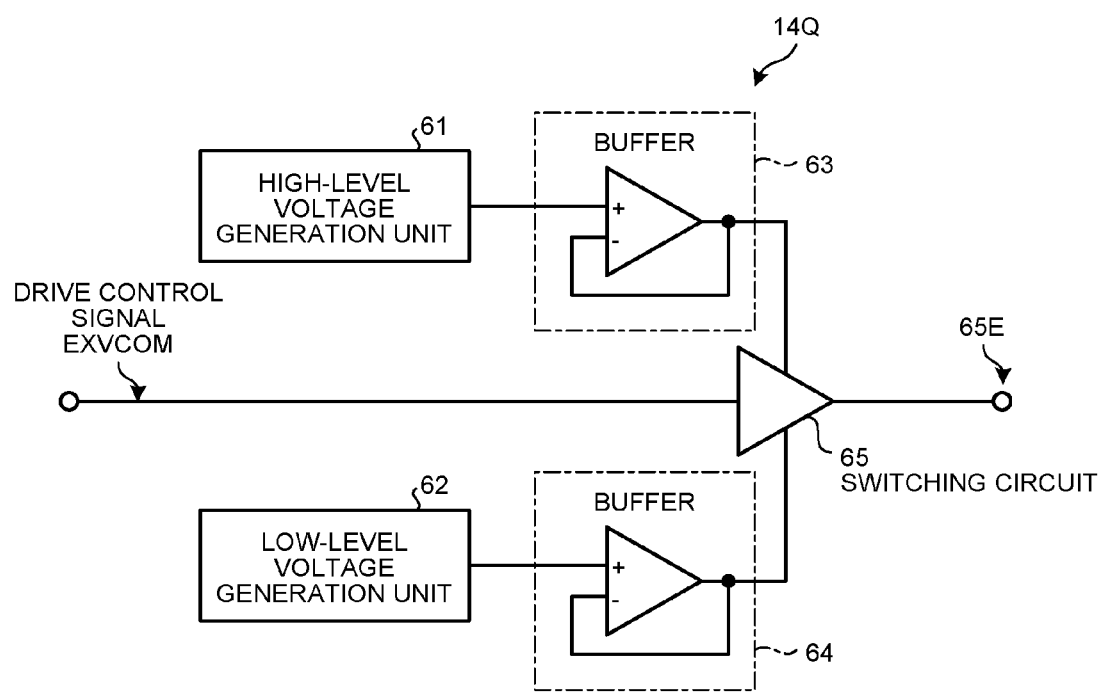
FIG. 31 is a block diagram illustrating a drive signal generation unit of a drive electrode driver according to a fourth embodiment.
Figure 32:
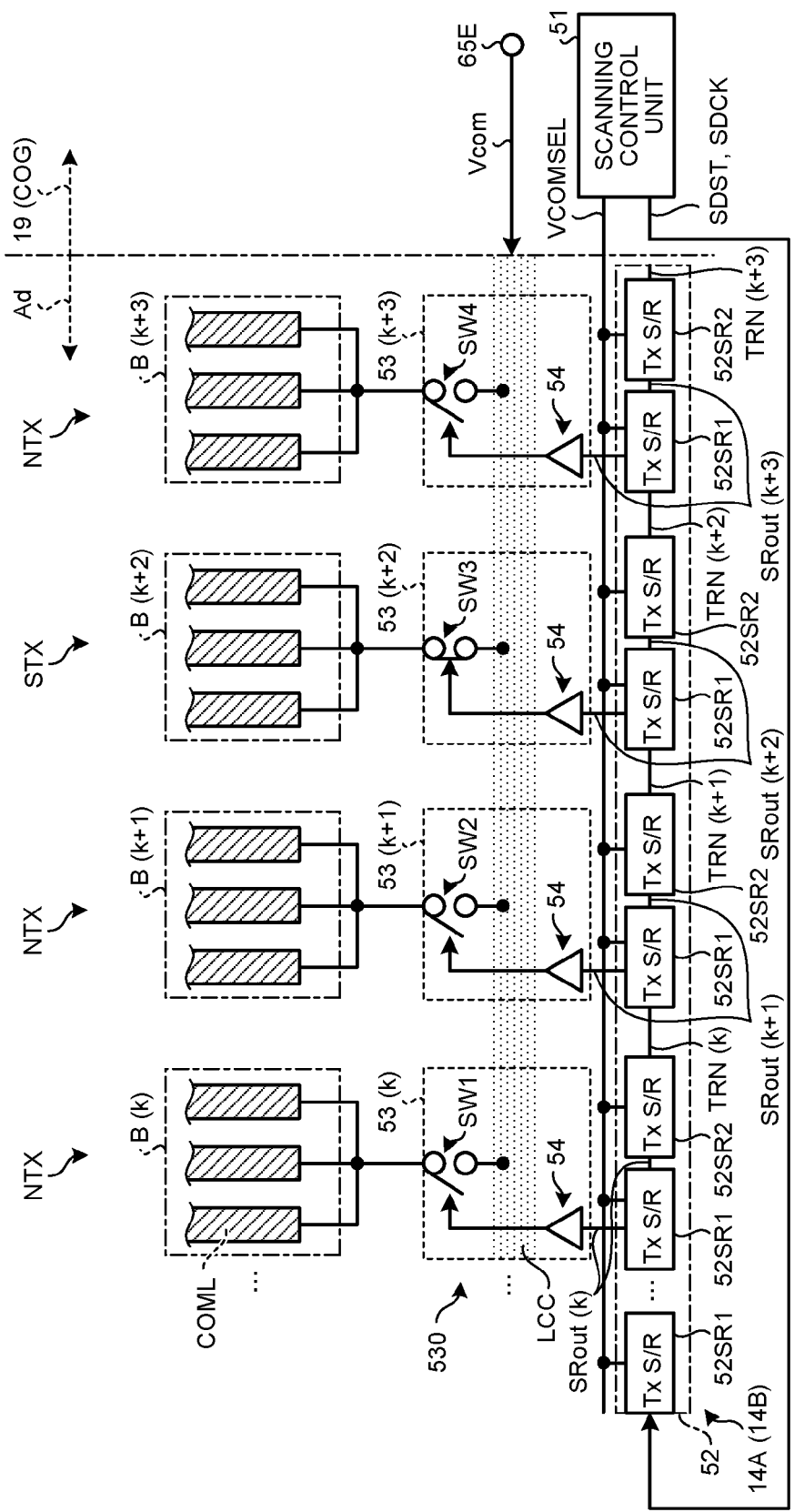
FIG. 32 is a block diagram illustrating the drive electrode driver according to the fourth embodiment.
Figure 33:
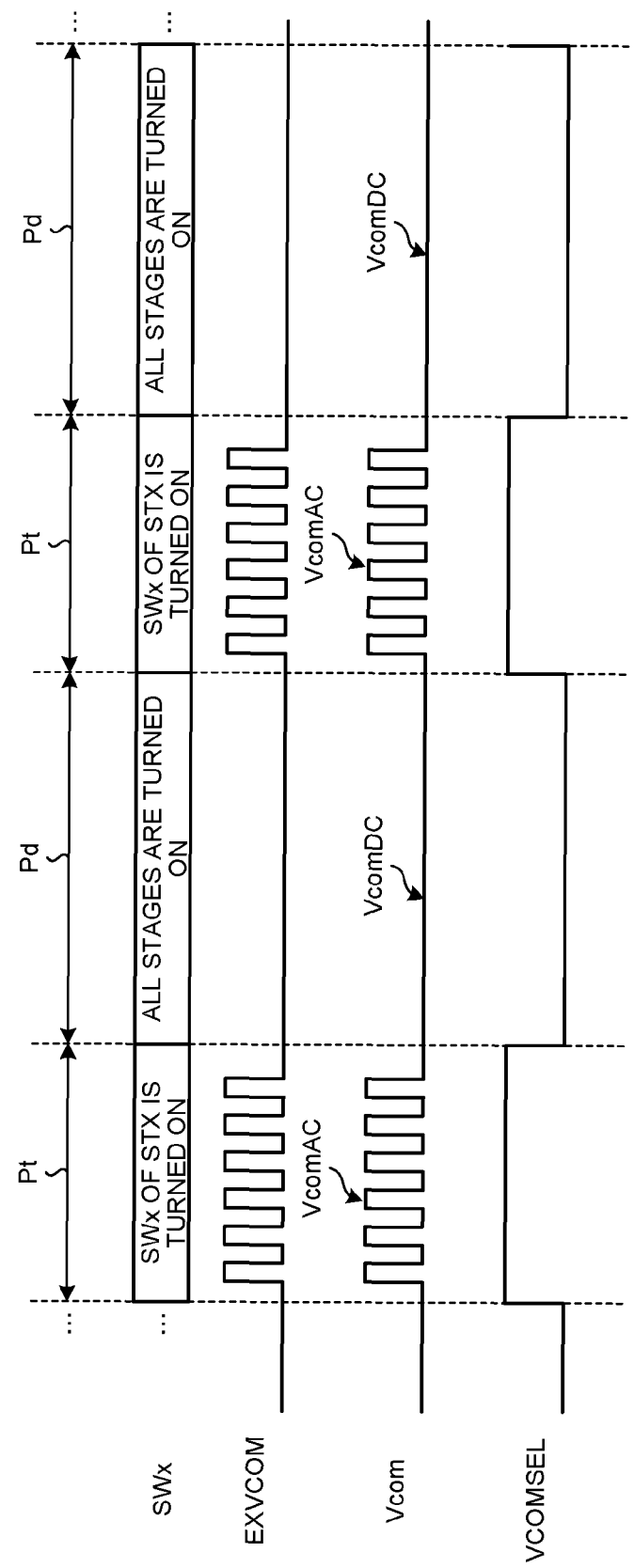
FIG. 33 is an explanatory diagram illustrating an example of a timing waveform of a display device with a touch detecting function according to the fourth embodiment.

The following describes a display device 1 with a touch detecting function according to a fourth embodiment. Components similar to those of the first embodiment are denoted by the same reference numerals, and an overlapping explanation thereof will be omitted. FIG. 31 is a block diagram illustrating the drive signal generation unit of the drive electrode driver according to the fourth embodiment. FIG. 32 is a block diagram illustrating the drive electrode driver according to the fourth embodiment. FIG. 33 is an explanatory diagram illustrating an example of the timing waveform of the display device 1 with a touch detecting function according to the fourth embodiment.

FIG. 31 is a block diagram illustrating the drive signal generation unit of the drive electrode driver according to the fourth embodiment. The drive signal generation unit 14Q includes the high-level voltage generation unit 61, the low-level voltage generation unit 62, the buffers 63 and 64, and the switching circuit 65.

The high-level voltage generation unit 61 generates a high-level voltage of the drive signal VcomAC. The low-level voltage generation unit 62 generates a direct current voltage of the drive voltage for display VcomDC. The voltage generated by the low-level voltage generation unit 62 is also used as a low-level voltage of the drive signal VcomAC. The buffer 63 outputs the voltage supplied from the high-level voltage generation unit 61 while performing impedance conversion thereon, and supplies the voltage to the switching circuit 65. The buffer 64 outputs the voltage supplied from the low-level voltage generation unit 62 while performing impedance conversion thereon, and supplies the voltage to the switching circuit 65. The switching circuit 65 alternately repeats a case in which a drive control signal EXVCOM is high-level and a case in which the drive control signal EXVCOM is low-level based on the drive control signal EXVCOM, and generates the drive signal VcomAC. The switching circuit 65 outputs the voltage supplied from the buffer 63 when the drive control signal EXVCOM is high-level, and outputs the voltage supplied from the buffer 64 when the drive control signal EXVCOM is low-level. The switching circuit 65 outputs the voltage supplied from the buffer 64 as the direct current voltage of the drive voltage for display VcomDC when the drive control signal EXVCOM is low-level, based on the drive control signal EXVCOM. The buffers 63 and 64 include, for example, a voltage follower. The voltage from the switching circuit 65 is output to an output terminal 65E.

FIG. 32 is a block diagram illustrating the drive electrode driver according to the fourth embodiment. The drive electrode scanning units 14A and 14B include the scanning control unit 51, the touch detection scanning unit 52, and the drive unit 53O. The drive unit 53O includes the drive units 53(k) to 53(k+3) the number of which is the same as that of the drive electrode blocks B. The scanning control unit 51 is mounted on the COG 19. The touch detection scanning unit 52 and the drive unit 53O are arranged in the picture frame at the periphery of the display area Ad. Hereinafter, to indicate any one of the drive units 53(k) to 53(k+3), a "drive unit 53" is simply referred to.

The scanning control unit 51 supplies the scanning start signal SDST to the touch detection scanning unit 52 based on the control signal supplied from the control unit 11. Any one of the drive voltage for display VcomDC and the drive signal VcomAC output from the drive signal generation unit 14Q via the output terminal 65E is supplied to wiring LCC. The scanning control unit 51 supplies the drive electrode selection signal VCOMSEL to the drive unit 53O. The drive electrode selection signal VCOMSEL is a signal for identifying a period in which the drive signal VcomAC is supplied from the drive signal generation unit 14Q to the drive electrode COML via the wiring LCC.

The touch detection scanning unit 52 includes the shift registers 52SR1 and 52SR2, and generates the transfer circuit outputs SRout(k), SRout(k+1), SRout(k+2), SRout(k+3) . . . for selecting the drive electrode COML to which the drive signal VcomAC is applied. Specifically, the touch detection scanning unit 52 causes the scanning start signal SDST as a trigger supplied from the scanning control unit 51 to the shift register 52SR1 to be synchronized with the drive electrode selection signal VCOMSEL so as to be sequentially transferred to the shift register 52SR2 next to the shift register 52SR1 and be sequentially selected. The shift register 52SR2 generates the transfer circuit outputs TRN(k), TRN(k+1), TRN(k+2), TRN(k+3) . . . as idle transfer signals, and transfers the outputs to the next shift register 52SR1.

The shift register 52SR1 selected in synchronization with the drive electrode selection signal VCOMSEL sends out the transfer circuit outputs SRout(k), SRout(k+1), SRout(k+2), SRout(k+3) . . . to each amplification circuit 54 of the drive unit 53O. In the touch detection scanning unit 52, for example, when the selected shift register 52SR supplies a high-level signal as the k+2-th transfer circuit output SRout(k+2) to the k+2-th drive unit 53(k+2), the drive unit 53(k+2) applies the drive signal VcomAC to a plurality of drive electrodes COML belonging to the k+2-th drive electrode block B(k+2).

As illustrated in FIG. 33, the display device 1 with a touch detecting function according to the fourth embodiment separately performs a touch detection operation (touch detection operation period Pt) and a display operation (display period Pd), and supplies the drive signal Vcom (the drive voltage for display VcomDC and the drive signal VcomAC) to the drive electrode COML in a time-division manner.

The drive electrode COML functions as the drive electrode of the liquid crystal display unit 20 and also as the drive electrode of the touch detection unit 30, so that the drive signals Vcom may influence each other. Accordingly, the drive signal Vcom is applied to the drive electrode COML separately in the display operation period Pd for performing a display operation and the touch detection operation period Pt for performing a touch detection operation. The drive electrode driver 14 applies the drive signal Vcom as the drive voltage for display in the display operation period Pd for performing a display operation. The drive electrode driver 14 then applies the drive signal Vcom as the touch drive signal in the touch detection operation period Pt for performing a touch detection operation. In this way, in the display device 1 with a touch detecting function, the drive voltage for display VcomDC and the drive signal VcomAC are supplied to the same wiring LCC in different time periods. The waveform of the drive signal VcomAC is a waveform synchronized with a rectangular wave of the drive control signal EXVCOM.

As illustrated in FIG. 33, in the touch detection operation, one of switches SWx of the selection drive electrode block STX is turned on (closing operation) and the rectangular wave of the drive signal VcomAC is applied thereto to perform scanning for touch detection. In the touch detection operation, all of the selection switches SWx of the non-selection drive electrode block NTX are turned off (opening operation), and the electric potential of the non-selection drive electrode block NTX is caused to be in a floating state, that is, the electric potential is not fixed. In this case, it is preferable to adjust a gate potential of the selection switch SWx of the non-selection drive electrode block NTX so that all of the selection switches SWx of the non-selection drive electrode block NTX are fully turned off.

The display device 1 with a touch detecting function turns on all of the switches SW1 to SW4 in the display period Pd, and applies the drive voltage for display VcomDC to the drive electrode COML. As described above, in the display device 1 with a touch detecting function according to the fourth embodiment, the control device supplies the drive voltage for display VcomDC and the drive signal for touch VcomAC to the same wiring for touch LCC in different time periods. Due to this, the display device 1 with a touch detecting function according to the fourth embodiment can further narrow the picture frame area Gd. Accordingly, the entire circuits in the picture frame area can be brought near the display area Ad, and quality can be improved by preventing infiltration of water or cracking. The picture frame area Gd according to the first embodiment can also reduce the resistance of the wiring for touch LAC. As a result, the waveform distortion of the drive signal for touch VcomAC is improved and the accuracy in touch detection can be enhanced. The circuit for generating the control signals SDCK1 and SDCK2 becomes unnecessary and the size of the circuit of the COG 19 is reduced, so that the IC can be downsized. The picture frame area Gd according to the fourth embodiment can also reduce the resistance of the wiring for touch LAC and narrow the picture frame area Gd.

Fifth Embodiment

Figure 34:
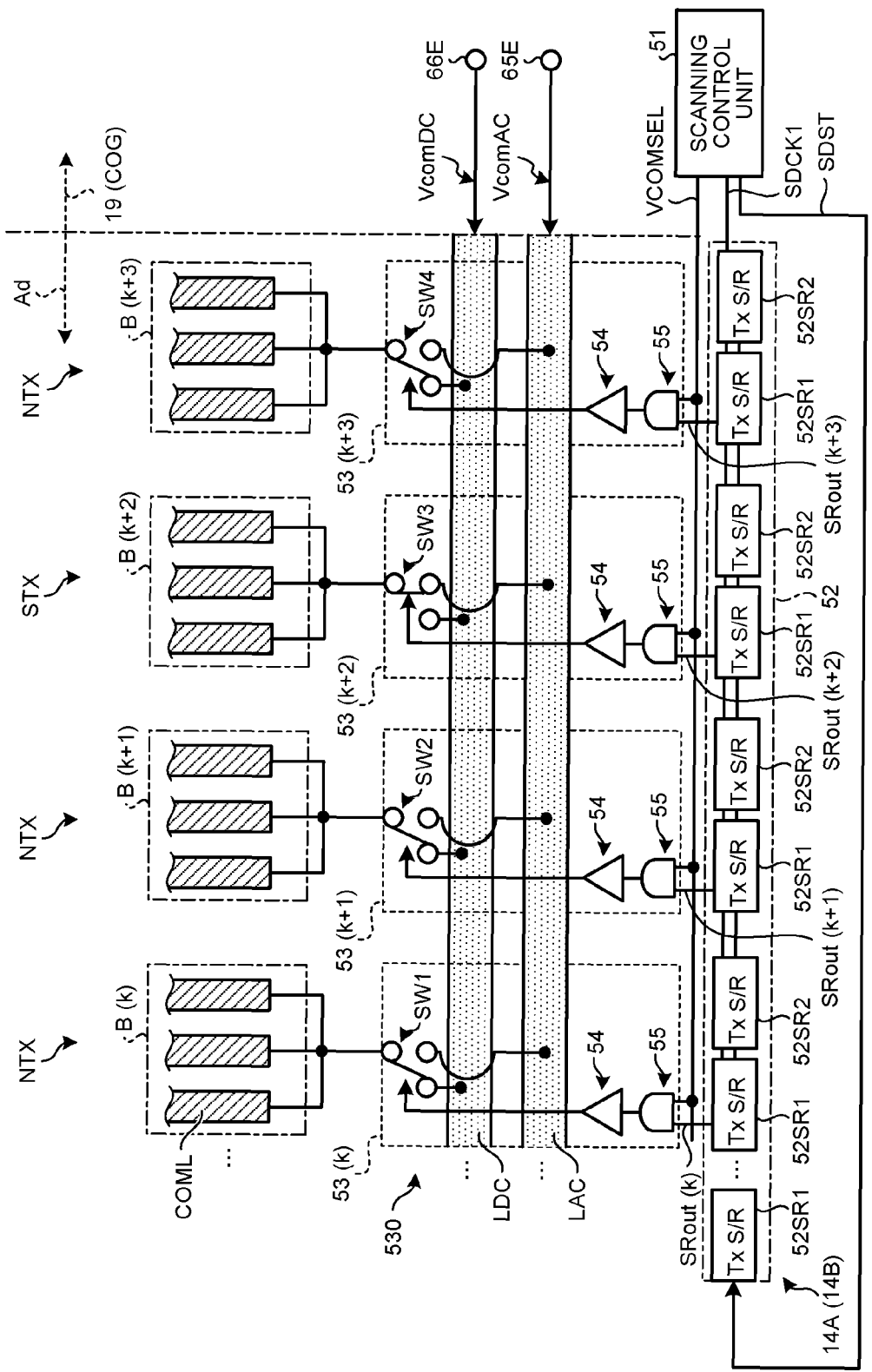
FIG. 34 is a block diagram illustrating a drive electrode driver according to a fifth embodiment.
Figure 35:
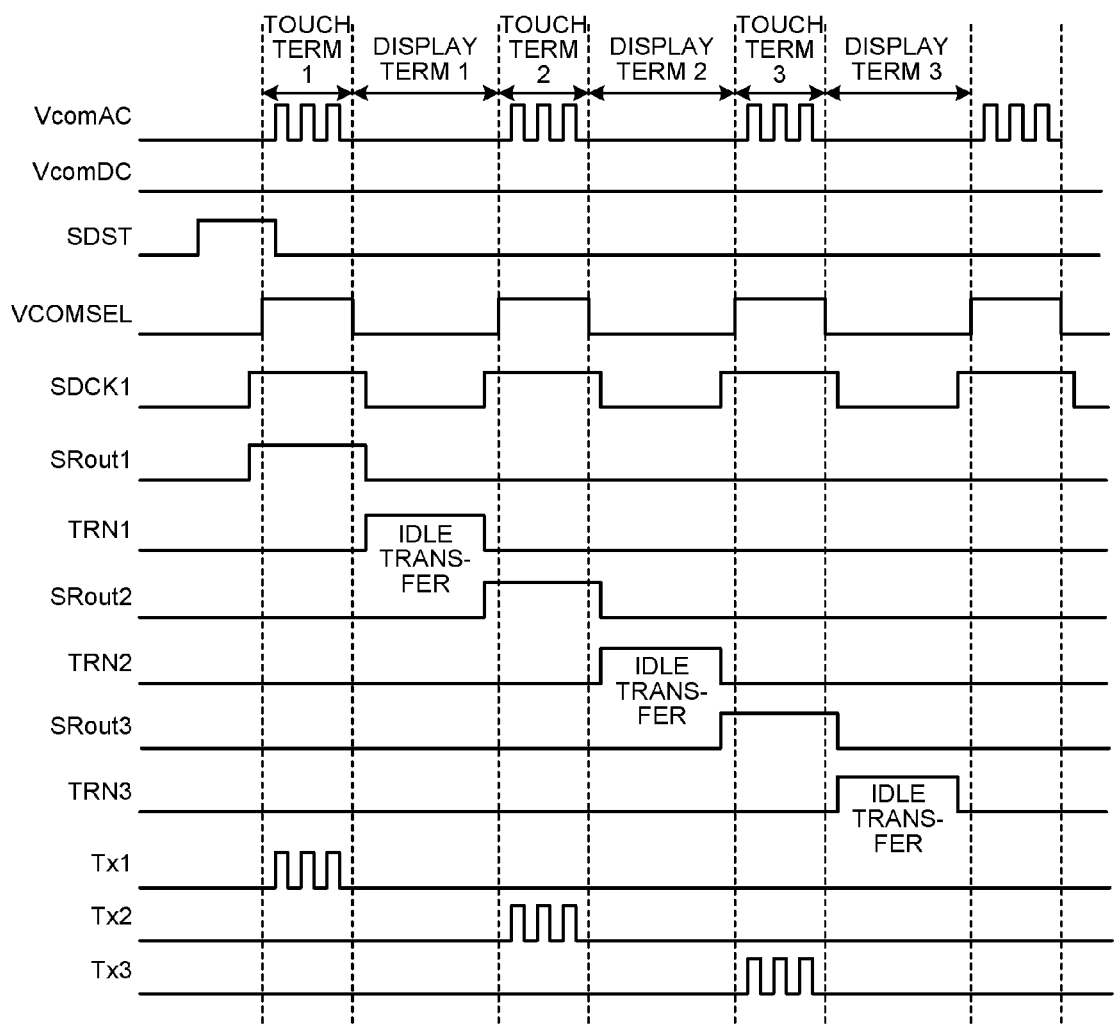
FIG. 35 is an explanatory diagram illustrating an example of a timing waveform of a display device with a touch detecting function according to the fifth embodiment.

The following describes a display device 1 with a touch detecting function according to a fifth embodiment. Components similar to those of the first to the fourth embodiments are denoted by the same reference numerals, and an overlapping explanation thereof will be omitted. FIG. 34 is a block diagram illustrating the drive signal generation unit of the drive electrode driver according to a fifth embodiment. FIG. 35 is an explanatory diagram illustrating an example of the timing waveform of the display device 1 with a touch detecting function according to the fifth embodiment.

As illustrated in FIG. 34, the touch detection scanning unit 52 includes the shift register 52SR1 for a drive electrode and the shift register 52SR2 for a drive electrode serving as the transfer circuits. The shift register 52SR1 for a drive electrode generates the transfer circuit outputs SRout(k), SRout(k+1), SRout(k+2), SRout(k+3) . . . for selecting the drive electrode COML to which the drive signal for touch VcomAC is applied. Specifically, the touch detection scanning unit 52 causes the scanning start signal SDST as a trigger supplied from the scanning control unit 51 to the shift register 52SR1 to be synchronized with the control signal SDCK1 so as to be sequentially transferred for each transfer stage of the shift register 52SR and be sequentially selected. The selected shift register 52SR1 sends out the transfer circuit outputs SRout(k), SRout(k+1), SRout(k+2), SRout(k+3) . . . to each logic circuit 55 of the drive unit 530. The logic circuit 55 generates and outputs a logical product (AND) of the transfer circuit output SRout supplied from the touch detection scanning unit 52 and the drive electrode selection signal VCOMSEL supplied from the scanning control unit 51. That is, the transfer circuit output SRout of the shift register 52SR1 can control the operation of the selection switch SW1 (SW2, SW3, SW4) via the output from the logic circuit 55. The logic circuit 55 is coupled to the amplification circuit 54 having a buffer function for amplifying the output of the logic circuit 55 to the amplitude level. In the touch detection scanning unit 52, when the selected shift register 52SR supplies, for example, a high-level signal to the k+2-th drive unit 53(k+2) as the k+2-th transfer circuit output SRout(k+2), the drive unit 53(k+2) applies the drive signal VcomAC to the drive electrodes COML belonging to the k+2-th drive electrode block B(k+2).

As illustrated in FIG. 35, when the scanning start signal SDST is input, the shift register 52SR1 outputs the transfer circuit output SRout1 as high-level in synchronization with the control signal SDCK1 using the scanning start signal SDST as a trigger. When the drive electrode selection signal VCOMSEL is high-level, the logic circuit 55 outputs the drive signal for touch VcomAC as the waveform Tx1 of the drive signal Vcom. When the shift register 52SR1 outputs the transfer circuit output SRout1 as low-level, the shift register 52SR2 receives the transfer circuit output SRout1 and performs idle transfer to output the transfer circuit output TRN1. When the drive electrode selection signal VCOMSEL is low-level, the drive unit 53 switches the drive signal for touch VcomAC to the drive signal for display VcomDC to be output as the drive signal Vcom.

The display device 1 with a touch detecting function according to the fifth embodiment includes the shift register 52SR1 serving as the first transfer circuit and the shift register 52SR2 serving as the second transfer circuit. The shift register 52SR1 serving as the first transfer circuit is a transfer circuit that controls the selection switch SW1 (SW2, SW3, SW4) via the logic circuit 55. The shift register 52SR2 serving as the second transfer circuit supplies the transfer circuit output to the shift register 52SR1. The display device 1 with a touch detecting function according to the fifth embodiment does not include the control signal line LSDCK2 for transmitting the control signal SDCK2, so that the width Wtx can be reduced by about half of the width ΔWCK illustrated in FIG. 20. Due to this, the picture frame area Gd according to the fifth embodiment can be narrowed.

The embodiment has been described above by exemplifying some embodiments and modifications. However, the embodiment is not limited thereto and various modifications can be made.

Figure 36:
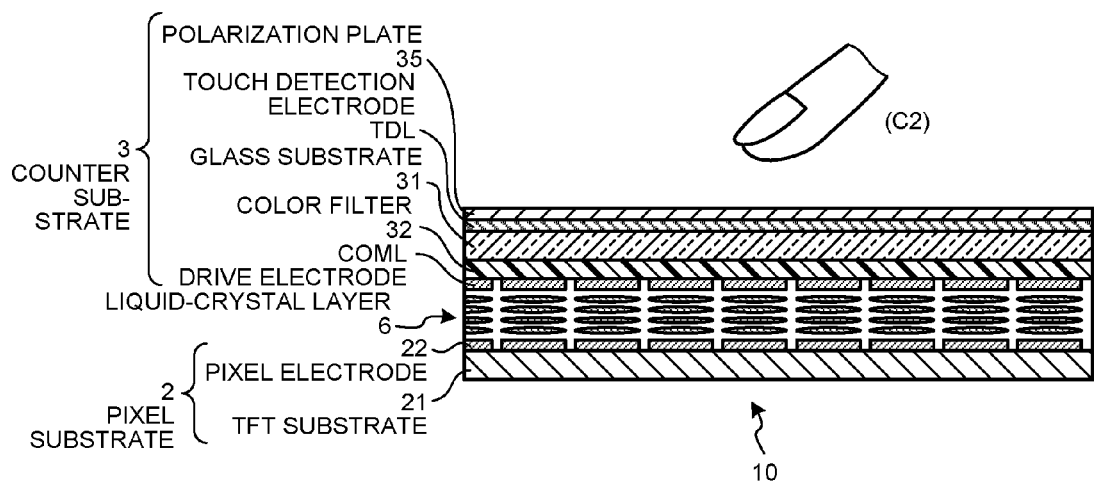
FIG. 36 is a cross-sectional view representing a schematic cross-sectional structure of a display unit with a touch detecting function according to a modification.

In the display device 1 with a touch detecting function according to the above-described embodiments and modifications, the display unit 10 with a touch detecting function can be made by integrating the touch detection unit 30 with the liquid crystal display unit 20 using liquid crystals of various modes such as the FFS mode and the IPS mode. FIG. 36 is a sectional view of a schematic sectional structure of the display unit with a touch detecting function according to a modification. Instead of this, a display unit 10 with a touch detecting function according to the modification illustrated in FIG. 36 may be formed by integrating liquid crystals of various types of modes, such as a twisted nematic (TN) mode, a vertical alignment (VA) mode, and an electrically controlled birefringence (ECB) mode, and a touch detecting unit.

As illustrated in FIG. 36, when the counter substrate 3 includes the drive electrode COML, the wiring for display LDC, the wiring for touch LAC, or the wiring LCC may be provided to the counter substrate 3. The wiring LCC is arranged in the picture frame area Gd positioned on the outside of the display area Ad in the direction perpendicular to the TFT substrate 21.

In the above embodiments, the liquid crystal display unit 20 is integrated with the capacitive touch detection unit 30. However, the embodiment is not limited thereto. Alternatively, for example, the liquid crystal display unit 20 and the capacitive touch detection unit 30 are mounted on a device. In such a device on which the liquid crystal display unit 20 and the capacitive touch detection unit 30 are mounted, the second drive electrode COML is provided on the surface of the glass substrate 31 in the counter substrate 3 in addition to the drive electrode COML of the pixel substrate 2 illustrated in FIG. 8 serving as the first drive electrode COML, and the first drive electrode COML is electrically coupled to the second drive electrode COML. Also in this case, due to the configuration as described above, touch detection can be performed while suppressing influence of external noise or noise transmitted from the liquid crystal display unit (corresponding to the internal noise in the embodiments described above).

2. APPLICATION EXAMPLES

The following describes application examples of the displaying device 1 with a touch detecting function explained in the embodiments and the modifications with reference to FIG. 37 to FIG. 44. FIG. 37 to FIG. 44 are schematics of examples of an electronic apparatus to which the display device with a touch detecting function according to the present embodiments is applied. The display device 1 with a touch detecting function according to the first, the second, the third, the fourth embodiments or the modifications thereof is applicable to electronic apparatuses of all fields, such as television apparatuses, digital cameras, notebook personal computers, portable electronic apparatuses including mobile phones, and video cameras. In other words, the display device 1 with a touch detecting function according to the first, the second, the third, the fourth embodiments and the modifications thereof are applicable to electronic apparatuses of all fields that display video signals received from the outside or video signals generated inside thereof as an image or video.

First Application Example

Figure 37:
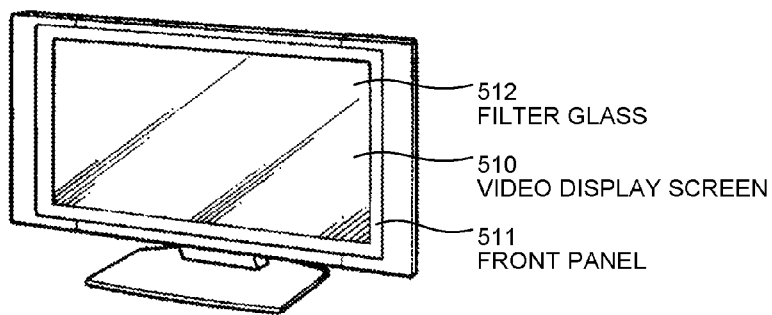
FIG. 37 is a schematic of an example of an electronic apparatus to which the display device with a touch detecting function according to the present embodiments is applied.

An electronic apparatus illustrated in FIG. 37 is a television apparatus to which the display device 1 with a touch detecting function according to the first, the second, the third, the fourth embodiments or the modifications thereof is applied. The television apparatus has a video display screen 510 including a front panel 511 and a filter glass 512, for example. The video display screen 510 corresponds to the display device with a touch detecting function according to the first, the second, the third, the forth embodiments or the modifications.

Second Application Example

Figure 38:
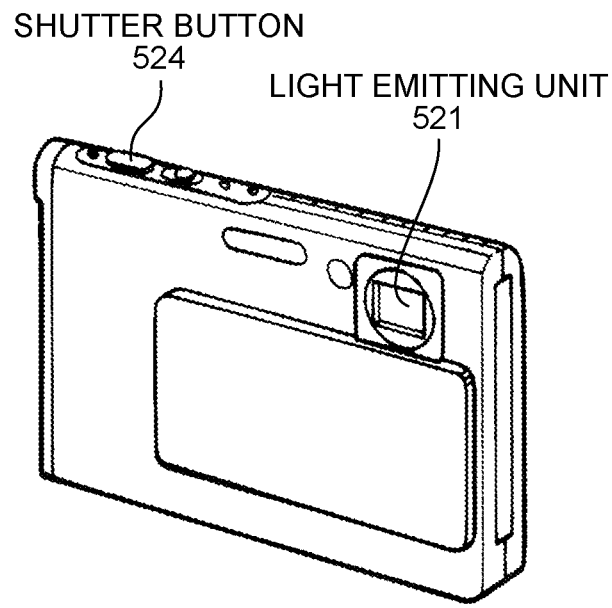
FIG. 38 is a schematic of an example of an electronic apparatus to which the display device with a touch detecting function according to the present embodiments is applied.
Figure 39:
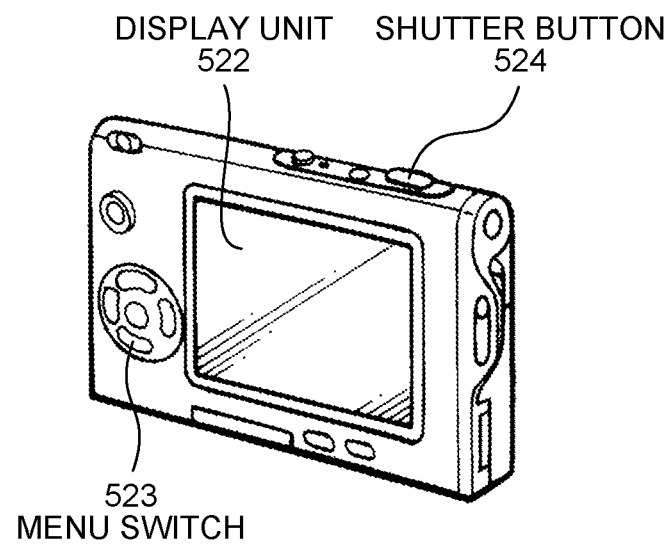
FIG. 39 is a schematic of an example of an electronic apparatus to which the display device with a touch detecting function according to the present embodiments is applied.

An electronic apparatus illustrated in FIG. 38 and FIG. 39 is a digital camera to which the display device 1 with a touch detecting function according to the first, the second, the third, the fourth embodiments or the modifications thereof is applied. The digital camera includes a light emitting unit 521 for flash, a display unit 522, a menu switch 523, and a shutter button 524, for example. The display unit 522 corresponds to the display device with a touch detecting function according to the first, the second, the third, the forth embodiments or the modifications.

Third Application Example

Figure 40:
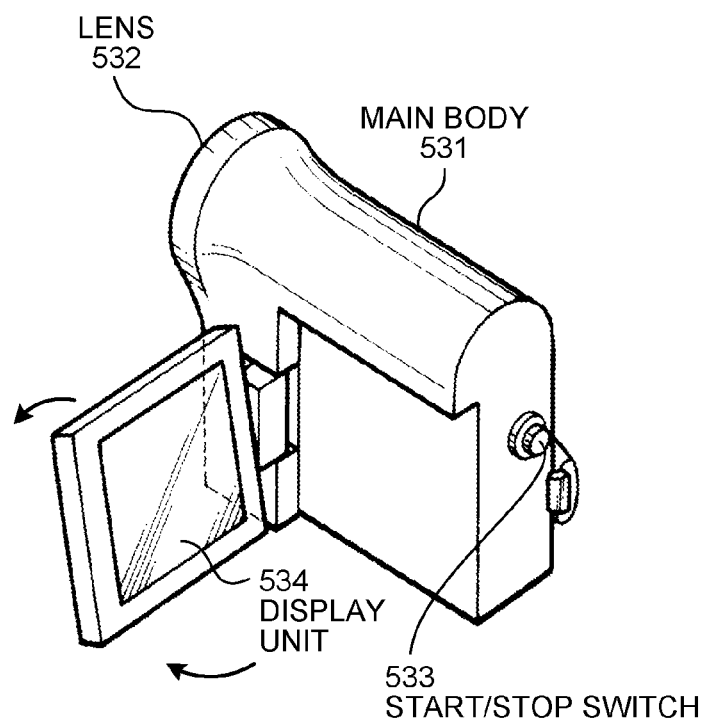
FIG. 40 is a schematic of an example of an electronic apparatus to which the display device with a touch detecting function according to the present embodiments is applied.

An electronic apparatus illustrated in FIG. 40 is a video camera to which the display device 1 with a touch detecting function according to the first, the second, the third, the fourth embodiments or the modifications thereof is applied. The video camera includes a main body 531, a lens 532 provided to the front side surface of the main body 531 and used for photographing a subject, a start/stop switch 533 used in photographing, and a display unit 534, for example. The display unit 534 corresponds to the display device with a touch detecting function according to the first, the second, the third, the forth embodiments or the modifications.

Fourth Application Example

Figure 41:
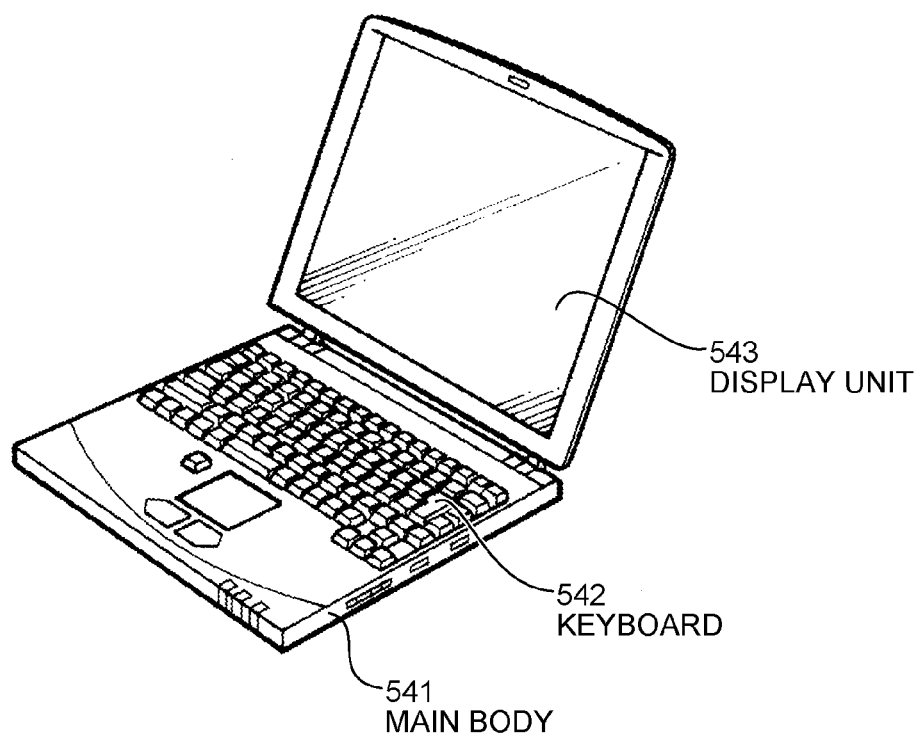
FIG. 41 is a schematic of an example of an electronic apparatus to which the display device with a touch detecting function according to the present embodiments is applied.

An electronic apparatus illustrated in FIG. 41 is a notebook personal computer to which the display device 1 with a touch detecting function according to the first, the second, the third, the fourth embodiments or the modifications thereof is applied. The notebook personal computer includes a main body 541, a keyboard 542 used for input of characters, and a display unit 543 that displays an image, for example. The display unit 543 corresponds to the display device with a touch detecting function according to the first, the second, the third embodiments or the modifications.

Fifth Application Example

Figure 42:
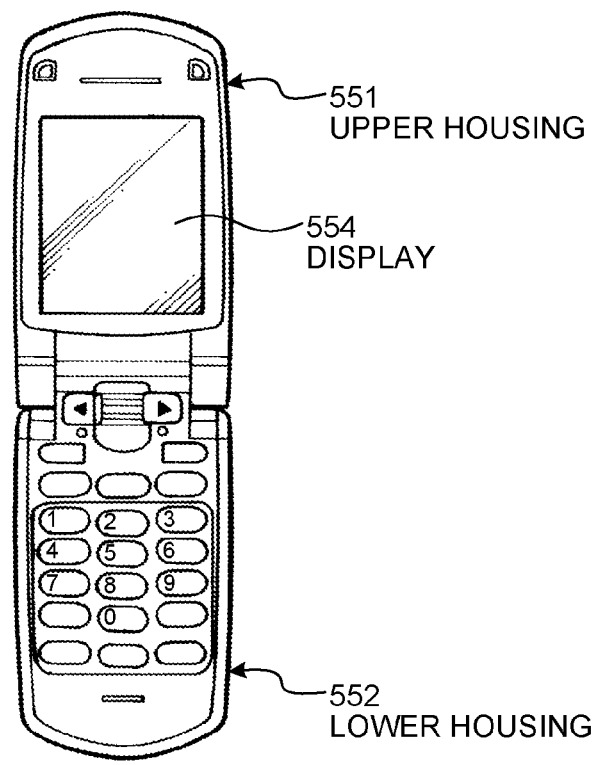
FIG. 42 is a schematic of an example of an electronic apparatus to which the display device with a touch detecting function according to the present embodiments is applied.
Figure 43:
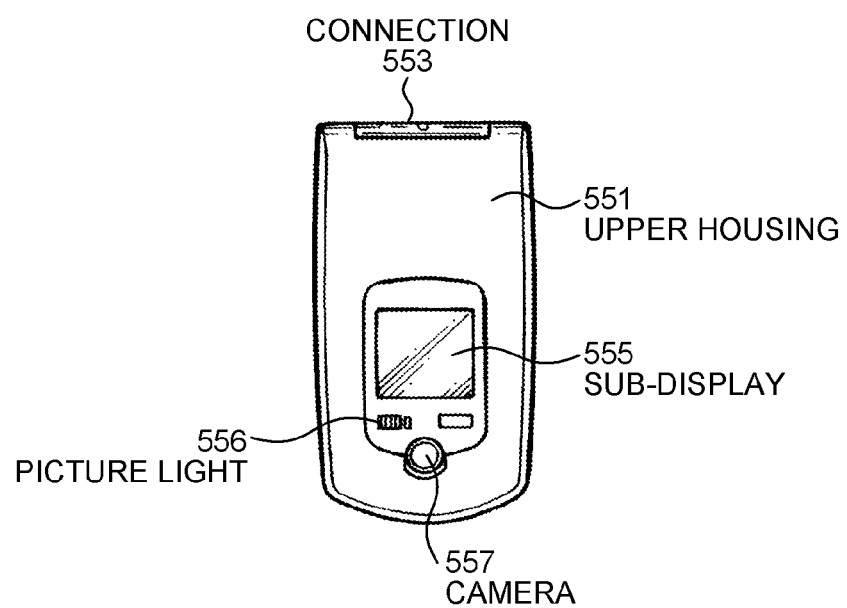
FIG. 43 is another schematic of the example of the electronic apparatus to which the display device with a touch detecting function according to the present embodiments is applied.

An electronic apparatus illustrated in FIG. 42 and FIG. 43 is a mobile phone to which the display device 1 with a touch detecting function according to the first, the second, the third, the fourth embodiments or the modifications thereof is applied. FIG. 42 is a front view of the mobile phone in an opened state. FIG. 43 is a front view of the mobile phone in a folded state. The mobile phone includes an upper housing 551 and a lower housing 552 connected by a connection (a hinge) 553, for example. The mobile phone includes a display 554, a sub-display 555, a picture light 556, and a camera 557. The display 554 is provided with the display device 1 with a touch detecting function.

Sixth Application Example

Figure 44:
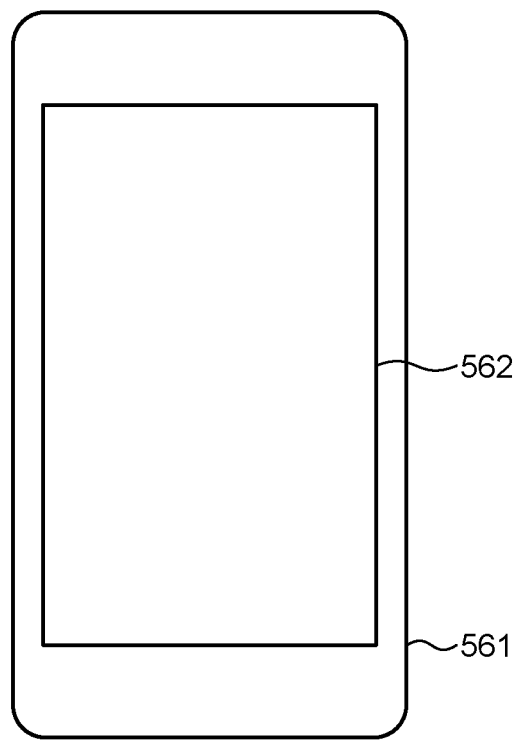
FIG. 44 is still a schematic of an example of an electronic apparatus to which the display device with a touch detecting function according to the present embodiments is applied.

An electronic apparatus illustrated in FIG. 44 operates as a mobile computer, a multifunctional mobile phone, a mobile computer capable of making a voice call, or a mobile computer capable of performing communications. The electronic apparatus is a portable information terminal, which may be called a smartphone or a tablet terminal. The portable information terminal includes a display unit 562 on the surface of a housing 561, for example. The display unit 562 corresponds to the display device 1 with a touch detecting function according to the first, the second, the third, the fourth embodiments or the modifications thereof.

Within the scope of the present invention, various changes and modifications can be easily conceivable by those skilled in the art, and the changes and modifications are considered to be encompassed in the scope of the invention. For example, even when other components are added or eliminated, design is changed, processes are added or omitted, or conditions are changed with respect to the embodiments described above, the embodiments are encompassed in the scope of the invention without deviating from the gist of the invention. Other working effects obtained from the aspects described in the embodiments that is clear from the description of the specification or that can be appropriately conceivable by those skilled in the art are considered to be naturally obtained from the present invention.

3. ASPECTS OF PRESENT DISCLOSURE

The present disclosure includes the following aspects.

(1) A display device with a touch detecting function including:
a plurality of pixel electrodes arranged in a display area;
a plurality of drive electrodes arranged opposed to the pixel electrodes;
a control device that applies a drive voltage for display between the plurality of pixel electrodes and the plurality of drive electrodes;
a touch detection electrode opposed to the plurality of drive electrodes;
wiring for touch that is arranged in a peripheral area positioned outside of the display area and supplies a drive signal for touch to the plurality of drive electrodes; and
a selection switch that selects one of the plurality of drive electrodes to be coupled to the wiring for touch,
wherein the control device includes a drive electrode scanning unit selecting one of the plurality of drive electrodes, the drive electrode scanning unit includes a plurality of transfer circuits for supplying the drive signal for touch in the peripheral area, and part of the transfer circuits is a transfer circuit that controls the selection switch.

(2) The display device with a touch detecting function according to (1), wherein the transfer circuits are arranged side by side in a direction in which the wiring for touch extends.

(3) The display device with a touch detecting function according to (1), wherein the transfer circuits include a first transfer circuit that controls the selection switch and a second transfer circuit that supplies a transfer circuit output to the first transfer circuit.

(4) The display device with a touch detecting function according to (2), wherein the transfer circuits include a first transfer circuit that controls the selection switch and a second transfer circuit that supplies a transfer circuit output to the first transfer circuit.

(5) The display device with a touch detecting function according to (1), further including a transfer circuit for display that scans the pixel electrodes,
wherein the transfer circuit for display is arranged in the peripheral area, and
the number of the transfer circuits provided for one drive electrode is smaller than the number of transfer circuits for display for scanning the pixel electrodes overlapping with the drive electrode.

(6) The display device with a touch detecting function according to (1), further including wiring for display that supplies the drive voltage for display,
wherein the wiring for display is arranged in parallel with the wiring for touch that supplies the drive signal for touch.

(7) The display device with a touch detecting function according to (1), further including wiring for display that supplies the drive voltage for display,
wherein the wiring for display is arranged in parallel with the wiring for touch that supplies a constant voltage higher than the drive voltage for display.

(8) The display device with a touch detecting function according to (1), wherein the control device supplies the drive voltage for display and the drive signal for touch to the same wiring for touch in different time periods.

(9) The display device with a touch detecting function according to (1), further including a plurality of transfer circuits for supplying a drive signal for touch to the drive electrode, wherein the transfer circuits are arranged in the peripheral area for one drive electrode, and
among the transfer circuits, a second transfer circuit different from a first transfer circuit that controls the selection switch outputs a transfer circuit output of idle transfer.

(10) The display device with a touch detecting function according to (1), wherein a drive electrode to which the drive signal for touch is supplied is selected corresponding to a change in a level of a drive electrode selection signal that identifies an operation period for touch detection.

(11) The display device with a touch detecting function according to (1), further including a control signal line that transmits a drive electrode selection signal identifying an operation period for touch detection,
wherein the control signal line is arranged in the peripheral area and is coupled to the transfer circuits.

(12) An electronic apparatus including:
a display device with a touch detecting function,
the display device with a touch detecting function including:
a plurality of pixel electrodes arranged in a display area;
a plurality of drive electrodes arranged opposed to the pixel electrodes;
a control device that applies a drive voltage for display between the plurality of pixel electrodes and the plurality of drive electrodes based on an image signal;
a touch detection electrode opposed to the drive electrode;
a touch detection unit coupled to the touch detection electrode;
wiring for touch that is arranged in a picture frame area positioned outside of the display area and supplies a drive signal for touch to the plurality of drive electrodes; and
a selection switch that selects one of the plurality of drive electrodes to be coupled to the wiring for touch,
wherein the control device includes a drive electrode scanning unit that selects one of the plurality of drive electrodes to which the drive signal for touch is supplied,
the drive electrode scanning unit includes a plurality of transfer circuits for supplying the drive signal for touch to the one of the plurality of drive electrodes, and
part of the transfer circuits is a transfer circuit that controls the selection switch.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a first drive electrode and a second drive electrode arranged in a display area, the first drive electrode being arranged next to the second drive electrode;
a touch detection electrode opposed to the first and second drive electrodes; a first wiring that is arranged in a peripheral area positioned outside of the display area and is configured to supply an alternating-current signal;

a first selection switch connected between the first drive electrode and the first wiring, and a second selection switch connected between the second drive electrode and the first wiring; and a drive electrode scanning unit configured to control the first and second selection switches, wherein the drive electrode scanning unit includes a first shift register configured to control the first selection switch, a second shift register configured to control the second selection switch, and a third shift register connected to the first shift register and second shift register, wherein an output of the first shift register is supplied to the third shift register, and an output of the third shift register is supplied to the second shift register.

2. The display device according to claim 1, wherein the first, second, and third shift registers are arranged side by side in a direction in which the first wiring extends.

3. The display device according to claim 2, wherein a control signal is supplied to the first, second, and third shift registers.

4. The display device according to claim 1, further comprising a plurality of scanning signal lines in the display area, and a transfer circuit configured to control the plurality of scanning signal lines, wherein the transfer circuit is arranged in the peripheral area, and the first, second, and third shift registers are arranged between the transfer circuit and the display area.

5. The display device according to claim 1, further comprising a control device configured to supply a drive voltage for display and the alternating-current signal to the first wiring in different time periods.

6. The display device according to claim 1, wherein the third shift register outputs an idle transfer signal to the second shift register.

* * * * *